(12) United States Patent
Uehara

(10) Patent No.: US 10,725,576 B2
(45) Date of Patent: Jul. 28, 2020

(54) DETECTION DEVICE, DISPLAY DEVICE, AND DETECTION METHOD

(71) Applicant: Japan Display Inc., Tokyo (JP)

(72) Inventor: Toshinori Uehara, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 15/472,475

(22) Filed: Mar. 29, 2017

(65) Prior Publication Data

US 2017/0285847 A1   Oct. 5, 2017

(30) Foreign Application Priority Data

Mar. 31, 2016   (JP) .................................. 2016-070362
Mar. 29, 2017   (JP) .................................. 2017-066074

(51) Int. Cl.
  *G06F 3/044*   (2006.01)
  *G06F 3/041*   (2006.01)

(52) U.S. Cl.
  CPC ............ *G06F 3/0416* (2013.01); *G06F 3/044* (2013.01)

(58) Field of Classification Search
  CPC .................... G06F 3/041–047; G06F 3/044
  See application file for complete search history.

(56) References Cited

U.S. PATENT DOCUMENTS

| | | | | |
|---|---|---|---|---|
| 2010/0328257 A1* | 12/2010 | Noguchi | ............. | G02F 1/13338 345/174 |
| 2012/0075240 A1* | 3/2012 | Kida | ........................ | G06F 3/044 345/174 |
| 2013/0082763 A1* | 4/2013 | Inada | ................... | H03K 17/962 327/517 |
| 2014/0168161 A1 | 6/2014 | Sugita et al. | | |
| 2014/0292709 A1 | 10/2014 | Mizuhashi et al. | | |
| 2015/0242027 A1* | 8/2015 | Kida | ...................... | G06F 3/0418 345/173 |
| 2015/0338952 A1* | 11/2015 | Shahparnia | ............. | G06F 3/044 345/174 |
| 2015/0355765 A1 | 12/2015 | Fukushima et al. | | |

FOREIGN PATENT DOCUMENTS

JP          2014-199605 A       10/2014

OTHER PUBLICATIONS

Chinese Office Action corresponding to Chinese Patent Application No. 201710205755.9 dated Aug. 1, 2019.

* cited by examiner

*Primary Examiner* — Hang Lin

(74) *Attorney, Agent, or Firm* — Michael Best & Friedrich LLP

(57) ABSTRACT

Provided is a detection device which includes a detection electrode group including a plurality of first electrodes each of which is configured to detect a detection signal that changes according to touch or approach of an external object, an output signal line, and a selective coupling circuitry configured to couple first electrodes of a first detection target in the detection electrode group with the output signal line according to a first selection signal, output a first output signal obtained by integrating detection signals output from the selected first electrodes of the first detection target to the output signal line, couple first electrodes of a second detection target which are not included in the first detection target in the detection electrode group with the output signal line according to a second selection signal different from the first selection signal, and output a second output signal.

12 Claims, 28 Drawing Sheets

FIG.25
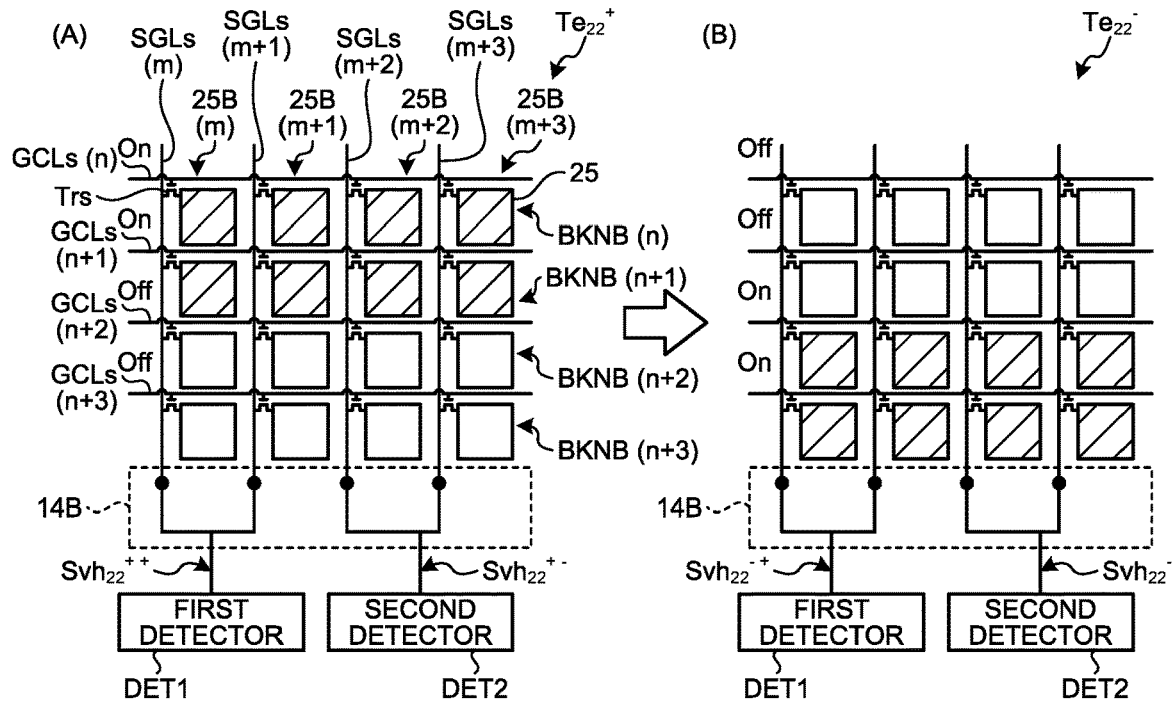
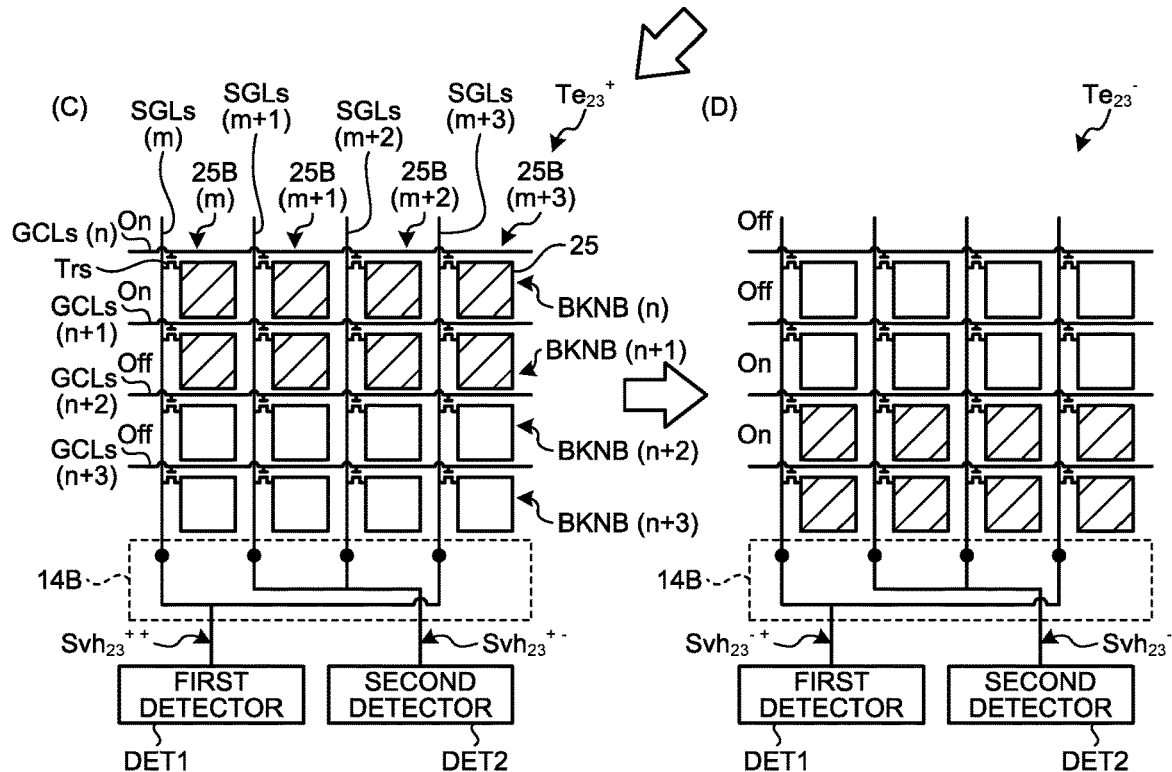
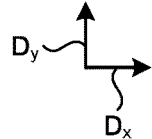

DETECTION DEVICE, DISPLAY DEVICE, AND DETECTION METHOD

CROSS-REFERENCE TO RELATED APPLICATIONS

This application claims priority from Japanese Application No. 2016-070362, filed on Mar. 31, 2016, and Japanese Application No. 2017-066074, filed on Mar. 29, 2017, the contents of which are incorporated by reference herein in its entirety.

BACKGROUND

1. Technical Field

The present invention relates to a detection device, a display device, and a detection method.

2. Description of the Related Art

In recent years, detection devices capable of detecting an external proximity object that are called touch panels have attracted attention. The touch panel is mounted on or formed integrally with a display device such as a liquid crystal display device and used as a display device. In such a detection device, code division selection driving in which a plurality of drive electrodes are simultaneously selected, a drive signal whose phase is decided based on a predetermined code is supplied to each of a plurality of selected drive electrodes, and detection of an external proximity object is performed is known (see Japanese Patent Application Laid-open Publication No. 2014-199605 A).

However, unlike the mutual-capacitance scheme, in the self-capacitance scheme in which detection of an external proximity object is performed based on capacitance of a detection electrode, when drive signals of different phases are supplied to a plurality of detection electrodes, capacitive coupling between the detection electrodes increases, and thus detection sensitivity may be lowered.

For the foregoing reasons, there is a need for providing a detection device, a display device, and a detection method, which are capable of excellent detection sensitivity by suppressing capacitive coupling between electrodes.

SUMMARY

According to an aspect, a detection device includes a detection electrode group including a plurality of first electrodes each of which is configured to detect a detection signal that changes according to touch or approach of an external object, an output signal line, and a selective coupling circuitry configured to couple first electrodes of a first detection target in the detection electrode group with the output signal line according to a first selection signal, output a first output signal obtained by integrating detection signals output from the selected first electrodes of the first detection target to the output signal line, couple first electrodes of a second detection target which are not included in the first detection target in the detection electrode group with the output signal line according to a second selection signal different from the first selection signal, and output a second output signal obtained by integrating detection signals output from the selected first electrodes of the second detection target to the output signal line.

According to an aspect, a display device includes a display function layer configured to display an image, a detection electrode group that includes a plurality of first electrodes each of which is configured to display a signal that changes according to touch or approach of an external object, an output signal line, and a selective coupling circuitry configured to couple first electrodes of a first detection target in the detection electrode group with the output signal line according to a first selection signal, output a first output signal obtained by integrating detection signals output from the selected first electrodes of the first detection target to the output signal line, couple first electrodes of a second detection target which are not included in the first detection target in the detection electrode group with the output signal line according to a second selection signal different from the first selection signal, and output a second output signal obtained by integrating detection signals output from the selected first electrodes of the second detection target to the output signal line.

According to an aspect, a detection method of a detection device includes a detection electrode group including a plurality of first electrodes each of which is used for detecting a signal that changes according to touch or approach of an external object, an output signal line, and a selective coupling circuitry that performs switching of coupling and disconnection between the first electrodes and the output signal line. The detection method includes coupling, by the selective coupling circuitry, first electrodes of a first detection target in the detection electrode group with the output signal line according to a first selection signal and outputting a first output signal obtained by integrating detection signals output from the selected first electrodes of the first detection target to the output signal line, and coupling, by the selective coupling circuitry, first electrodes of a second detection target which are not included in the first detection target in the detection electrode group with the output signal line according to a second selection signal different from the first selection signal and outputting a second output signal obtained by integrating detection signals output from the selected first electrodes of the second detection target to the output signal line.

BRIEF DESCRIPTION OF THE DRAWINGS

FIG. 25 is an explanatory diagram for describing an example of a selection pattern of first electrodes selected as a detection target in eleventh and twelfth detection operations;

DETAILED DESCRIPTION

Figure 1:
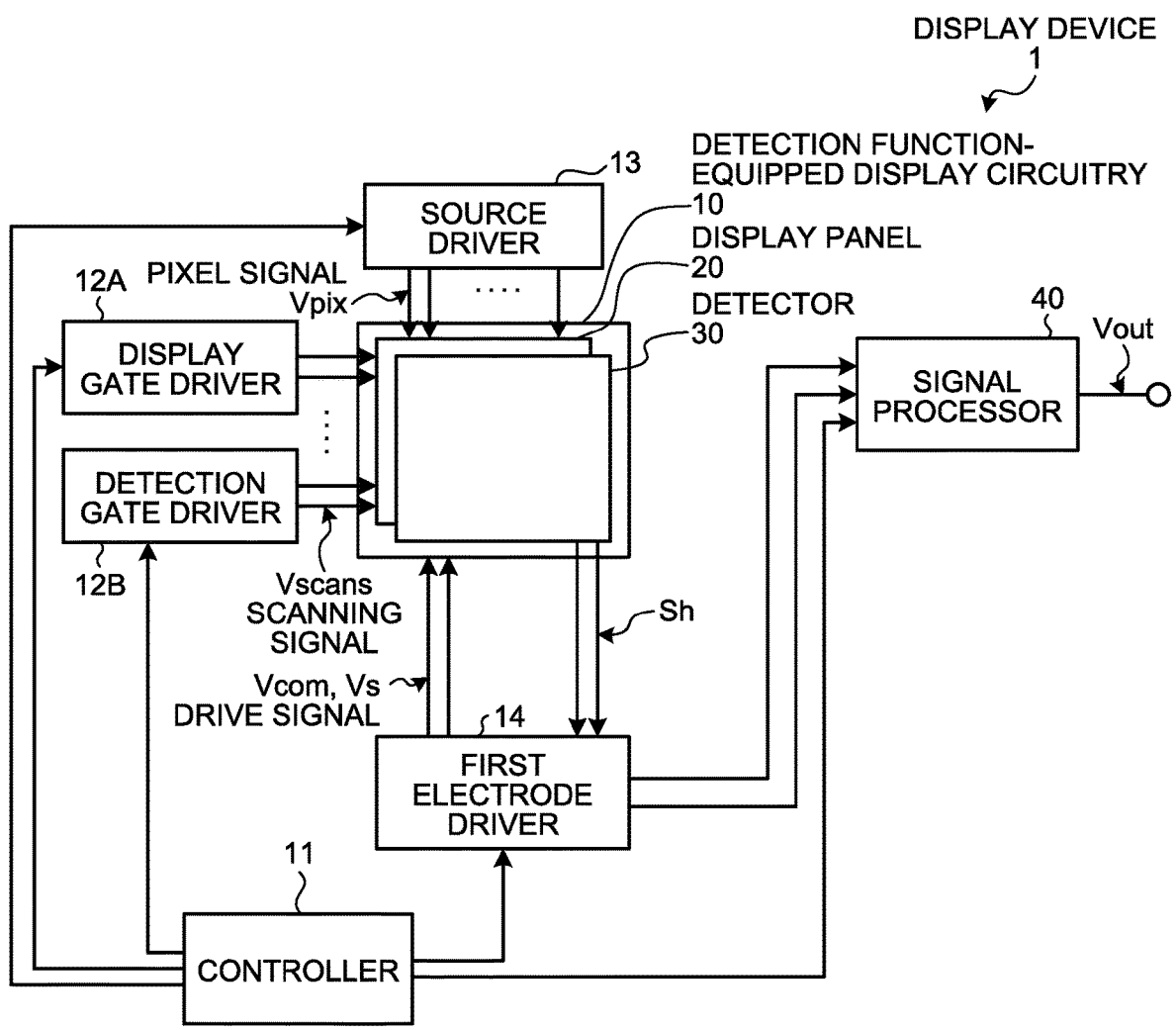
FIG. 1 is a block diagram illustrating an exemplary configuration of a display device according to a first embodiment.

Hereinafter, modes (embodiments) for carrying the present invention will be described in detail with reference to the appended drawings. The present invention is not limited by a description of the following embodiments. Further, components to be described below include ones which can be easily assumed by those having skill in the art and ones which are substantially the same. Further, components to be described below may be appropriately combined. The disclosure is merely an example, and it should be noted that an appropriate change which is made without departing from the gist of the invention but can be easily derived by those having skill in the art is included in the scope of the present invention. Further, in the drawings, in order to further clarify a description, a width, a thickness, a shape, and the like of each element are schematically illustrated compared to an actual form, but they are merely an example and not intended to limit interpretation of the present invention. In addition, in this specification and the drawings, the same components as those in the drawings which are already described are denoted by the same reference numerals, and a detailed description will be appropriately omitted.

First Embodiment

FIG. 1 is a block diagram illustrating an exemplary configuration of a display device according to the first embodiment. A display device 1 includes a detection function-equipped display circuitry 10, a controller 11, a display gate driver 12A, a detection gate driver 12B, a source driver 13, a first electrode driver 14, and a signal processor 40 as illustrated in FIG. 1. The display device 1 is a display device is a display device in which the detection function-equipped display circuitry 10 has a detection function therein. The detection function-equipped display circuitry 10 is a device in which a display panel 20 using a liquid crystal display element as a display element is integrated with a detector 30 serving as a detection device that detects a touch input. For example, the device in which the display panel 20 is integrated with the detector 30 indicates that a part of a substrate or an electrode used in the display panel 20 or the detector 30 is shared. The detection function-equipped display circuitry 10 may be any on cell type device in which the detector 30 is mounted on the display panel 20. For example, the display panel 20 may be an organic EL display panel.

As will be described later, the display panel 20 is a display device that sequentially scans horizontal lines one by one according to a display scanning signal Vscan for display supplied from the display gate driver 12A and performs display.

The controller 11 is a circuit that supplies a control signal to the display gate driver 12A, the detection gate driver 12B, the source driver 13, the first electrode driver 14, and the signal processor 40, respectively based on a video signal supplied from the outside, and performs control such that the display gate driver 12A, the detection gate driver 12B, the source driver 13, the first electrode driver 14, and the signal processor 40 operate in synchronization or non-synchronization with one another.

The display gate driver 12A has a function of sequentially selecting one horizontal line serving as a display driving target of the detection function-equipped display circuitry 10 based on the control signal supplied from the controller 11. The detection gate driver 12B has a function of outputting a detection scanning signal Vscans for detection based on the control signal supplied from the controller 11 and selecting a first electrode 25 serving as a detection target among a plurality of first electrodes 25 (which will be described later) of the detector 30.

The source driver 13 is a circuit that supplies a pixel signal Vpix to each sub pixel SPix (which will be described later) of the detection function-equipped display circuitry 10 based on the control signal supplied from the controller 11. The controller 11 may generate the pixel signal Vpix and supply the pixel signal Vpix to the source driver 13.

The first electrode driver 14 is a circuit that supplies a display detection drive signal Vs or a detection display drive signal Vcom to the first electrode 25 in the detection function-equipped display circuitry 10 based on the control signal supplied from the controller 11.

The detector 30 operates based on a basic principle of capacitance type touch detection, performs a touch detection operation according to the self-capacitance scheme, and detects touch or approach of an external conductor. When the touch or the approach of the external conductor is detected, the detector 30 outputs an output signal Sh integrating the detection signals of the selected first electrodes 25.

Figure 2:
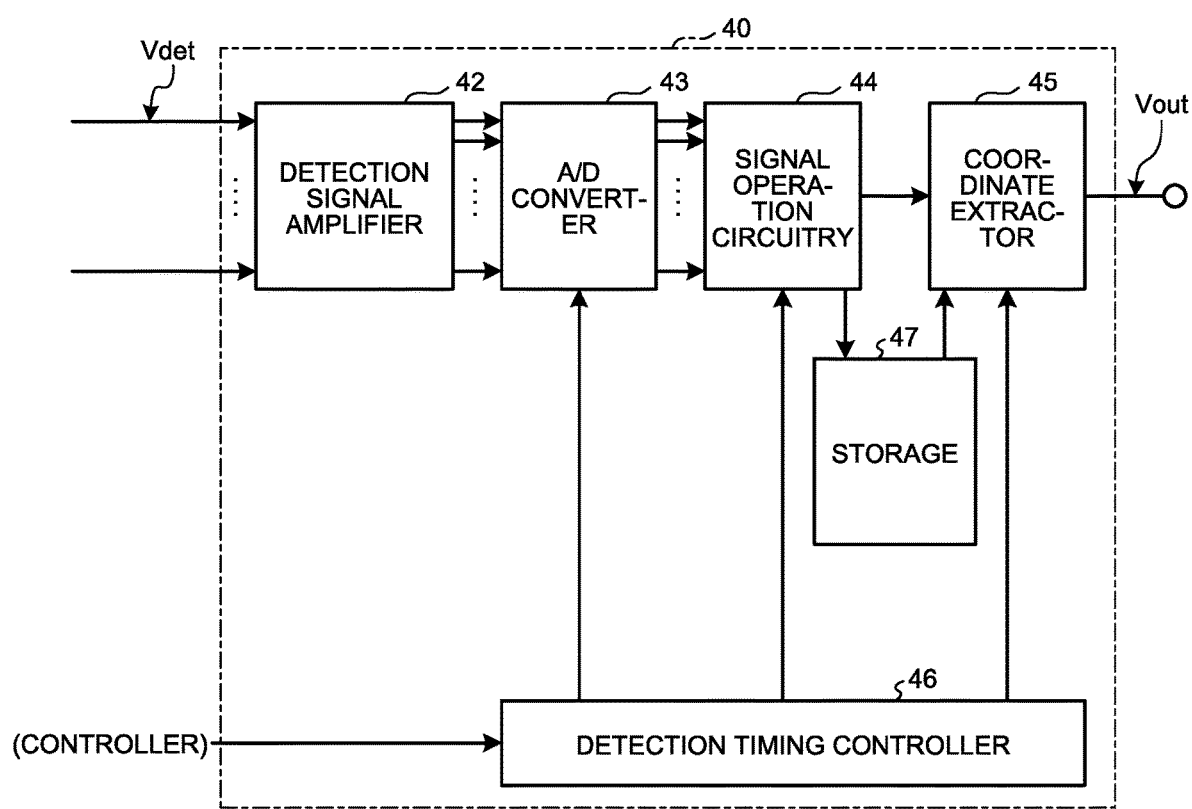
FIG. 2 is a block diagram illustrating an exemplary configuration of a signal processor.

FIG. 2 is a block diagram illustrating an exemplary configuration of the signal processor. The signal processor 40 is a circuit that detects the presence or absence of touch on the detector 30 based on the control signal supplied from the controller 11 and the output signal Sh supplied from the detector 30. When there is touch, the signal processor 40 obtains coordinates or the like at which a touch input is performed. The signal processor 40 includes a detection signal amplifier 42, an A/D converter 43, a signal operation circuitry 44, a coordinate extractor 45, and a storage 47. A detection timing controller 46 performs control such that the A/D converter 43, the signal operation circuitry 44, and the coordinate extractor 45 operate in synchronization with one another based on the control signal supplied from the controller 11.

Figure 3:
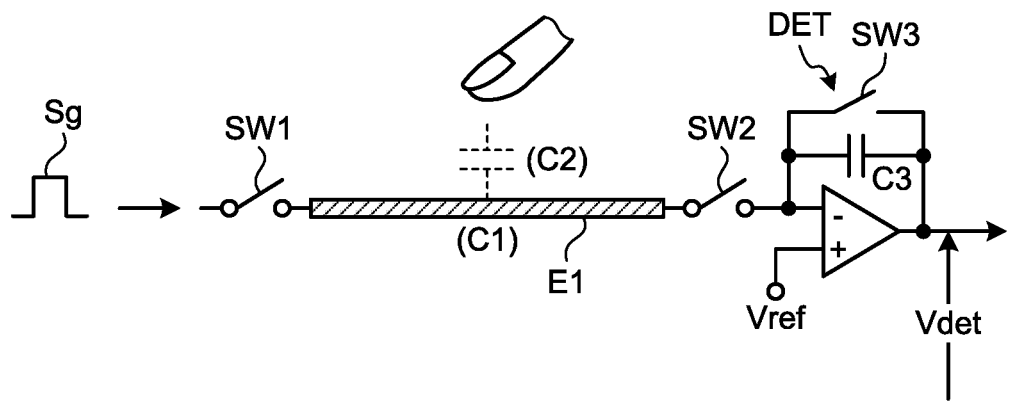
FIG. 3 is an explanatory diagram for describing a basic principle of touch detection of a self-capacitance scheme.
Figure 4:
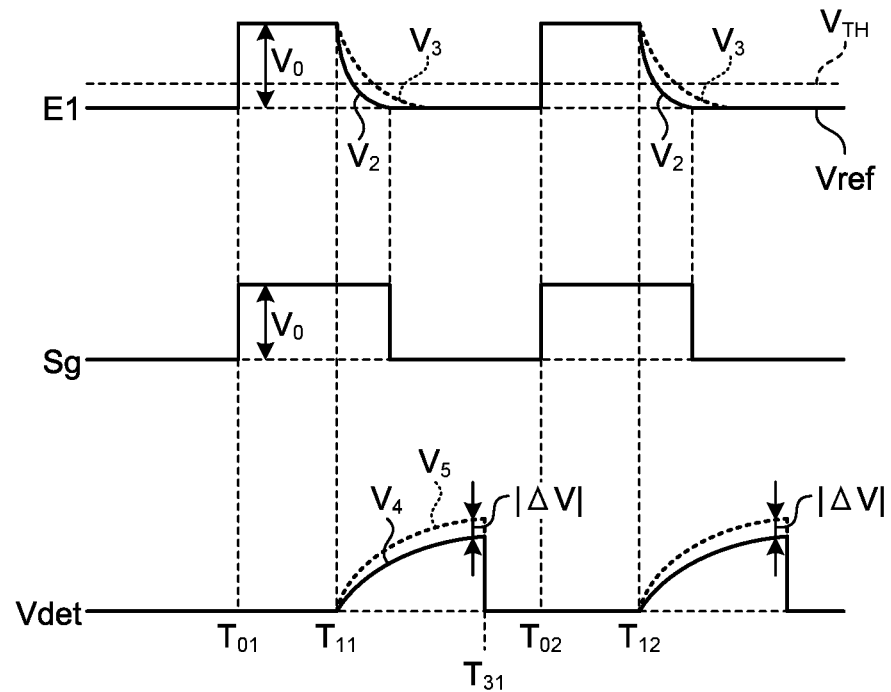
FIG. 4 is a diagram illustrating an example of waveforms of a detection drive signal and a detection signal of touch detection of a self-capacitance scheme.

As described above, the detector 30 operates based on the basic principle of the capacitance type touch detection. Here, the basic principle of the touch detection of the self-capacitance scheme will be described with reference to FIGS. 3 and 4. FIG. 3 is an explanatory diagram for describing the basic principle of the touch detection of the self-capacitance scheme. FIG. 4 is a diagram illustrating an example of waveforms of a detection drive signal and a detection signal of the touch detection of the self-capacitance scheme. FIG. 3 illustrates a detection circuit together.

In a state in which a finger neither touches nor approaches, an alternate current (AC) rectangular wave Sg of a predetermined frequency (for example, several kHz to several hundred kHz) is applied to a detection electrode E1. The detection electrode E1 has a capacitance C1, and an electric current according to the capacitance C1 flows to the detection electrode E1. A voltage detection circuit DET converts a variation in an electric current according to the AC rectangular wave Sg into a variation in a voltage (a waveform $V_4$ of a solid line (see FIG. 4)). For example, the voltage detection circuit DET is an integration circuit that included in the detection signal amplifier 42 illustrated in FIG. 2.

Then, in a state in the finger touches or approaches, a capacitance C2 between the finger and the detection electrode E1 is added to the capacitance C1 of the detection electrode E1 as illustrated in FIG. 3. Thus, when the AC rectangular wave Sg is applied to the detection electrode E1, an electric current according to the capacitance C1 and the capacitance C2 flows. The voltage detection circuit DET converts a variation in an electric current according to the AC rectangular wave Sg into a variation in a voltage (a waveform $V_5$ of a dotted line) as illustrated in FIG. 4. Then, voltage values of the waveform $V_4$ and the waveform $V_5$ which are obtained are respectively integrated, and it is determined whether or not the finger touches or approaches the detection electrode E1 by comparing these values. The signal processor 40 is not limited thereto and may compare the voltage values without integrating them. In FIG. 4, a method of obtaining periods taken until a waveform $V_2$ and a waveform $V_3$ are lowered to a predetermined reference voltage $V_{TH}$ and comparing the periods may be used.

Specifically, the detection electrode E1 is configured to be separated by a switch SW1 and a switch SW2 as illustrated in FIG. 3. In FIG. 4, at a timing of a time $T_{01}$, the AC rectangular wave Sg is increased to a voltage level corresponding to a voltage $V_0$. At this time, the switch SW1 is turned on, and the switch SW2 is turned off. For this reason, the voltage of the detection electrode E1 is increased to the voltage $V_0$. Then, before a timing of a time $T_{11}$, the switch SW1 is turned off. At this time, the detection electrode E1 is in the floating state, but a potential $V_0$ of the detection electrode E1 is maintained due to the capacitance C1 of the detection electrode E1 or the capacitance C1+C2 (see FIG. 3) obtained by adding the capacitance C2 caused by the touch or the approach of the finger or the like to the capacitance C1 of the detection electrode E1. Further, before the timing of the time $T_{11}$, the switch SW3 is turned on and then turned off after a predetermined period of time elapses, and thus the voltage detection circuit DET is reset. Through the reset operation, an output voltage becomes substantially equal to Vref.

Then, at the timing of the time $T_{11}$, when the switch SW2 is turned on, an inverting input portion of the voltage detection circuit DET becomes the voltage $V_0$ of the detection electrode E1, and then the inverting input portion of the voltage detection circuit DET is lowered to the reference voltage Vref according to time constants of the capacitance C1 (or C1+C2) of the detection electrode E1 and a capacitance C3 in the voltage detection circuit DET.

At this time, electric charges accumulated in the capacitance C1 (or C1+C2) of the detection electrode E1 move to the capacitance C3 of the voltage detection circuit DET, and thus the output of the voltage detection circuit DET is increased (see the detection signal Vdet in FIG. 4). When the finger or the like does not approach the detection electrode E1, the output (the detection signal Vdet) of the voltage detection circuit DET is the waveform $V_4$ indicated by a solid line and becomes Vdet=C1·$V_0$/C3. When the capacitance is added due to influence of the finger or the like, the output (Vdet) of the voltage detection circuit DET is the waveform $V_5$ indicated by a dotted line and becomes Vdet=(C1+C2)·$V_0$/C3.

Thereafter, after the electric charges of the capacitance C1 (or C1+C2) of the detection electrode E1 sufficiently move to the capacitance C3, at a timing of a time $T_{31}$, the switch SW2 is turned off, and the switch SW1 and the switch SW3 are turned on, and thus the potential of the detection electrode E1 becomes the low level of the same potential as the AC rectangular wave Sg, and the voltage detection circuit DET is reset at the same time. At this time, the switch SW1 may be turned on at any timing before a time $T_{02}$ after the switch SW2 is turned off. The voltage detection circuit DET may be reset at any timing before a time $T_{12}$ after the switch SW2 is turned off.

The above operation is repeated at a predetermined frequency (for example, several kHz to several hundred kHz). It is possible to measure the presence or absence of an external proximity object (the presence or absence of touch) based on an absolute value |ΔV| of a difference between the waveform $V_4$ and the waveform $V_5$. As illustrated in FIG. 4, the potential of the detection electrode E1 is the waveform $V_2$ when the finger or the like does not approach and the waveform $V_3$ when the capacitance C2 is added due to influence of the finger or the like. It is possible to measure periods of time taken until the waveform $V_2$ and the waveform $V_3$ are lowered to the predetermined reference voltage $V_{TH}$ and measure the presence or absence of an external proximity object (the presence or absence of touch).

The detection signal amplifier 42 illustrated in FIG. 2 amplifies the output signal Sh supplied from the detector 30. The detection signal amplifier 42 may include an analog low pass filter (LPF) that removes a high frequency component (a noise component) included in the output signal Sh and outputs a result.

The A/D converter 43 samples an analog signal output from the detection signal amplifier 42 at a timing synchronized with the detection drive signal Vs, thereby converting the sampled analog signal into a digital signal.

The signal operation circuitry 44 includes a digital filter that reduces a frequency component (a noise component) included in the output signal Sh output from the A/D converter 43 other than a frequency at which the detection drive signal Vs is sampled. The signal operation circuitry 44 is a logic circuit that detects the presence or absence of touch on the detector 30 based on the output signal Sh. The signal operation circuitry 44 performs a process of extracting a difference of a detection signal included in the output signal Sh by the finger. A signal of the difference by the finger is an absolute value |ΔV| of a difference between the waveform $V_4$ and the waveform $V_5$. The signal operation circuitry 44 compares the detected signal of the difference by the finger with a predetermined threshold voltage and determines it to be a state in which the external proximity object does not contact when the detected signal of the difference by the finger is less than the threshold voltage. On the other hand, the signal operation circuitry 44 compares the detected signal of the difference by the finger with a predetermined threshold voltage and determines it to be a state in which the external proximity object contacts when the detected signal of the difference by the finger is the threshold voltage or more. Accordingly, the signal processor 40 can perform the touch detection. As will be described later, the signal operation circuitry 44 receives the output signal Sh from the first electrodes 25 serving as a detection target, and performs an operation process based on a predetermined code. A third output signal calculated by the signal operation circuitry 44 is temporarily stored in the storage 47. Examples of the storage 47 include random access memory (RAM), read only memory (ROM), and a register circuit.

The coordinate extractor 45 is a logic circuit that obtains touch panel coordinates when the touch is detected through the signal operation circuitry 44. The coordinate extractor 45 receives the third output signal stored in the storage 47, and performs a decoding process based on a predetermined code. In other words, the coordinate extractor 45 calculates the detection signal Vdet on the basis of the output signal Sh. The coordinate extractor 45 calculates the touch panel coordinates based on decoded information, and outputs the obtained touch panel coordinates as a detection signal output Vout. The coordinate extractor 45 may output the detection signal Vdet as the detection signal output Vout without calculating the touch panel coordinates. As described above, the display device 1 of the present embodiment can detect touch panel coordinates of a position at which the conductor such as the finger touches or approaches based on the basic principle of the touch detection by the self-capacitance scheme.

Figure 5:
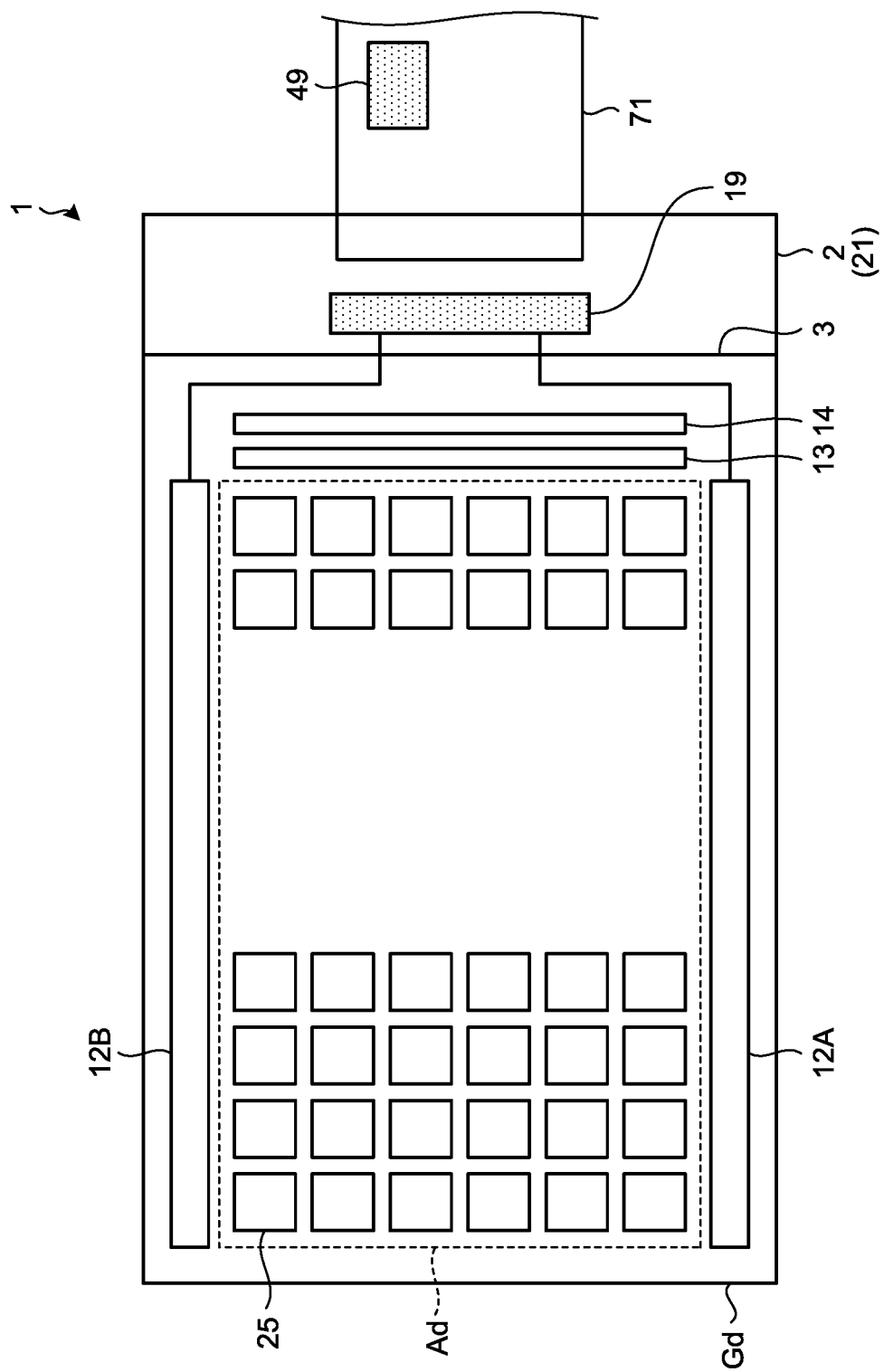
FIG. 5 is a diagram illustrating an example of a module in which a display device is mounted.

FIG. 5 is a diagram illustrating an example of a module equipped with the display device. The display device 1 includes a pixel substrate 2 (a first substrate 21) which will be described later and a printed circuit board 71 as illustrated in FIG. 5. For example, the printed circuit board 71 is a flexible printed circuit board. On the pixel substrate 2 (the first substrate 21), a first semiconductor integrated circuit (a first IC) 19, for example, a chip on glass (COG) is mounted, and a display region Ad of the display panel 20 and a frame region Gd which is a region outside the display region Ad are formed. The first semiconductor integrated circuit (the first IC) 19 is a chip of an IC driver mounted on the first substrate 21, that is, a control device which functions as the controller 11 illustrated in FIG. 1 and includes circuits therein which are necessary for a display operation. In the present embodiment, the display gate driver 12A, the detection gate driver 12B, the source driver 13, and the first electrode driver 14 are formed on the first substrate 21. The source driver 13 may be installed in the first semiconductor integrated circuit (the first IC) 19. Further, in the display device 1, the circuits such as the first electrode driver 14, the display gate driver 12A, the detection gate driver 12B may be installed in the first semiconductor integrated circuit (the first IC) 19. The COG is merely an implementation example, and the present invention is not limited thereto. For example, a component having the same function as the first semiconductor integrated circuit (the first IC) 19 may be installed through a chip on film or a chip on flexible (COF).

A plurality of first electrodes 25 are formed in a matrix form at a position overlapping the display region Ad of the first substrate 21 as illustrated in FIG. 5. The first electrode 25 has a rectangular shape, and a plurality of first electrodes 25 are arranged in directions along long and short sides of the display region Ad. The detection drive signal Vs is supplied to each of the first electrodes 25 by the first electrode driver 14. Each of the first electrodes 25 is coupled with a second semiconductor integrated circuit (the second IC) 49 mounted on the printed circuit board 71 via the printed circuit board 71. The second semiconductor integrated circuit (the second IC) 49 functions as the signal processor 40 illustrated in FIG. 1. The output signal Sh obtained by integrating detection signal Vdet of each of the first electrodes 25 is output to the second semiconductor integrated circuit (the second IC) 49 via the printed circuit board 71. The first electrode 25 is respectively coupled to the second semiconductor integrated circuit (the second IC) 49, but the present invention is not limited thereto. For example, the first semiconductor integrated circuit (the first IC) 19 may be provided with the function of the signal processor 40, and the first electrodes 25 may be respectively coupled to the first semiconductor integrated circuit (the first IC) 19.

The printed circuit board 71 is not limited to a flexible printed circuit board and may be a rigid substrate or a rigid flexible substrate. The second semiconductor integrated circuit (the second IC) 49 may not be mounted on the printed circuit board 71 and may be mounted on a control substrate coupled via the printed circuit board 71 outside the module or the first substrate 21. In the present embodiment, the second semiconductor integrated circuit (the second IC) 49 is a touch driver IC mounted on the printed circuit board 71, but some functions of the signal processor 40 may be provided to serve as the first semiconductor integrated circuit (the first IC) 19 or any other MPU. Specifically, some functions (for example, noise reduction and the like) among various kinds of functions such as A/D conversion and noise reduction which can be provided as the function of the touch driver IC may be implemented through a circuit such as the first semiconductor integrated circuit (the first IC) 19 or the MPU which is installed separately from the touch driver IC. The signal operation circuitry 44, the coordinate extractor 45, and the storage 47 illustrated in FIG. 2 may be included in the first semiconductor integrated circuit (the first IC) 19, an external MPU, or the like. Further, for example, when the first semiconductor integrated circuit (the first IC) 19 and the second semiconductor integrated circuit (the second IC) 49 are implemented as one IC (a one-chip configuration), the detection signal may be transferred to the first semiconductor integrated circuit (the first IC) 19 on the first substrate 21 via, for example, a wire on the first substrate 21, a wire of the printed circuit board 71, or the like.

The source driver 13 is formed near the display region Ad on the first substrate 21. A plurality of sub pixels SPix which will be described later are arranged on the display region Ad in a matrix form. The frame region Gd is a region in which the sub pixel SPix is not arranged when the surface of the first substrate 21 is viewed in a vertical direction.

The display gate driver 12A, the detection gate driver 12B, and the first electrode driver 14 may be formed on the frame region Gd of the first substrate 21 using a thin film transistor (TFT) element. In the present embodiment, the two circuits of the display gate driver 12A and the detection gate driver 12B are installed, but the present invention is not limited thereto, and they may be implemented through, for example, one circuit installed on one side of the frame region Gd. The first electrode driver 14 is installed on one side of the frame region Gd on which the printed circuit board 71 is arranged, but the present invention is not limited thereto, and the first electrode driver 14 may be installed near the display gate driver 12A or the detection gate driver 12B. The first electrode driver 14 is configured with one circuit, but may be configured with two circuits.

Figure 6:
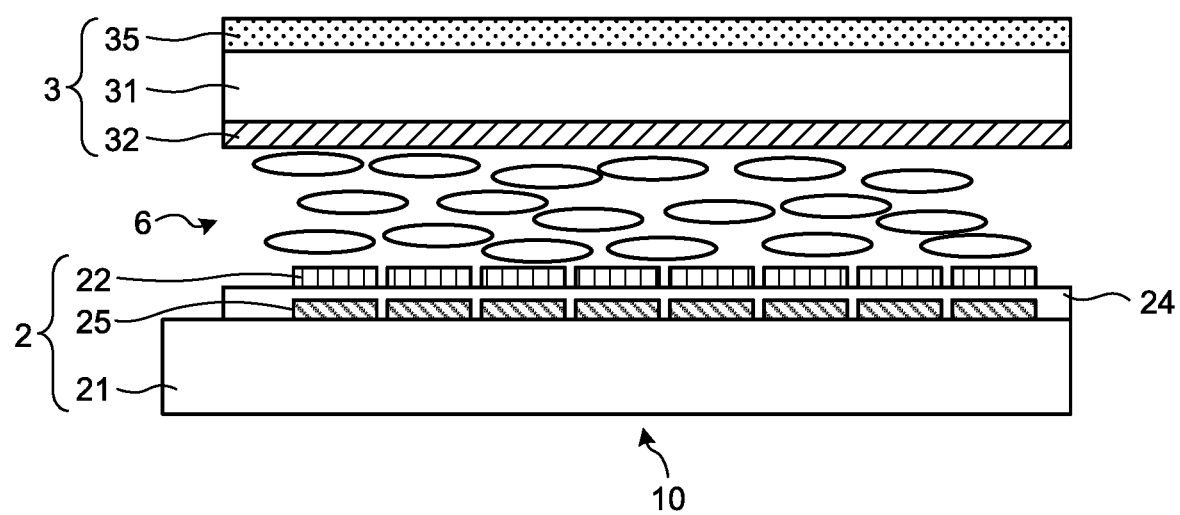
FIG. 6 is a cross-sectional view illustrating a schematic cross-sectional structure of a detection function-equipped display circuitry.

Next, an exemplary configuration of the detection function-equipped display circuitry 10 will be described in detail. FIG. 6 is a cross-sectional view illustrating a schematic cross-sectional structure of the detection function-equipped display circuitry. The detection function-equipped display circuitry 10 includes the pixel substrate 2, a counter substrate 3 arranged to face in a direction vertical to the surface of the pixel substrate 2, and a display function layer (for example, a liquid crystal layer 6) interposed between the pixel substrate 2 and the counter substrate 3 as illustrated in FIG. 6. In other words, the display function layer is arranged between the first substrate 21 and a second substrate 31. The display function layer may be configured as the pixel substrate 2. For example, the display function layer may be arranged between the first electrode 25 and a second electrode 22.

The pixel substrate 2 includes the first substrate 21 serving as a circuit substrate, a plurality of second electrodes (pixel electrodes) 22 arranged in a matrix form above the first substrate 21, a plurality of first electrodes (detection electrodes) 25 formed between the first substrate 21 and the second electrodes 22, and an insulating layer 24 that electrically insulates the first electrode 25 from the second electrode 22. A thin film transistor (TFT) is arranged on the first substrate 21. A polarizing plate (not illustrated) may be formed below the first substrate 21 with an adhesive layer interposed therebetween. For example, the first electrode 25 and the second electrode 22 are made of a transparent conductive material such as an indium tin oxide (ITO).

In the present embodiment, the first electrode 25, the insulating layer 24, and the second electrode 22 are stacked on the first substrate 21 in this order, but the present invention is not limited thereto. The second electrode 22, the insulating layer 24, and the first electrode 25 may be stacked on the first substrate 21 in this order, or the first electrode 25 and the second electrode 22 may be formed at the same layer with the insulating layer 24 interposed therebetween. Further, at least one of the first electrode 25 and the second electrode 22 may be arranged above the second substrate 31.

The counter substrate 3 includes the second substrate 31 and a color filter 32 formed on one surface of the second substrate 31. Further, a polarizing plate 35 is formed above the second substrate 31 with an adhesive layer interposed between. The color filter 32 may be arranged on the first substrate 21. In the present embodiment, the first substrate 21 and the second substrate 31 may be, for example, a glass substrate or a resin substrate.

The liquid crystal layer 6 is formed between the first substrate 21 and the second substrate 31. The liquid crystal layer 6 modulates light passing through the liquid crystal layer 6 according to a state of an electric field, and a liquid crystal of a horizontal electric field mode such as fringe field switching (FFS) or in-plane switching (IPS) is used. Further, an orientation film may be arranged between the liquid crystal layer 6 and the pixel substrate 2 and between the liquid crystal layer 6 and the counter substrate 3 illustrated in FIG. 6.

A lighting circuitry (not illustrated) is formed below the first substrate 21. For example, the lighting circuitry includes a light source such as an LED and radiates light from the light source toward the first substrate 21. The light from the lighting circuitry passes through the pixel substrate 2, and a portion to which light is shielded and not emitted and a portion to which light is emitted are switched according to the state of the liquid crystal at the position, and thus an image is displayed on the display surface. In the case of a reflective liquid crystal display device in which a reflective electrode that reflects light incident from the second substrate 31 side is formed as the second electrode 22, and the transparent first electrode 25 is formed on the counter substrate 3 side, the lighting circuitry may not be formed below the first substrate 21. In the reflective liquid crystal display device, a front light may be installed above the second substrate 31. In this case, the light incident from the second substrate 31 side is reflected by the reflective electrode (the second electrode 22), passes through the second substrate 31, and arrives at the eyes of an observer. Further, when an organic EL display panel is used as the display panel 20 (see FIG. 1), a light-emitting element is formed for each sub pixel SPix, and an image is displayed by controlling a light emission amount of the light emitting element, and thus it is unnecessary to form the lighting circuitry. Further, when the organic EL display panel is used as the display panel 20, the display function layer may be included in the pixel substrate 2. For example, a light emitting layer which is the display function layer may be arranged between the first electrode and the second electrode.

Figure 7:
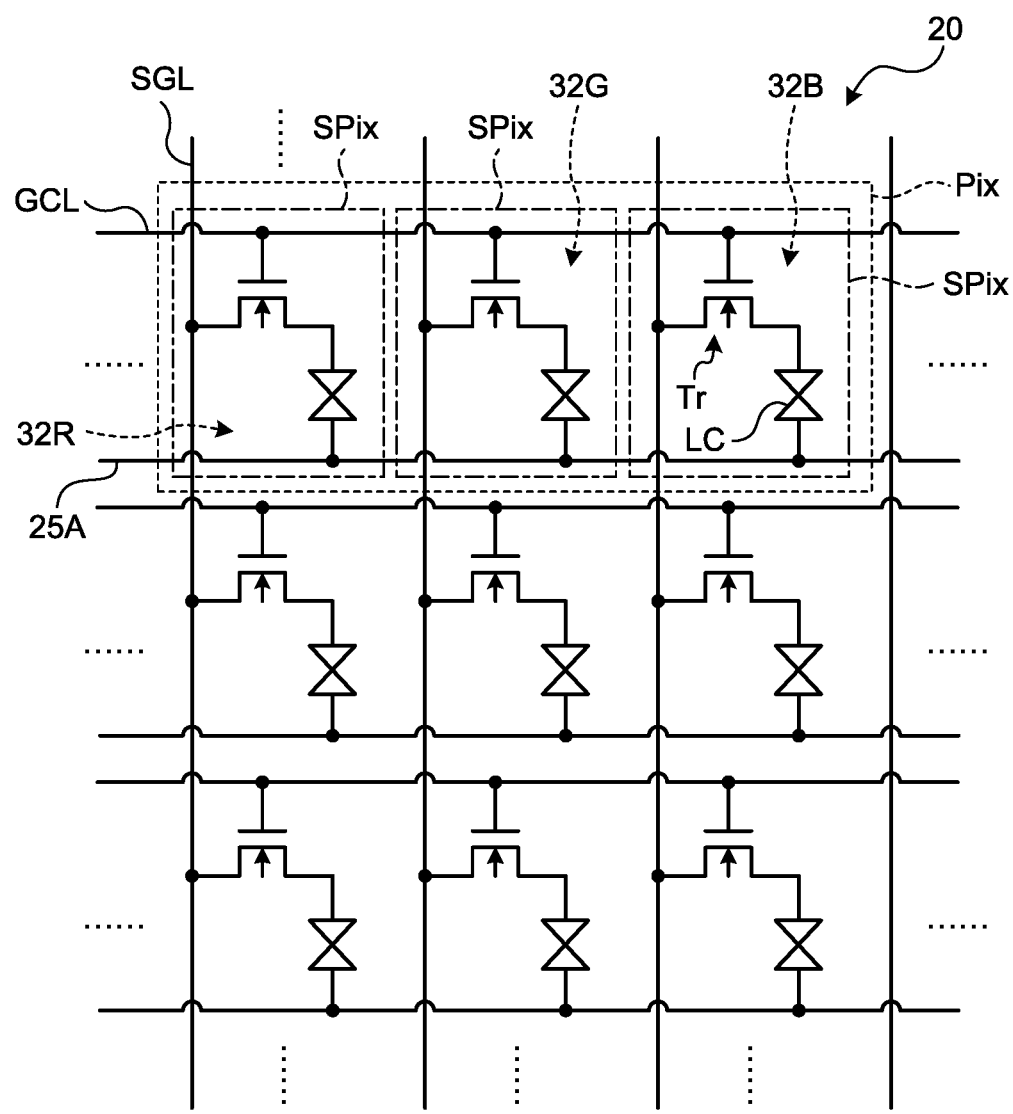
FIG. 7 is a circuit diagram illustrating a pixel array of a detection function-equipped display circuitry according to the first embodiment.

FIG. 7 is a circuit diagram illustrating a pixel array of the detection function-equipped display circuitry according to the first embodiment. Switching elements Tr of each of the sub pixels SPix illustrated in FIG. 7 and wires such as data lines SGL used to supply the pixel signal Vpix to the second electrodes 22, and gate lines GCL used to drive the switching elements Tr are formed on the first substrate 21 illustrated in FIG. 6. The data lines SGL and the gate lines GCL extend to a plane parallel to the surface of the first substrate 21.

The display panel 20 illustrated in FIG. 7 includes a plurality of sub pixels SPix arranged in a matrix form. Each of the sub pixel SPix includes the switching element Tr and a liquid crystal element LC. The switching element Tr is configured with a TFT, and in this example, the switching element Tr is configured with an n-channel metal oxide semiconductor (MOS) TFT. One of a source and a drain of the switching element Tr is coupled to the data line SGL, a gate of the switching element Tr is coupled to the gate line GCL, and the other of the source and the drain is coupled to one end of the liquid crystal element LC. The second electrode 22 (not illustrated in FIG. 7) is coupled to the other of the source and the drain of the switching element Tr, and the liquid crystal element LC is coupled with the switching element Tr through the second electrode 22. One end of the liquid crystal element LC is coupled to the other of the source and the drain of the switching element Tr, and the other end of the liquid crystal element LC is coupled to a selection electrode block 25A. The selection electrode block 25A includes a plurality of first electrodes 25 corresponding to one horizontal line of the sub pixels SPix. Further, the sub pixel SPix is driven according to the electric charges applied to the first electrode 25 and the second electrode 22.

The sub pixel SPix is coupled with other sub pixels SPix belonging to the same row in the display panel 20 through the gate line GCL. The gate line GCL is coupled with the display gate driver 12A (see FIG. 1), and the display gate driver 12A supplies the display scanning signal Vscan to the gate line GCL. Further, the sub pixel SPix is coupled with other sub pixels SPix belonging to the same column in the display panel 20 through the data line SGL. The data line SGL is coupled with the source driver 13 (see FIG. 1), and the source driver 13 supplies the pixel signal Vpix to the data line SGL. The first electrode 25 (common electrode) is coupled with the first electrode driver 14 (see FIG. 1), and the first electrode driver 14 supplies the display drive signal Vcom to the first electrode 25. The display drive signal Vcom is a direct current (DC) voltage signal for applying a common potential to a plurality of sub pixels SPix. In this example, a plurality of sub pixels SPix belonging to the same row share one selection electrode block 25A.

In the present embodiment, the example in which the extension direction of the selection electrode block 25A is parallel to the extension direction of the gate line GCL has been described, but the present invention is not limited thereto. The extension direction of the selection electrode block 25A may be parallel to the extension direction of the data line SGL. In this case, a plurality of sub pixels SPix belonging to the same column share one selection electrode block 25A, and the first electrode driver 14 is arranged on any one edge in the extension direction of the data line SGL on the display panel 20.

The display gate driver 12A illustrated in FIG. 1 is driven to sequentially scan the gate lines GCL. The display scanning signal Vscan is applied to the gates of the switching elements Tr of the sub pixels SPix via the gate line GCL, and one horizontal line of the sub pixels SPix are sequentially selected as a display drive target. Further, in the display device 1, the source driver 13 supplies the pixel signal Vpix to the sub pixels SPix belonging to one horizontal line, and thus display for each horizontal line is performed. When the display operation is performed, the first electrode driver 14 applies the display drive signal Vcom to the selection electrode block 25A corresponding to at least one horizontal line. The first electrode driver 14 may apply the display drive signal Vcom to a plurality of first electrodes 25 (the common electrodes) of the selection electrode block 25A corresponding to one horizontal line to which the display scanning signal Vscan is applied or all the first electrodes 25 of the entire display region Ad.

The color filter 32 illustrated in FIG. 6 includes, for example, color regions 32R, 32G, and 32B which are colored in red (R), green (G), and blue (B) and periodically arranged. The color regions 32R, 32G, and 32B of three colors of R, G, and B are associated with each sub pixel SPix illustrated in FIG. 7 as one set, and the color regions 32R, 32G, and 32B constitute a pixel Pix as one set. The color filter 32 faces the liquid crystal layer 6 in the direction vertical to the first substrate 21 as illustrated in FIG. 6. The color filter 32 may have any other color combination as long as they are colored in different colors. The color filter 32 is not limited to a combination of three colors and may have a combination of four or more colors. Further, the detection function-equipped display circuitry 10 may not include the color filter 32, performing monochrome display.

Figure 8:
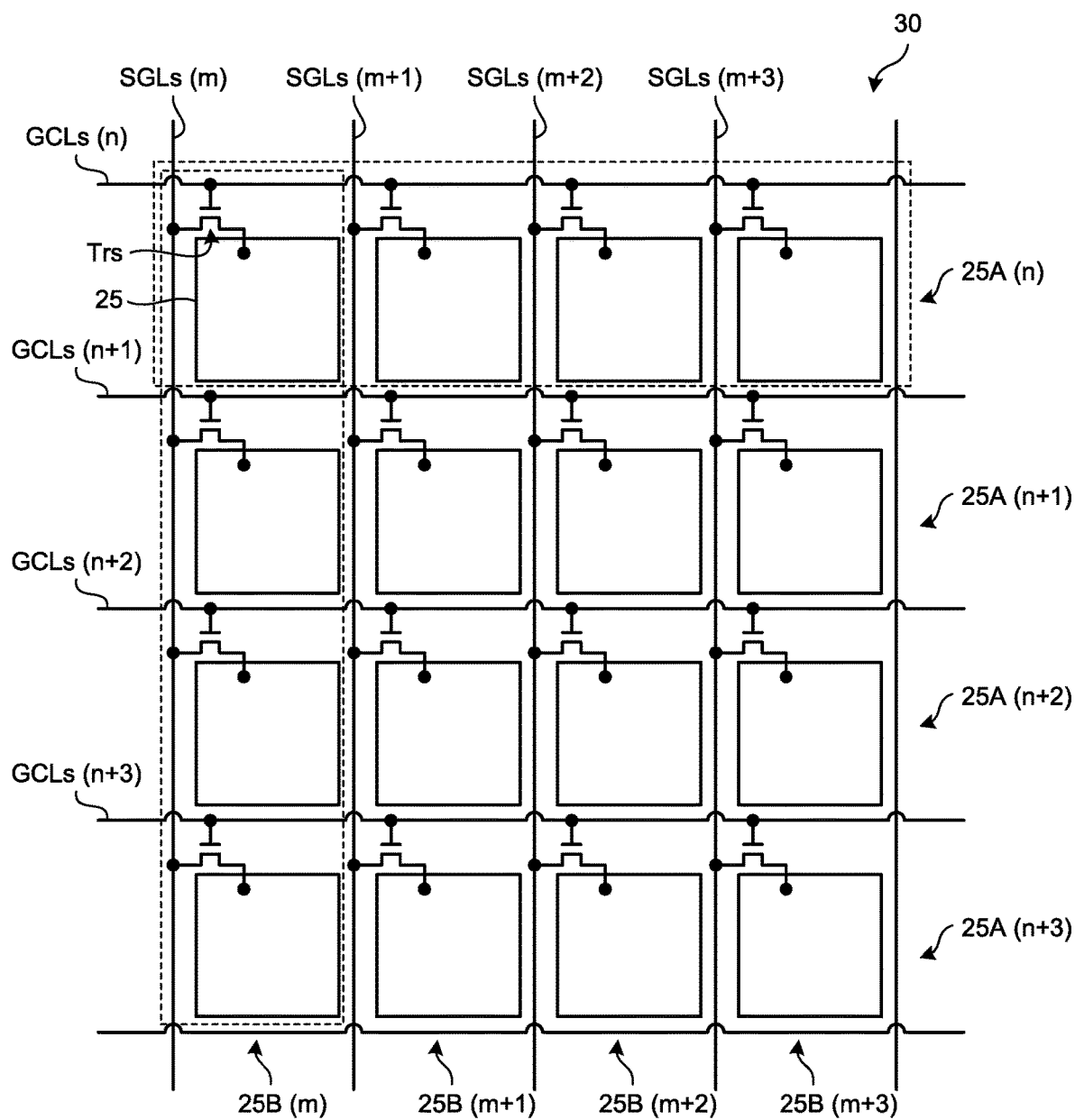
FIG. 8 is a circuit diagram illustrating an array of first electrodes of a detector according to the first embodiment.

The first electrode 25 illustrated in FIGS. 6 and 7 functions as the common electrode that applies the common potential to a plurality of sub pixels SPix in the display panel 20, and functions as a detection electrode when the touch detection of the detector 30 is performed. FIG. 8 is a circuit diagram illustrating an arrangement of the first electrodes of the detector according to the first embodiment.

The detector 30 illustrated in FIG. 8 includes the first electrodes 25 which are arranged in a matrix form on the first substrate 21 (see FIG. 6). One first electrode 25 (one detection electrode) may be arranged corresponding to one sub pixel SPix, or one first electrode 25 may be arranged corresponding to a plurality of sub pixels SPix. Each of the first electrodes 25 includes a detection switching element Trs. The detection switching element Trs is configured with a TFT, and in this example, the detection switching element Trs is configured with an re-channel metal oxide semiconductor (MOS) TFT. A detection gate lines GCLs extends in a row direction, and a plurality of detection gate lines GCLs are arranged in a column direction. A detection data line SGLs extends in the column direction, and a plurality of detection data lines SGLs are arranged in the row direction. The first electrode 25 is formed in a region surrounded by the detection gate lines GCLs and the detection data lines SGLs. The detection switching element Trs is formed near a crossing point of the detection gate line GCLs and the detection data line SGLs, and a plurality of detection switching elements Trs are formed corresponding to each of the first electrodes 25.

The detection switching element Trs may be formed on the same layer above the first substrate 21 as the switching element Tr illustrated in FIG. 7 or may be formed on a different layer. The detection gate line GCLs extends in a direction parallel to the gate line GCL illustrated in FIG. 7, and the detection data line SGLs extends in a direction parallel to the data line SGL illustrated in FIG. 7. The detection gate line GCLs may be formed on the same layer as or a different layer from the gate line GCL. The detection data line SGLs may be formed on the same layer as or a different layer from the gate line GCL.

A source of the detection switching element Trs is coupled to the detection data line SGLs, a gate is coupled to the detection gate line GCLs, and a drain is coupled to the first electrode 25. Here, an electrode block including a plurality of first electrodes 25 coupled to the common detection gate line GCLs is referred to as the selection electrode block 25A, and an electrode block including a plurality of first electrodes 25 coupled to the common detection data line SGLs is referred to as a detection electrode block 25B. The detection data line SGLs and the detection electrode block 25B arranged in an m-th column are respectively denoted by a detection data line SGLs(m) and a detection electrode block 25B(m), and the detection gate line GCLs and the selection electrode block 25A arranged in an n-th row are respectively denoted by a detection gate line GCLs(n) and a selection electrode block 25A(n) as illustrated in FIG. 8.

The detection gate driver 12B illustrated in FIG. 1 is a selection driver that performs driving such that one or more detection gate lines GCLs are selected. The detection scanning signal Vscans is applied to the gate of the detection switching element Trs via the selected detection gate line GCLs, and one or more selection electrode blocks 25A are selected as the detection target. Further, the first electrode driver 14 (see FIG. 1) supplies the detection drive signal Vs to the first electrodes 25 belonging to the selection electrode block 25A via the detection data line SGLs. Then, the first electrodes 25 belonging to the detection electrode block 25B output the detection signal Vdet according to a change in the capacitance of the first electrodes 25 to the signal processor 40 via the detection data line SGLs. The first electrode 25 of the present embodiment corresponds to the detection electrode E1 in the basic principle of the touch detection of the self-capacitance scheme, and the detector 30 can detect the finger that touches or approaches according to the basic principle of the touch detection of the self-capacitance scheme.

Figure 9:
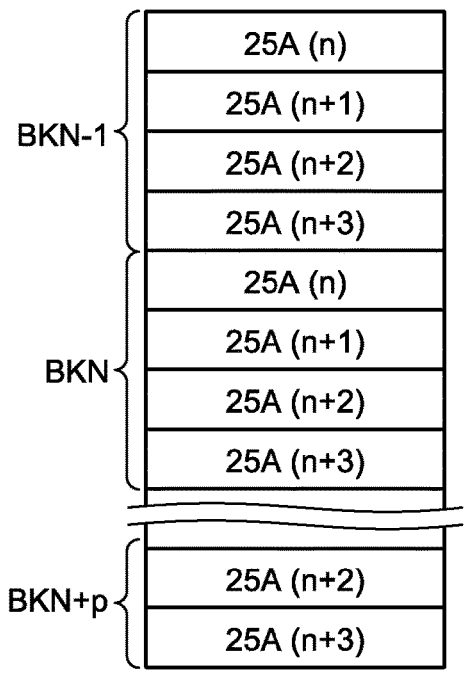
FIG. 9 is a schematic diagram illustrating an example of a detection operation.

FIG. 9 is a schematic diagram illustrating an example of the detection operation. A first electrode block BKN includes, for example, four selection electrode blocks 25A, and a plurality of first electrode block BKN−1, BKN, . . . , and BKN+p are arranged in the column direction. The detection gate driver 12B sequentially selects a plurality of first electrode block BKN−1, BKN, . . . , and BKN+p, and the selection electrode blocks 25A of a plurality of selected first electrode block BKN−1, BKN, . . . , and BKN+p are supplied with the detection drive signal Vs. The first electrode blocks BKN−1, BKN, . . . , and BKN+p which are not selected are supplied with no voltage signal and are in the floating state in which a potential is not fixed. A voltage signal having the same potential as the detection drive signal Vs may be supplied to some non-selected electrode blocks in order to reduce an additional capacitance between the selected first electrode blocks and the non-selection first electrode blocks.

The detection operation is performed by sequentially selecting a plurality of first electrode block BKN−1, BKN, . . . , and BKN+p, and thus detection of the whole of one detection surface is performed. Each of the first electrode blocks BKN−1, BKN, . . . , and BKN+p includes four selection electrode blocks 25A, but the number of selection electrode blocks 25A is not limited to four, and two, three, or five or more selection electrode blocks 25A may be included in each of the first electrode blocks BKN−1, BKN, . . . , and BKN+p. Further, the detection gate driver 12B may sequentially scan the selection electrode block 25A row by row. The first electrode blocks BKN−1, BKN, . . . , and BKN+p may be arranged such that some selection electrode blocks 25A overlap. Further, a plurality of first electrode blocks BKN−1, BKN, . . . , and BKN+p are not limited to the configuration in which they are arranged in the column direction and may be arranged in a matrix form.

As an example of an operation method of the display device 1, the display device 1 may perform the display operation (display period) and the touch detection operation (detection period) in a time division manner. The touch detection operation and the display operation may be divided by any method, but a method of dividing the touch detection operation and the display operation into two or more in one frame period (1F) of the display panel 20, that is, a period of time required for displaying video information corresponding to one screen will be described below.

Figure 10:
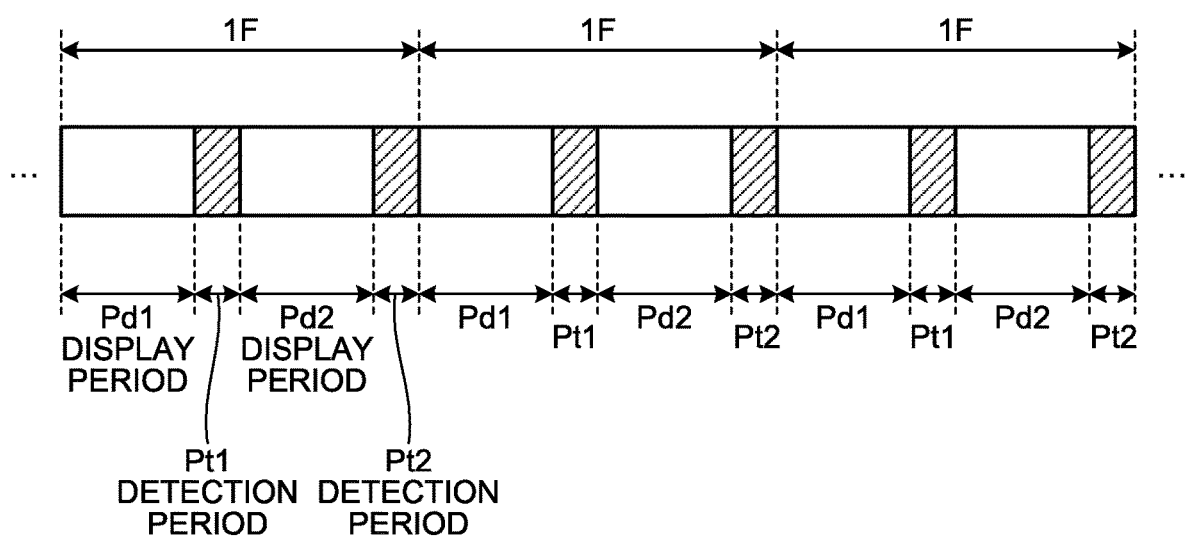
FIG. 10 is a schematic diagram illustrating an example of an arrangement of a display period and a detection period.

FIG. 10 is a schematic diagram illustrating an example of an arrangement of a display period and a detection period. One frame period (1F) includes two display periods Pd1 and Pd2 and two detection periods Pt1 and Pt2, and the periods are alternately arranged on a time axis such that the display period Pd1, the detection period Pt1, the display period Pd2, and the detection period Pt2 are arranged in the described order.

The controller 11 (see FIG. 1) supplies the pixel signal Vpix to a plurality of rows of sub pixels SPix (see FIG. 7) selected in each of the display periods Pd1 and Pd2 via the display gate driver 12A and the source driver 13.

Further, the controller 11 (see FIG. 1) supplies the detection drive signal Vs for the touch detection to the first electrodes 25 selected in each of the detection periods Pt1 and Pt2 by the first electrode driver 14. The signal processor 40 performs determination of the presence or absence of the touch input and a calculation of coordinates of an input position based on the detection signal Vdet supplied from the first electrode 25.

In the present embodiment, since the first electrode 25 doubles as the common electrode of the display panel 20, the controller 11 supplies the display drive signal Vcom which is a potential of the common electrode for display to the first electrodes 25 of the selection electrode block 25A selected through the first electrode driver 14 in the display periods Pd1 and Pd2.

In FIG. 10, video display corresponding to one screen are performed twice in one frame period (1F), but more display periods may be set in one frame period (1F). More detection periods may be set in one frame period (1F).

In each of the detection periods Pt1 and Pt2, the touch detection for half of one detection surface may be performed, and the touch detection for one screen may be performed. In one of the detection periods Pt1 and Pt2, the touch detection for one first electrode block among the first electrode blocks BKN−1, BKN, . . . , and BKN+p may be performed. Further, thinned-out detection or the like may be performed as necessary. Further, the display operation and the touch detection operation of one frame period (1F) may not be performed twice or more but may be performed once.

In the detection periods Pt1 and Pt2, the gate line GCL and the data line SGL (see FIG. 7) for display may be supplied with no voltage signal and be in the floating state in which a potential is not fixed. The gate line GCL and the data line SGL for display may be supplied with a signal having the same waveform synchronized with the detection drive signal Vs. Thus, parasitic capacitance between the first electrode 25 of the detection target and the gate line GCL and parasitic capacitance between the first electrode 25 and the data line SGL are reduced, and thus it is possible to suppress the occurrence of detection error or a reduction in detection sensitivity.

Figure 11:
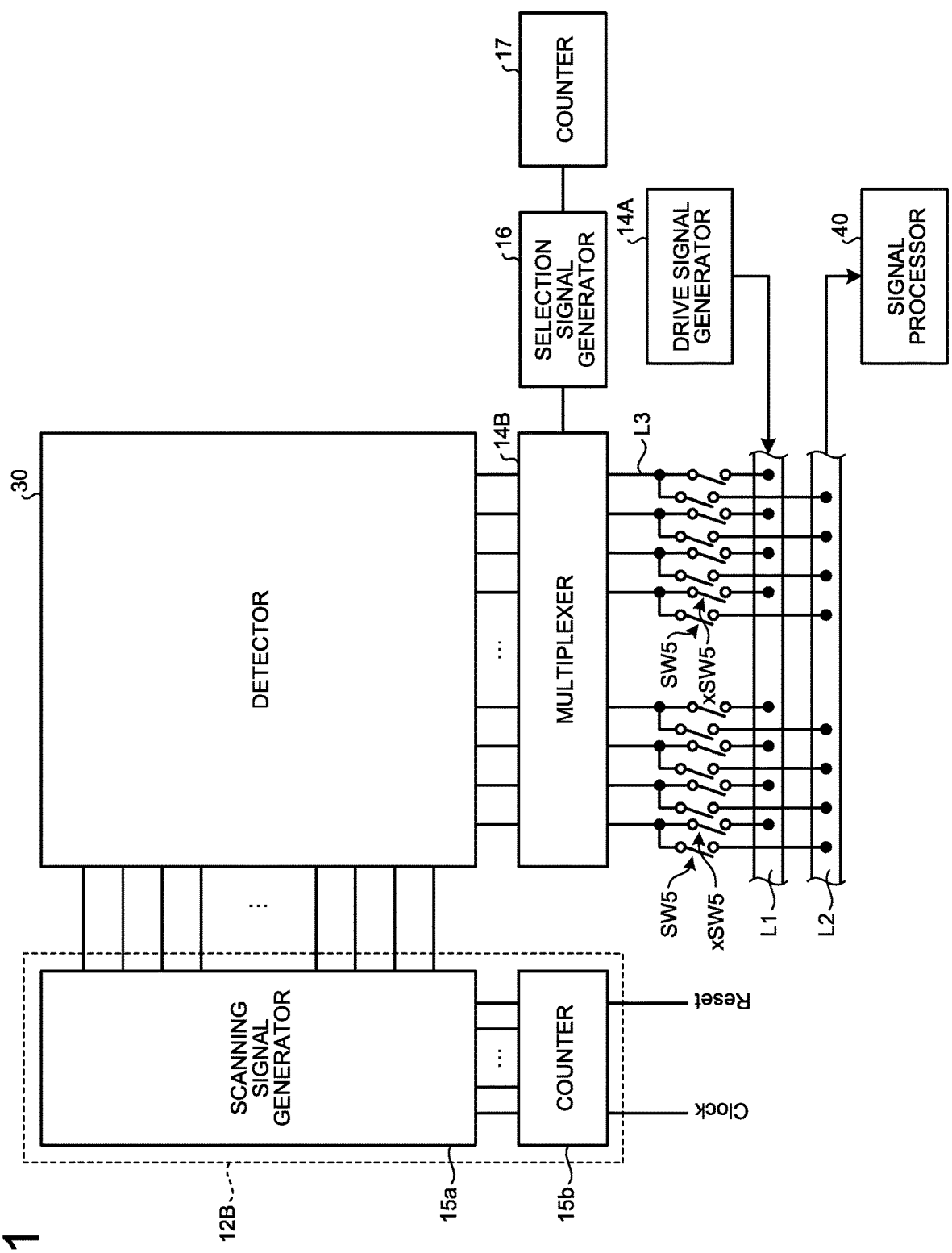
FIG. 11 is a block diagram illustrating an exemplary configuration of a drive circuit according to the first embodiment.

Next, an example of code division selection driving of the detector 30 of the present embodiment will be described. FIG. 11 is a block diagram illustrating an exemplary configuration of the drive circuit according to the first embodiment. The detection gate driver 12B includes a scanning signal generator 15a and a counter 15b as illustrated in FIG.

11. The counter 15b supplies a timing control signal for controlling a timing for selecting the detection gate line GCLs to the scanning signal generator 15a based on a clock signal supplied from the controller 11. The scanning signal generator 15a generates the detection scanning signal Vscans and supplies the detection scanning signal Vscans to the selected detection gate line GCLs based on the timing control signal supplied from the counter 15b. The scanning signal generator 15a may sequentially select the detection gate line GCLs or may simultaneously select a plurality of detection gate lines GCLs.

In the detection gate driver 12B, a reset signal Reset is supplied at the timing when for example the detection period Pt described above ends, and the scanning signal generator 15a and the counter 15b are reset.

A multiplexer 14B is coupled to the detector 30 as illustrated in FIG. 11. The multiplexer 14B couples the first electrode 25 with a drive signal generator 14A via the detection data line SGLs (see FIG. 8), and couples the first electrode 25 with the signal processor 40. A selection signal generator 16 generates a selection signal for selecting the first electrode 25 of the detection target based on a predetermined code which will be described later. A counter 17 outputs a timing control signal for controlling a timing for selecting the first electrode 25 of the detection target based on the clock signal supplied from the controller 11 to the selection signal generator 16. The selection signal generator 16 outputs the selection signal to the multiplexer 14B based on the timing control signal output from the counter 17. The multiplexer 14B enters a coupling state with the first electrode 25 serving as the detection target via the detection data line SGLs (see FIG. 8) based on the selection signal, and disconnects a coupling with the first electrode 25 which is not the detection target. As described above, the multiplexer 14B selects the first electrode 25 as the detection target.

The drive signal generator 14A supplies the detection drive signal Vs to the selected detection data line SGLs via the multiplexer 14B. The first electrodes 25 selected as the detection target are sequentially or simultaneously supplied with the detection drive signal Vs via the detection data line SGLs. Further, an output signal Sh output from the first electrode 25 is output to the signal processor 40 via the multiplexer 14B. It is possible to simplify a configuration of switching the coupling with the first electrode 25, the drive signal generator 14A, and the signal processor 40 through the multiplexer 14B. The supply of the detection drive signal Vs and the output of the output signal Sh can be switched by, for example, switch elements SW5 and xSW5. When switch element SW5 is turned in (opened), the switch element xSW5 is turned off (closed), and the output signal Sh is output to the signal processor 40 via wires L2 and L3. When the switch element SW5 is turned off (closed), the switch element xSW5 is turned on (opened), and the detection drive signal Vs is supplied to the first electrode 25 of the detection target via the wires L1 and L3. In the present embodiment, the wires L2 and L3 correspond to an output signal line which outputs the output signal Sh.

The multiplexer 14B, the switch elements SW5 and xSW5, the wires L1, L2, L3, the selection signal generator 16, the counter 17, and the drive signal generator 14A may be included in the first electrode driver 14 and the controller 11 illustrated in FIG. 1. For example, the first electrode driver 14 may function as the multiplexer 14B, the switch elements SW5 and xSW5, the wires L1, L2, and L3, and the controller 11 may function as the selection signal generator 16 and the counter 17. The multiplexer 14B, the switch elements SW5 and xSW5, and the wires L1, L2, and L3 are installed above the first substrate 21. Further, the drive signal generator 14A and the multiplexer 14B may be included in the first electrode driver 14, but may be included in a circuit formed separately from the first electrode driver 14. The multiplexer 14B corresponds to a "selective coupling circuitry" of the present invention.

The detector 30 of the present embodiment selects the first electrode 25 serving as the detection target for the second electrode block BKNB (n) based on a predetermined code. Specifically, the multiplexer 14B couples the first electrode 25 selected as the detection target with the drive signal generator 14A. Accordingly, the detection drive signal Vs is supplied to the first electrode 25 selected as the detection target. Further, the detection signal is output from each of the first electrodes 25 based on a change in capacitance of the selected first electrode 25. A signal obtained by integrating the detection signals of the respective first electrodes 25 is output to the signal processor 40 as an output signal via the multiplexer 14B.

Figure 12:
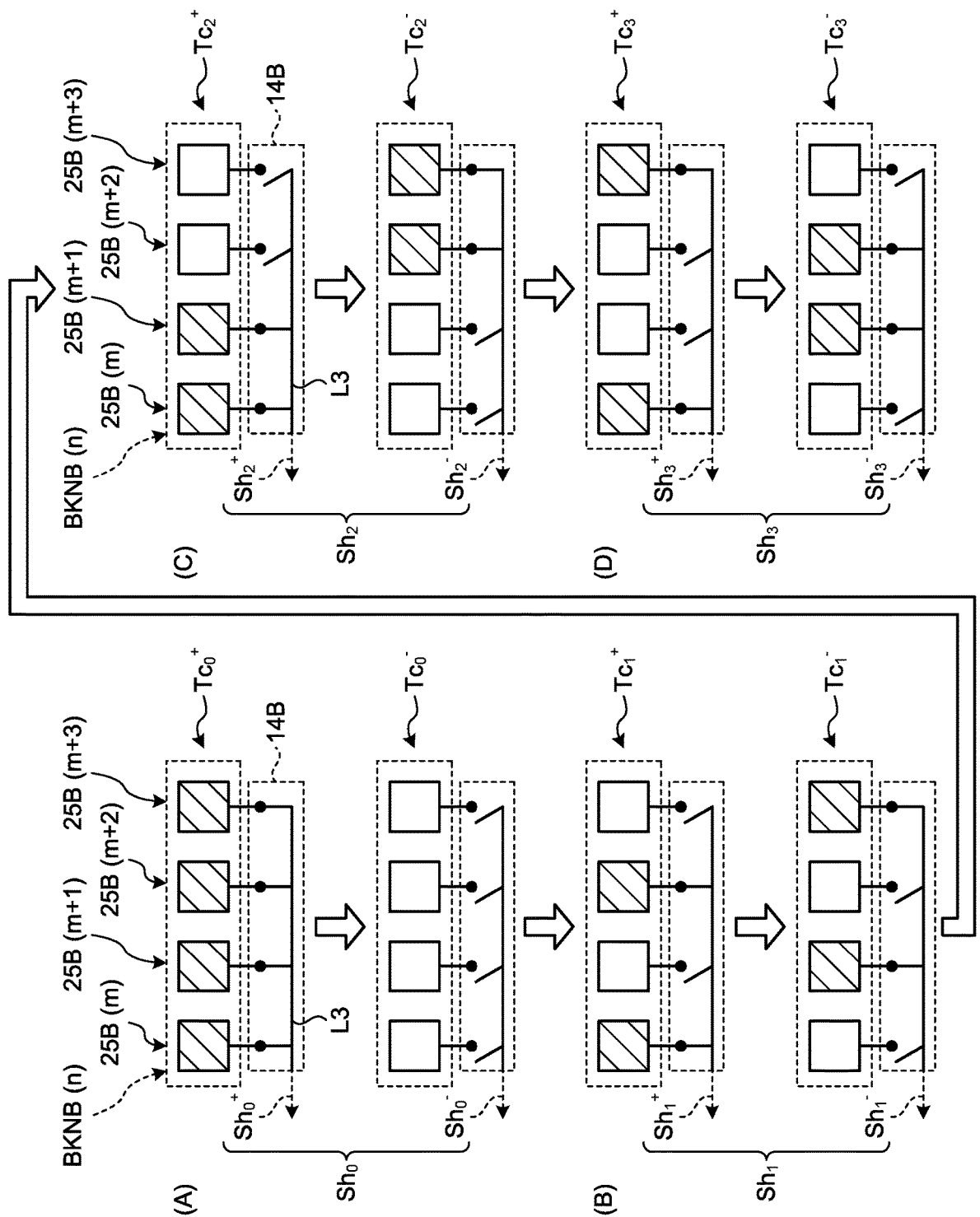
FIG. 12 is an explanatory diagram for describing a selection pattern of first electrodes selected as a detection target.

FIG. 12 is an explanatory diagram for describing a selection pattern of the first electrodes selected as the detection target. FIG. 12(A) illustrates a selection pattern of the first electrodes of a first detection operation $Tc_0$, FIG. 12(B) illustrates a selection pattern of the first electrodes of a second detection operation $Tc_1$, FIG. 12(C) illustrates a selection pattern of the first electrodes of a third detection operation $Tc_2$, and FIG. 12(D) illustrates a selection pattern of the first electrodes of a fourth detection operation $Tc_3$.

In FIG. 12, one second electrode block BKNB(n) will be described. The second electrode block BKNB(n) includes a plurality of first electrodes 25 coupled to the multiplexer 14B via the common wire L3. The second electrode block BKNB(n) includes four first electrodes 25 arranged in the row direction, and the four first electrodes 25 correspond to detection electrode blocks 25B(m), 25B(m+1), 25B(m+2), 25B(m+3). Further, the four first electrodes 25 are coupled to the common detection gate line GCLs(n) (see FIG. 8).

Here, a signal value corresponding to a detection signal output from each of the first electrodes 25 is indicated by $Si_q$. The signal value obtained by integrating the signal values $Si_q$ of the first electrodes 25 selected by the selection signal from the second electrode block BKNB(n) via the multiplexer 14B is output as an output signal $Sh_p$. The output signal $Sh_p$ is indicated by the following Formula (1). In other words, the output signal $Sh_p$ is indicated by a sum of signal values $Si_q$ outputted from a plurality of first electrodes 25.

$$Sh_p = \sum_{q=0}^{Q-1} H_h Si_q \qquad (1)$$

The switch elements SW5 and xSW5, the wires L1 and L2, the selection signal generator 16, the counter 17, and the drive signal generator 14A of FIG. 11 are not illustrated in FIG. 12. In FIG. 12, the output signal Sh is output to the signal processor 40 via the wires L2 and L3, and the detection drive signal Vs is supplied to the first electrode 25 of the detection target via the wires L1 and L3 as described above with reference to FIG. 11.

Here, $Si_q$ indicates a signal value corresponding to a detection signal from each of the first electrodes 25 of the detection electrode block 25B(m), 25B(m+1), 25B(m+2), and 25B(m+3). $Si_q$ indicates a signal value which is output based on the capacitance C1 of the detection electrode E1 or the capacitance C1+C2 (see FIG. 4) obtained by adding the capacitance C2 caused by the touch or the approach of the finger or the like to the capacitance C1 of the detection electrode E1 in the basic principle of the touch detection of the self-capacitance scheme. $Sh_p$ is the output signal of the second electrode block BKNB(n) and indicates a value obtained by calculating the output signal of the selected first electrode 25 based on a predetermined code in the second electrode block BKNB(n). For example, the predetermined code is defined by a square matrix $H_h$ of the following Formula (2). The square matrix $H_h$ is a Hadamard matrix and indicates a square matrix in which "1" or "−1" is an element, and arbitrary two different rows are orthogonal matrices.

$$H_h = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (2)$$

An order of the square matrix $H_h$ is the number of the first electrodes 25 included in the second electrode block BKNB (n), that is, 4 which is the number of four detection electrode blocks 25B. In the present embodiment, the second electrode block BKNB(n) including the four first electrodes 25 will be described, but the present invention is not limited thereto, and the number of first electrodes 25 included in the second electrode block BKNB(n) may be two, three, or five or more. In this case, the order of the square matrix $H_h$ also changes according to the number of first electrodes 25 selectively controlled by the multiplexer 14B.

The first electrodes 25 corresponding to the square matrix $H_h$ correspond to a plurality of second electrode blocks BKNB(n), BKNB(n+1), BKNB(n+2), and the like. The detection of the whole of one detection surface is performed by sequentially performing the detection operation on the second electrode blocks BKNB(n), BKNB(n+1), BKNB(n+2), and the like based on the square matrix $H_h$. The second electrode blocks BKNB(n), BKNB(n+1), BKNB(n+2), and the like may be arranged to overlap some of the first electrodes 25. In other words, the detection operation may be performed on eight columns of first electrodes 25 twice based on the four square matrices $H_h$, or the detection operation may be duplicatedly performed some of the first electrodes 25 twice based on the five square matrices. The second electrode blocks BKNB(n), BKNB(n+1), BKNB(n+ 2), and the like are not limited to the configuration arranged in the column direction but may be arranged in a matrix form. The present invention is not limited to the configuration including a plurality of second electrode blocks BKNB, and the number of second electrode blocks BKNB may be one.

An example of the code division selection driving in which the detection operation is divided into four, that is, the first detection operation $Tc_0$, the second detection operation $Tc_1$, the third detection operation $Tc_2$, and the fourth detection operation $Tc_3$ as illustrated in FIG. 12 will be described. In the first detection operation $Tc_0$ illustrated in FIG. 12(A), the first electrodes 25 are selected according to the selection signals corresponding to the first row of the square matrix $H_h$. In the second detection operation $Tc_1$ illustrated in FIG. 12(B), the first electrodes 25 are selected according to the selection signals corresponding to the square matrix $H_h$ of the second row. In the third detection operation $Tc_2$ illustrated in FIG. 12(C), the first electrodes 25 are selected according to the selection signals corresponding to the square matrix $H_h$ of the third row. In the fourth detection operation $Tc_3$ illustrated in FIG. 12(D), the first electrodes 25 are selected according to the selection signals corresponding to the square matrix $H_h$ of the fourth row.

The first detection operation $Tc_0$, the second detection operation $Tc_1$, the third detection operation $Tc_2$, and the fourth detection operation $Tc_3$ respectively include positive sign selection operations $Tc_0^+$, $Tc_1^+$, $Tc_2^+$, and $Tc_3^+$ and negative sign selection operations $Tc_0^-$, $Tc_1^-$, $Tc_2^-$, and $Tc_3^-$. In the positive sign selection operations $Tc_0^+$, $Tc_1^+$, $Tc_2^+$, and $Tc_3^+$, the first electrodes 25 of a first detection target in the second electrode block BKNB(n) are selected according to a first selection signal corresponding to an element "1" of the square matrix $H_h$. In FIG. 12, the selected first electrodes 25 are hatched. A first output signal $Sh_p^+$ (p=0, 1, 2, 3) is output from the first electrodes 25 of the first detection target via the multiplexer 14B. Here, the first output signal $Sh_p^+$ is a signal which is obtained by integrating the detection signals of the first electrodes 25 of the first detection target included in the second electrode block BKNB(n).

In the negative sign selection operations $Tc_0^-$, $Tc_1^-$, $Tc_2^-$, and $Tc_3^-$, the first electrodes 25 of a second detection target which are not included in the first detection target among the second electrode block BKNB(n) are selected according to a second selection signal corresponding to an element "−1" of the square matrix $H_h$. The second output signal $Sh_p^-$ (p=0, 1, 2, 3) is output from the first electrodes 25 of this second detection target via the multiplexer 14B. Here, the second output signal $Sh_p^-$ is an output signal which is obtained by integrating the detection signals of the first electrodes 25 of the second detection target included in the second electrode block BKNB(n). In the present embodiment, the positive sign selection operation $Tc_p^+$ (p=0, 1, 2, 3) and the negative sign selection operation $Tc_p^-$ (p=0, 1, 2, 3) are executed in the time division manner. Thus, since the output signals is output to one voltage detection circuit DET (see FIGS. 3 and 4) in the time division manner, the configuration of the signal processor 40 can be simplified.

The signal operation circuitry 44 of the signal processor 40 (see FIG. 2) obtains the third output signal $Sh_p = Sh_p^+ - Sh_p^-$ by calculating a difference between the first output signal $Sh_p^+$ and the second output signal $Sh_p^-$. The signal operation circuitry 44 outputs the third output signal $Sh_p$ to the storage 47 and temporarily stores the third output signal $Sh_p$ in the storage 47. The first output signal $Sh_p^+$ and the second output signal $Sh_p^-$ correspond to the detection signal Vdet in the basic principle of the touch detection of the self-capacitance scheme when first electrodes selected on the basis of the selection signal correspond to the electrode E1 in the basic principle of the touch detection of the self-capacitance scheme.

When the order of the square matrix $H_h$ is 4, four output signals ($Sh_0$, $Sh_1$, $Sh_2$, and $Sh_3$) are obtained from one second electrode block BKNB(n) as indicated in following Formula (3). In this case, the third output signals ($Sh_0$, $Sh_1$, $Sh_2$, and $Sh_3$) are respectively obtained from the four first output signals $Sh_0^+$, $Sh_1^+$, $Sh_2^+$, and $Sh_3^+$ and the four second output signals $Sh_0^-$, $Sh_1^-$, $Sh_2^-$, and $Sh_3^-$.

$$\begin{pmatrix} Sh_0 \\ Sh_1 \\ Sh_2 \\ Sh_3 \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Si_0 \\ Si_1 \\ Si_2 \\ Si_3 \end{pmatrix} \quad (3)$$

An example in which the detection signal values detected from each first electrode 25 of the second electrode block BKNB(n) are $(Si_0, Si_1, Si_2, $ and $Si_3)=(1, 7, 3,$ and $2)$ will be described below. The detection signal $Si_0$ is a detection signal of the first electrode 25 corresponding to the detection electrode block 25B(m). The detection signal $Si_1$ is a detection signal of the first electrode 25 corresponding to the detection electrode block 25B(m+1). The detection signal $Si_2$ is a detection signal of the first electrode 25 corresponding to the detection electrode block 25B(m+2). The detection signal $Si_3$ is a detection signal of the first electrode 25 corresponding to the detection electrode block 25B(m+3).

In the positive sign selection operation $Tc_0^+$ of the first detection operation $Tc_0$, the four first electrodes 25 are selected as the first detection target corresponding to the elements "1" in the first row of square matrix $H_h$ as illustrated in FIG. 12(A). The four first electrodes 25 are coupled to the multiplexer 14B. The first output signal $Sh_0^+$ is $Sh_0^+=1\times1+1\times7+1\times3+1\times2=13$ from Formula (3). In the negative sign selection operation $Tc_0^-$, since there is no element "−1" in the first row of the square matrix $H_h$, the first electrode 25 is not selected as the second detection target corresponding to the element "−1." In other words, the four first electrodes 25 are disconnected from the multiplexer 14B. Therefore, second output signal $Sh_0^-$ is $Sh_0^-=0\times1+0\times7+0\times3+0\times2=0$. The third output signal $Sh_0$ is $Sh_0=Sh_0^+-Sh_0^-=13-0=13$ based on the difference between the first output signal $Sh_0^+$ and the second output signal $Sh_0^-$.

Then, in the positive sign selection operation $Tc_1^+$ of the second detection operation $Tc_1$, two first electrodes 25 belonging to the detection electrode blocks 25B(m) and 25B(m+2) are selected as the first detection target corresponding to the elements "1" in the second row of the square matrix $H_h$ as shown in FIG. 12(B). The first electrodes 25 selected as the first detection target are coupled to the multiplexer 14B, and the output signals are output. On the other hand, the first electrodes 25 belonging to detection electrode blocks 25B(m+1) and 25B(m+3) which are not selected as the first detection target are disconnected from the multiplexer 14B, and no output signal is output. Therefore, the first output signal $Sh_1^+$ is $Sh_1^+=1\times1+0\times7+1\times3+0\times2=4$ from Formula (3).

In the negative sign selection operation $Tc_1^-$, two first electrodes 25 belonging to the detection electrode blocks 25B(m+1) and 25B(m+3) are selected as the second detection target corresponding to the elements "−1" in the second row of the square matrix $H_h$. The first electrodes 25 selected as the second detection target are coupled to the multiplexer 14B, and the output signals are output. On the other hand, the first electrodes 25 belonging to detection electrode blocks 25B(m) and 25B(m+2) which are not selected as the second detection target are disconnected from the multiplexer 14B, and no output signal is output. The second output signal $Sh_1^-$ is $Sh_1^-=0\times1+1\times7+0\times3+1\times2=9$. $Sh_1=Sh_1^+-Sh_1^-=4-9=-5$ is obtained as the third output signal $Sh_1$.

Then, in the positive sign selection operation $Tc_2^+$ of the third detection operation $Tc_2$, two first electrodes 25 belonging to the detection electrode blocks 25B(m) and 25B(m+1) are selected as the first detection target corresponding to the elements "1" in the third row of the square matrix $H_h$ as shown in FIG. 12(C). The first electrodes 25 selected as the first detection target are coupled to the multiplexer 14B, and the output signals are output. The first output signal $Sh_2^+$ is $Sh_2^+=1\times1+1\times7+0\times3+0\times2=8$ from Formula (3).

In the negative sign selection operation $Tc_2^-$, two first electrodes 25 belonging to the detection electrode blocks 25B(m+2) and 25B(m+3) are selected as the second detection target corresponding to the elements "−1" in the third row of the square matrix $H_h$. The first electrodes 25 selected as the second detection target are coupled to the multiplexer 14B, and the output signals are output. The second output signal $Sh_2^-$ is $Sh_2^-=0\times1+0\times7+1\times3+1\times2=5$. $Sh_2=Sh_2^+-Sh_2^-=8-5=3$ is obtained as the third output signal $Sh_2$.

Then, in the positive sign selection operation $Tc_3^+$ of the fourth detection operation $Tc_3$, two first electrodes 25 belonging to the detection electrode blocks 25B(m) and 25B(m+3) are selected as the first detection target corresponding to the elements "1" in the fourth row of the square matrix $H_h$ as shown in FIG. 12(D). The first electrodes 25 selected as the first detection target are coupled to the multiplexer 14B, and the output signals are output. The first output signal $Sh_3^+$ is $Sh_3^+=1\times1+0\times7+0\times3+1\times2=3$ from Formula (3).

In the negative sign selection operation $Tc_3^-$, two first electrodes 25 belonging to the detection electrode blocks 25B(m+1) and 25B(m+2) are selected as the second detection target corresponding to the elements "−1" in the fourth row of the square matrix $H_h$. The first electrodes 25 selected as the second detection target are coupled to the multiplexer 14B, and the output signals are output. The second output signal $Sh_3^-$ is $Sh_3^-=0\times1+1\times7+1\times3+0\times2=10$. $Sh_3=Sh_3^+-Sh_3^-=3-10=-7$ is obtained as the third output signal $Sh_3$.

The signal operation circuitry 44 sequentially outputs the four third output signals $(Sh_0, Sh_1, Sh_2,$ and $Sh_3)=13, -5, 3,$ and $-7)$ to the storage 47. Further, the signal operation circuitry 44 may stores the four first output signals $Sh_0^+$, $Sh_1^+$, $Sh_2^+$, and $Sh_3^+$ and the four second output signals $Sh_0^-$, $Sh_1^-$, $Sh_2^-$, and $Sh_3^-$ in the storage 47 and calculate the four third output signals $Sh_0, Sh_1, Sh_2,$ and $Sh_3$ after performing the detection in all the periods.

The coordinate extractor 45 (see FIG. 2) receives the third output signals $Sh_0, Sh_1, Sh_2,$ and $Sh_3$ calculated by the signal operation circuitry 44 from the storage 47, and decodes the four output signals $(Sh_0, Sh_1, Sh_2,$ and $Sh_3)=(13, -5, 3,$ and $-7)$ using the following Formula (4). The coordinate extractor 45 calculates the decoded signals $(Si_0', Si_1', Si_2', Si_3')=(4, 28, 12, 8)$ based on Formula (4). When the finger touches or approaches, the values of decoded signals $Si_0', Si_1', Si_2',$ and $Si_3'$ of the first electrodes 25 corresponding to the position change. Accordingly, the coordinate extractor 45 can obtain coordinates at which the finger touches or approaches in the second electrode block BKNB(n) based on the decoded signals $Si_0', Si_1', Si_2',$ and $Si_3'$. Further, the coordinate extractor 45 may output the coordinates obtained based on the decoded signals $Si_0', Si_1', Si_2',$ and $Si_3'$ as the detection signal output Vout or may output the decoded signals $Si_0', Si_1', Si_2',$ and $Si_3'$ as the detection signal output Vout.

$$\begin{pmatrix} Si_0' \\ Si_1' \\ Si_2' \\ Si_3' \end{pmatrix} = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \begin{pmatrix} Sh_0 \\ Sh_1 \\ Sh_2 \\ Sh_3 \end{pmatrix} \quad (4)$$

According to the above-described code division selection driving, through the decoding process of the coordinate extractor 45 according to Formula (4), the decoded signals $(Si_0', Si_1', Si_2',$ and $Si_3')=(4, 28, 12,$ and $8)$ corresponding to four times which is the order of the square matrix $H_h$ of the signal values $(Si_0, Si_1, Si_2,$ and $Si_3)=(1, 7, 3,$ and $2)$ of the individual first electrodes 25 are obtained from the third output signals $(Sh_0, Sh_1, Sh_2,$ and $Sh_3)$ corresponding to output signals obtained by integrating the signal values ($Si_0$, $Si_1$, $Si_2$, and $Si_3$)=(1, 7, 3, and 2) output from the first electrodes 25 selected as the first detection target and the second detection target. In other words, a signal strength which is four times higher than in the time division selection driving is obtained without increasing a voltage of a signal value of each node. Further, since the third output signal $Sh_p$ is obtained based on the difference between the first output signal $Sh_p^+$ and the second output signal $Sh_p^-$, even when a noise comes in from the outside, the noise component of the first output signal $Sh_p^+$ and the noise component of the second output signal $Sh_p^-$ are canceled. Accordingly, noise resistance can be improved. Further, according to the present embodiment, the detection operation of the first electrodes 25 of the first detection target selected based on a predetermined code and the detection operation of the first electrodes 25 of the second detection target which are selected based on a predetermined code but not included in the first detection target are performed in different periods in the time division manner. Accordingly, it is possible to suppress capacitive coupling of the first electrodes 25 of the first detection target and the first electrodes 25 of the second detection target, suppressing a detection error or a reduction in detection sensitivity.

The square matrix $H_h$ indicated in Formula (2) is an example, and, for example, a square matrix $H_h$ indicated in the following Formula (5) or the like may be used. In this case, in the positive sign selection operation $Tc_p^+$ (p=0, 1, 2, 3), the three first electrodes 25 of the first detection target corresponding to the element "1" are selected, and in the negative sign selection operation $Tc_p^-$ (p=0, 1, 2, 3), one first electrode 25 of the second detection target corresponding to the element "−1" is selected.

$$H_h = \begin{pmatrix} -1 & 1 & 1 & 1 \\ 1 & -1 & 1 & 1 \\ 1 & 1 & -1 & 1 \\ 1 & 1 & 1 & -1 \end{pmatrix} \quad (5)$$

As illustrated in FIG. 12, a first selection pattern indicating a combination pattern of the first electrodes 25 selected as the first detection target corresponding to the element "1" of the square matrix $H_h$ includes four patterns shown in the positive sign selection operation $Tc_p^+$ (p=0, 1, 2, 3). In other words, the first selection pattern of the first electrodes 25 selected as the first detection target is equal in number to the first electrodes 25 included in the second electrode block BKNB(n). Further, a second selection pattern indicating a combination pattern of the first electrodes 25 selected as the second detection target corresponding to the element "−1" of the square matrix $H_h$ is equal in number to the first selection patterns. The second selection pattern includes four patterns shown in the negative sign selection operation $Tc_p^-$ (p=0, 1, 2, 3) and is equal in number to the first electrodes 25 included in the second electrode block BKNB(n).

The positive sign selection operation $Tc_p^+$ and the negative sign selection operation $Tc_p^-$ are performed in consecutive periods within the detection periods Pt1 and Pt2 (see FIG. 10), and a set of the positive sign selection operation $Tc_p^+$ and the negative sign selection operation $Tc_p^-$ are repeatedly performed. A difference between the magnitudes of the noises coming in from the outside is suppressed through the positive sign selection operation $Tc_p^+$ and the negative sign selection operation $Tc_p^-$ which are consecutively performed. Thus, a noise component is canceled based on the difference between first output signal $Sh_p^+$ and the second output signal $Sh_p^-$, and noise tolerance is improved. The present invention is not limited thereto, and an appropriate modification may be made, for example, the four negative sign selection operations $Tc_p^-$ (p=0, 1, 2, 3) are consecutive performed after the four positive sign selection operations $Tc_p^+$ (p=0, 1, 2, 3) are consecutively performed. Further, four operations which are equal in number to the first electrodes 25 included in the second electrode block BKNB(n) are provided as each of the positive sign selection operation $Tc_p^+$ and the negative sign selection operation $Tc_p^-$. In other words, it is equal to the number of row components of the square matrix $H_h$ of Formula (1).

A detection drive signal Vs having the same polarity is supplied to the first electrode 25 of the first detection target and the first electrode 25 of the second detection target. In the present embodiment, since the detection operation of the first detection target and the detection operation of the second detection target are performed in the time division manner, the detection drive signal Vs includes a first polarity drive signal and a second polarity drive signal different from the first polarity drive signal, and the first polarity drive signal may be supplied to the first electrode 25 of the first detection target and the second polarity drive signal may be supplied to the first electrode 25 of the second detection target. In this case, the third output signal $Sh_p = Sh_p^+ + Sh_p^-$ is obtained by calculating a sum of the first output signal $Sh_p^+$ and the second output signal $Sh_p^-$.

Figure 30:
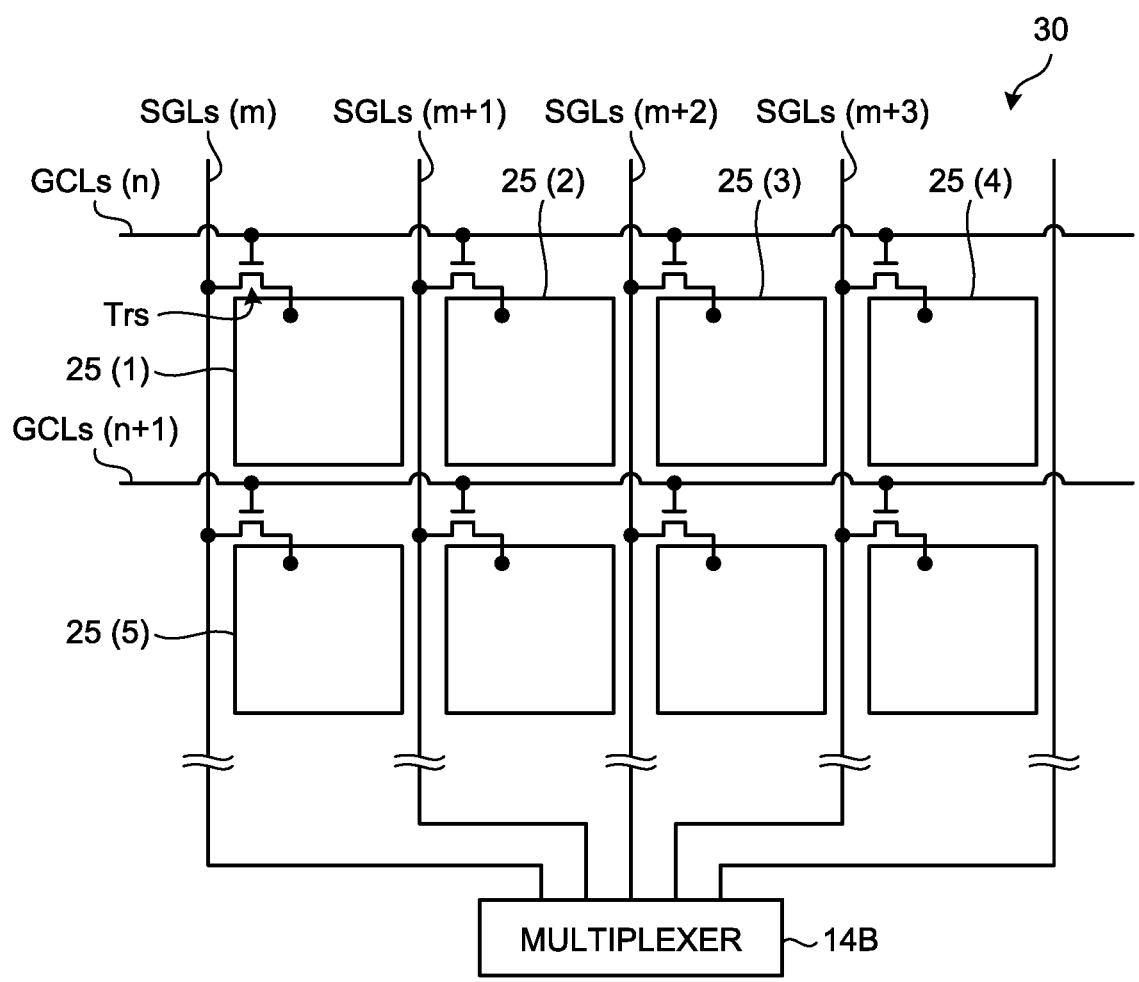
FIG. 30 is a schematic diagram for describing a detection order of the first electrodes.
Figure 31:
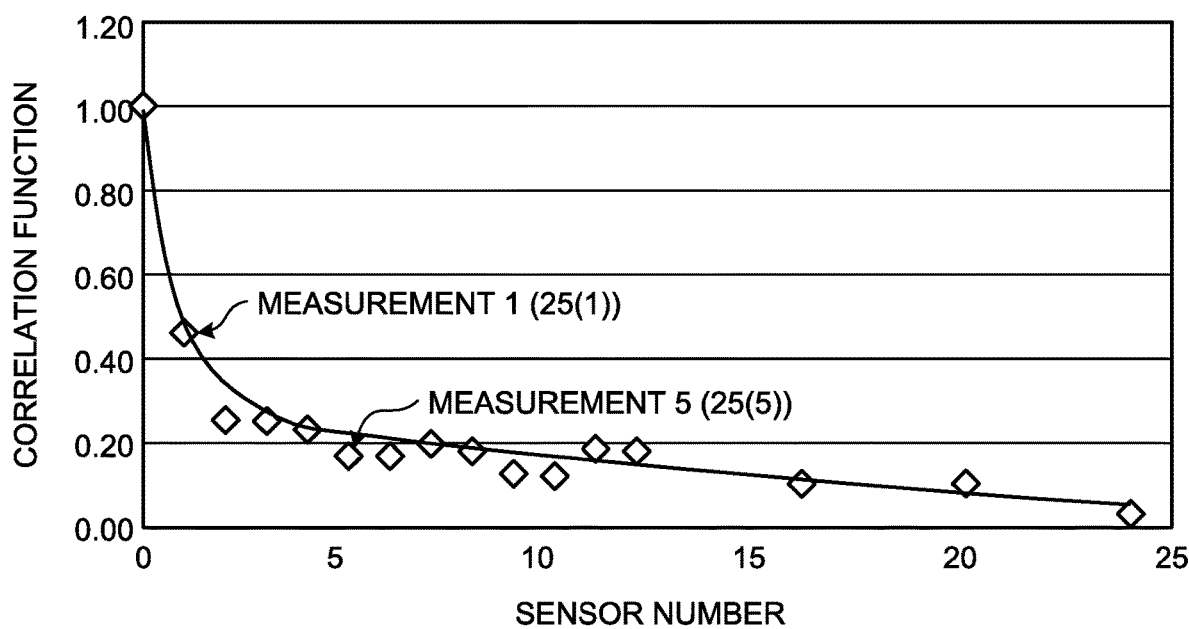
FIG. 31 is a graph schematically illustrating a relation between a sensor number and a correlation function.

A relation between influence of noise and a detection timing will be described with reference to FIGS. 30 and 31. FIG. 30 is a schematic diagram for describing a detection order of the first electrodes. FIG. 31 is a graph schematically illustrating a relation between a sensor number and a correlation function. FIGS. 30 and 31 are diagrams illustrating a relation between influence of noise and a detection timing in the detection device having the same configuration as in the present invention and diagrams for describing how influence of noise transitions. As illustrated in FIG. 30, among a plurality of first electrodes 25, first electrodes 25(1), 25(2), . . . 25(5), . . . are selected in this order, and the detection operation is performed. Specifically, the detection gate line GCLs(n) is selected, and the detection switching element Trs corresponding to the detection gate line GCLs (n) is turned on. The multiplexer 14B sequentially selects the detection data lines SGLs(m), SGLs(m+1), SGLs(m+2), and SGLs(m+3), and the detection drive signal Vs is supplied. Accordingly, the detection operation is performed in the order of the first electrodes 25(1), 25(2), 25(3), and 25(4). Then, when the detection gate line GCLs(n+1) is selected, and the multiplexer 14B sequentially selects the detection data lines SGLs(m), SGLs(m+1), SGLs(m+2), and SGLs (m+3), the detection operation is performed in the order of the first electrodes 25(5), . . . . Further, the detection order illustrated in FIG. 30 is an order illustrated for description, and the detection operation of the display device 1 and the detector 30 of the present embodiment is not limited thereto.

In FIG. 31, a horizontal axis indicates the sensor number and corresponds to a measurement order of the first electrode 25. A vertical axis indicates the correlation function of the output signal of each first electrode 25. When noise comes in to the detector 30, an error occurs in the output signal of each first electrode 25. The correlation function of the output signal of each first electrode 25 tends to decrease as the sensor number increases as illustrated in FIG. 31. In other words, it indicates that an error component caused by noise is increased with the lapse of time. For example, an error caused by influence of noise increases between the output signal of the first electrode 25(1) which is firstly measured and the output signal of the first electrode 25(5) which is fifthly measured.

Therefore, the four first output signals $Sh_0^+$, $Sh_1^+$, $Sh_2^+$, and $Sh_3^+$ and the four second output signals $Sh_0^-$, $Sh_1^-$, $Sh_2^-$, and $Sh_3^-$ illustrated in FIG. 12 are preferably measured in the order of $Sh_0^+$, $Sh_0^-$, $Sh_1^+$, $Sh_1^-$, $Sh_2^+$, $Sh_2^-$, $Sh_3^+$, and $Sh_3^-$. In this case, an interval between the detection periods of time of the first output signal $Sh_p^+$ and the second output signal $Sh_p^-$ (p=1, 2, 3, 4) decreases, and a difference of the noise component decreases. Since the third output signal $Sh_p$ is obtained based on the difference between the first output signals $Sh_p^+$ and the second output signal $Sh_p^-$ as in $Sh_p = Sh_p^+ - Sh_p^-$, the noise component of the first output signals $Sh_p^+$ and the noise component of the second output signal $Sh_p^-$ are canceled.

Figure 13:
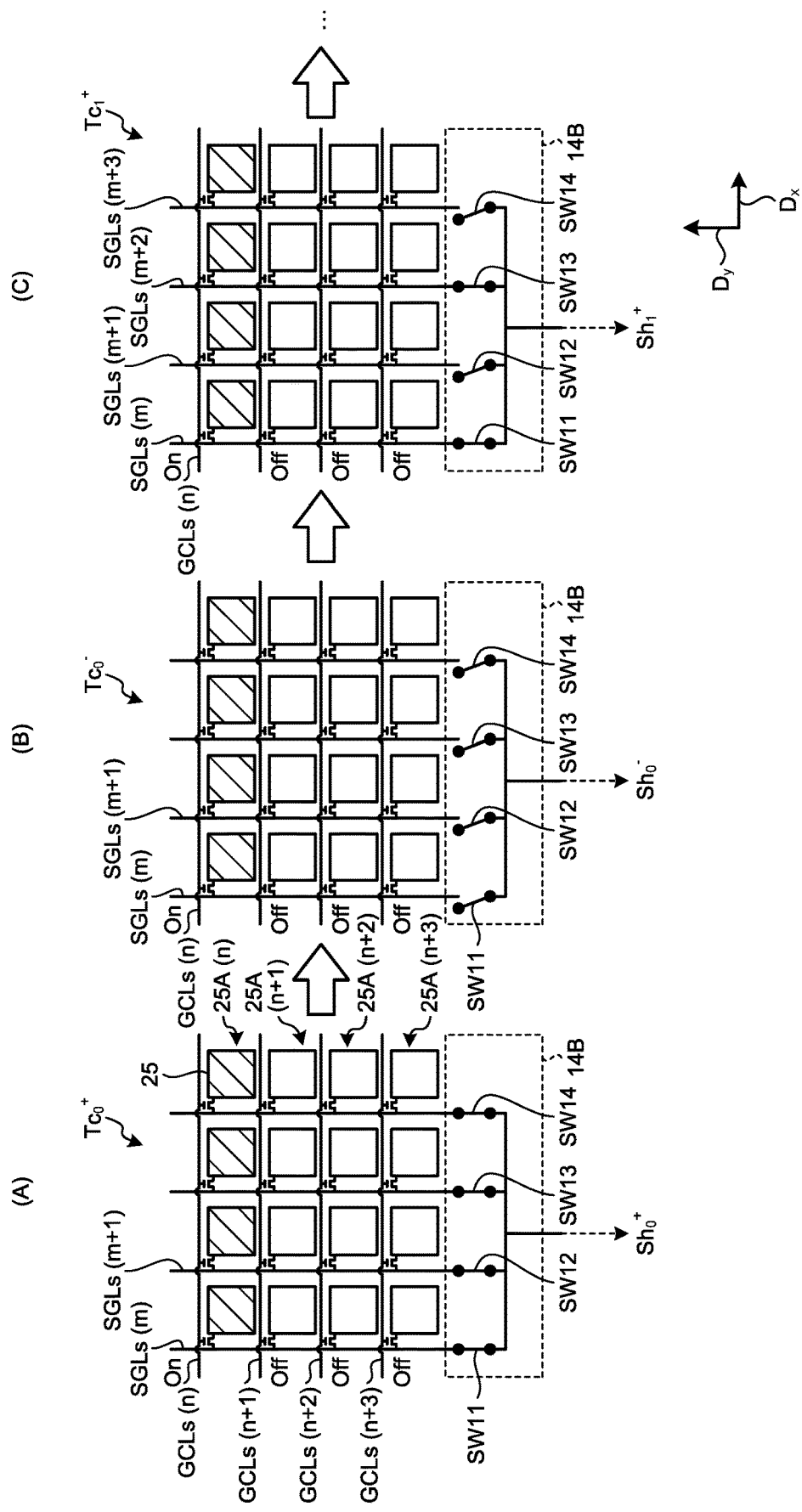
FIG. 13 is an explanatory diagram illustrating an exemplary operation of a multiplexer and a gate driver according to the first embodiment.
Figure 14:
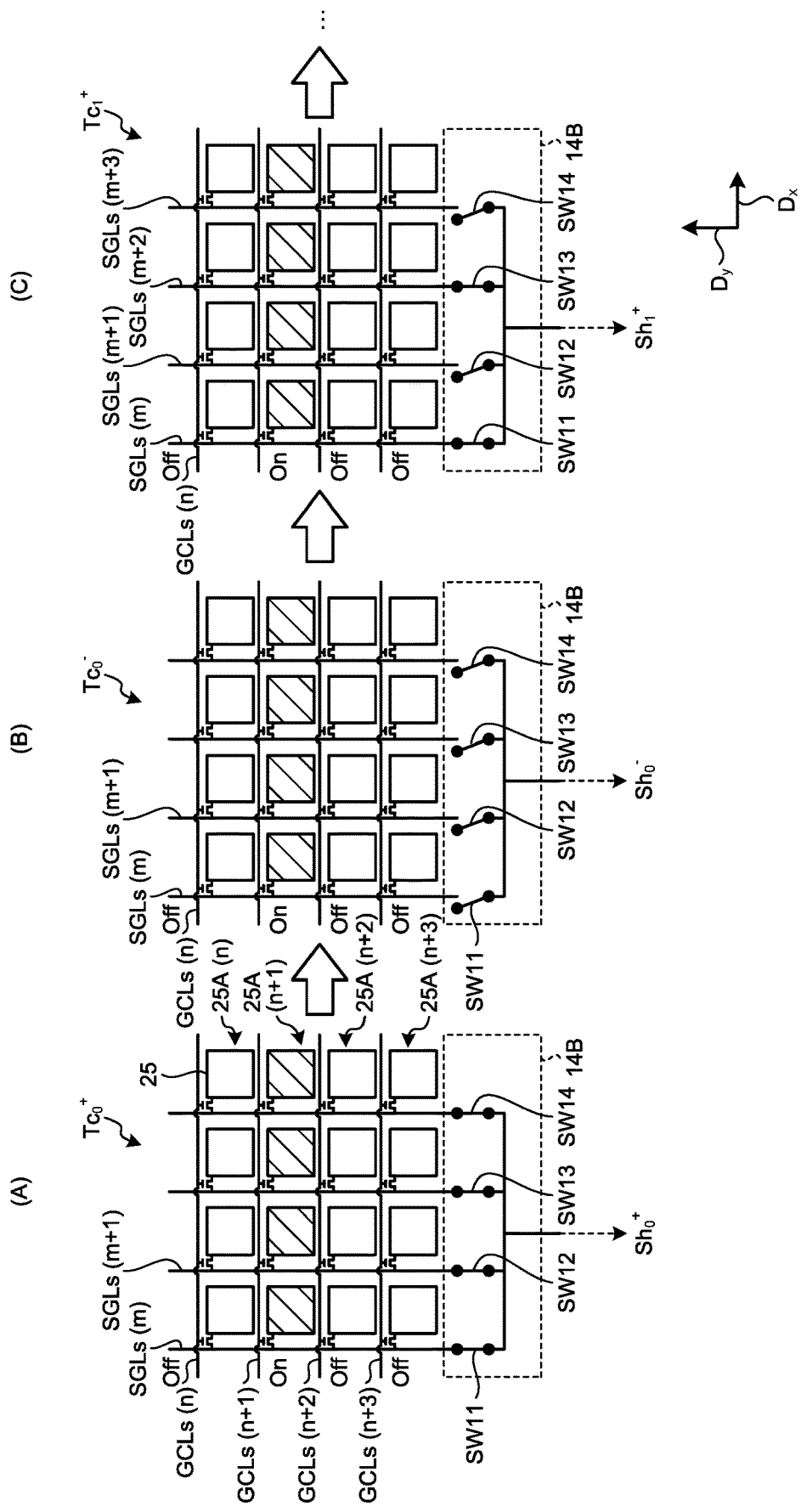
FIG. 14 is an explanatory diagram illustrating an exemplary operation of a multiplexer and a gate driver when a second electrode block serving as a selection target is changed.

Next, an example of an operation for the second electrode block BKNB will be described with reference to FIGS. 13 and 14. FIG. 13 is an explanatory diagram illustrating an exemplary operation of the multiplexer and the gate driver according to the first embodiment. FIG. 14 is an explanatory diagram illustrating an exemplary operation of the multiplexer and the gate driver when the second electrode block BKNB of the selection target is changed. FIG. 13(A) and FIG. 14(A) illustrate the positive sign selection operation $Tc_0^+$ of the first detection operation $Tc_0$, FIG. 13(B) and FIG. 14(B) illustrate the negative sign selection operation $Tc_0^-$ of the first detection operation $Tc_0$, and FIG. 13(C) and FIG. 14(C) illustrate the positive sign selection operation $Tc_1^+$ of the second detection operation $Tc_1$. The detection gate driver 12B (see FIG. 1) is not illustrated in FIGS. 13 and 14.

As illustrated in FIG. 13, the detection scanning signal Vscans supplied from the detection gate driver 12B to the detection gate line GCLs(n) becomes the on state (the high level), and the detection switching element Trs coupled to the detection gate line GCLs(n) is turned on. The first electrodes 25 of the second gate electrode BKNB(n) corresponding to the detection gate line GCLs(n) can be selected as the detection target. The detection signals can be output from the first electrodes 25 of the second electrode block BKNB(n) via the detection data line SGLs(m), SGLs(m+1), SGLs(m+2), and SGLs(m+3).

On the other hand, the detection scanning signals Vscans supplied from the detection gate lines GCLs(n+1), GCLs(n+2), and GCLs(n+3) become the off state, and the detection switching elements Trs coupled to the detection gate lines GCLs(n+1), GCLs(n+2), and GCLs(n+3) are turned off. The first electrodes 25 of the second electrode blocks BKNB(n+1), BKNB(n+2), BKNB(n+3) are not selected as the detection target.

The positive sign selection operation $Tc_0^+$ and the negative sign selection operation $Tc_0^-$ of the first detection operation $Tc_0$, the positive sign selection operation $Tc_1^+$ of the second detection operation $Tc_1$, and the like are sequentially performed in the state in which the first electrodes 25 of the second electrode block BKNB(n) are selected. The first output signal $Sh_p^+$ and the second output signal $Sh_p^-$ are output from the first electrodes 25 of the second electrode block BKNB(n) via the multiplexer 14B. Accordingly, the position at which the finger or like touches or approaches in a first direction $D_x$ (a direction along the detection gate line GCLs) in an area overlapping the first electrodes 25 of the second electrode block BKNB(n) is detected.

Next, as illustrated in FIG. 14, the detection scanning signal Vscans supplied from the detection gate driver 12B to the detection gate line GCLs(n+1) become on state (the high level). The detection switching element Trs coupled to the detection gate line GCLs(n+1) turns ON. The first electrode 25 of the second electrode block BKNB(n+1) corresponding to the detection gate line GCLs(n+1) can be selected as the detection target.

On the other hand, the detection scanning signals Vscans supplied from the detection gate lines GCLs(n), GCLs(n+2), and GCLs(n+3) become the off state (the low level), and the detection switching elements Trs coupled to the detection gate lines GCLs(n), GCLs(n+2), and GCLs(n+3) are turned off. The first electrodes 25 of the second electrode blocks BKNB(n), BKNB(n+2), BKNB(n+3) are not selected as the detection target.

The positive sign selection operation $Tc_0^+$ and the negative sign selection operation $Tc_0^-$ of the first detection operation $Tc_0$, the positive sign selection operation $Tc_1^+$ of the second detection operation $Tc_1$, and the like are sequentially performed in the state in which the first electrodes 25 of the second electrode block BKNB(n+1) are selected. The first output signal $Sh_p^+$ and the second output signal $Sh_p^-$ are output from the first electrodes 25 of the second electrode block BKNB(n+1) via the multiplexer 14B. Accordingly, the position at which the finger or like touches or approaches in the first direction $D_x$ in the area overlapping the first electrodes 25 of the second electrode block BKNB(n+1) is detected.

As described above, the detection gate driver 12B sequentially supplies the detection scanning signal Vscans to the detection gate lines GCLs(n), GCLs(n+1), GCLs(n+2), and GCLs(n+3). The second electrode blocks BKNB(n), BKNB(n+1), BKNB(n+2), and BKNB(n+3) are sequentially selected. The position in the first direction $D_x$ can be calculated based on the decoded signals ($Si_0'$, $Si_1'$, $Si_2'$, and $Si_3'$) of the code division selection driving. The position in a second direction $D_y$ (a direction along the detection data line SGLs) can be calculated based on detection results of the second electrode blocks BKNB(n), BKNB(n+1), BKNB(n+2), and BKNB(n+3). Accordingly, two dimensional coordinates of the position at which the finger or like touches or approaches are obtained.

Further, as illustrated in FIGS. 13 and 14, the first electrodes 25 arranged in the second direction $D_y$ are coupled to the common detection data line SGLs, but the present invention is not limited thereto, and the first electrodes 25 arranged in the second direction $D_y$ may be coupled to individual detection data lines.

Second Embodiment

Figure 15:
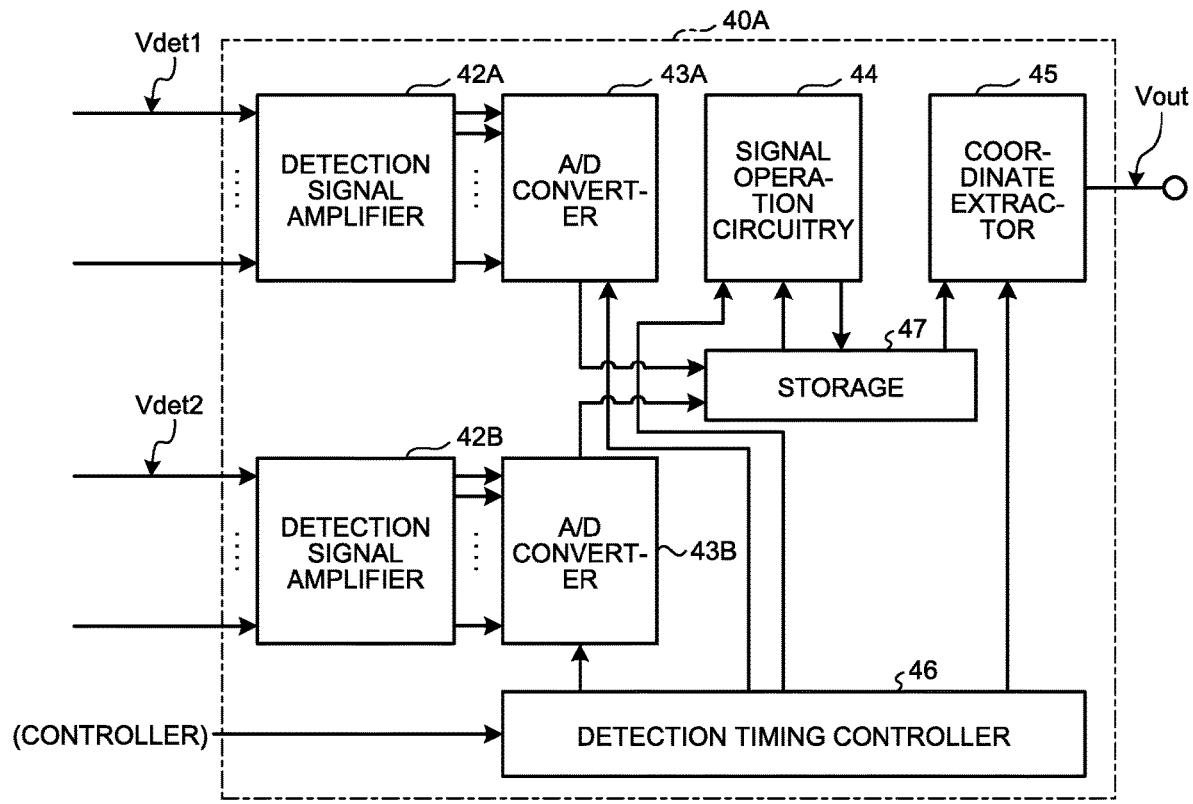
FIG. 15 is a block diagram illustrating an exemplary configuration of a signal processor according to a second embodiment.

FIG. 15 is a block diagram illustrating an exemplary configuration of the signal processor according to the second embodiment. In the following embodiments and the drawings, the same components as those already described above with reference to the drawings are denoted by the same reference numerals, and detailed description will be appropriately omitted. A signal processor 40A of the present embodiment includes two detection signal amplifiers 42A and 42B and two A/D converters 43A and 43B. The detection signal amplifier 42A receives a first detection signal Vdet1 from the detector 30 and amplifies the first detection signal Vdet1. The A/D converter 43A performs sampling on an analog signal output from the detection signal amplifier 42A and converts the analog signal into a digital signal. The digital signal output from the A/D converter 43A is stored in the storage 47. The detection signal amplifier 42B receives a second detection signal Vdet2 from the detector 30 and amplifies the second detection signal Vdet2. The A/D converter 43B performs sampling on an analog signal outputted from the detection signal amplifier 42B and converts the analog signal into a digital signal. The digital signal outputted from the A/D converter 43B is stored in the storage 47.

A detection timing controller 46 performs control such that the A/D converters 43A and 43B, the signal operation circuitry 44, and the coordinate extractor 45 operate in synchronization with one another based on the control signal supplied from the controller 11.

The signal operation circuitry 44 receives information of the signal obtained by performing digital conversion on the first detection signal Vdet1 and information of the signal obtained by performing digital conversion on the second detection signal Vdet2 from the storage 47, and performs an operation process. An operation result of the signal operation circuitry 44 is stored in the storage 47. The coordinate extractor 45 receives information from the storage 47, performs the decoding process, and obtains the touch panel coordinates.

Figure 16:
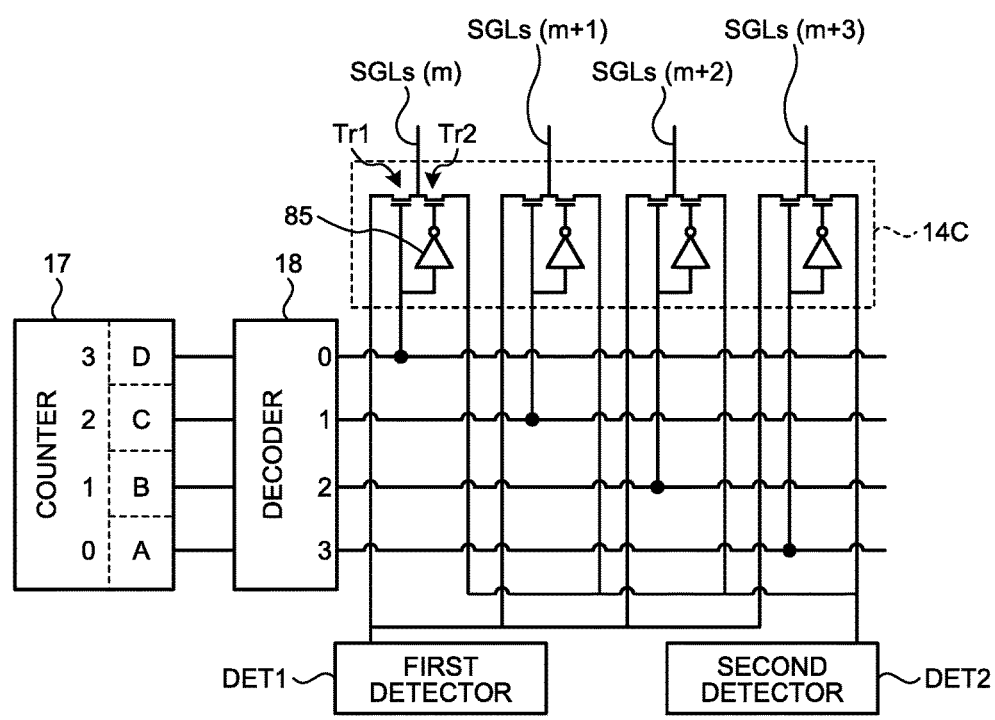
FIG. 16 is a circuit diagram illustrating an exemplary configuration of a selective coupling circuitry according to the second embodiment.

FIG. 16 is a circuit diagram illustrating an exemplary configuration of the selective coupling circuitry according to the second embodiment. Instead of the multiplexer 14B serving as the "selective coupling circuitry" illustrated in FIG. 11, in the present embodiment, a selective coupling circuitry 14C is installed. The switch elements SW5 and xSW5, the wires L1, L2, and L3, the selection signal generator 16, and the drive signal generator 14A of FIG. 11 are not illustrated in FIG. 16. The selective coupling circuitry 14C includes a first switching element Tr1, a second switching element Tr2, and an inverter 85. The first switching element Tr1 and the second switching element Tr2 are coupled to each of the detection data lines SGLs. The detection data line SGLs can be coupled to a first detection circuit DET1 via the first switching element Tr1 and coupled to a second detection circuit DET2 via the second switching element Tr2. The first switching element Tr1 and the second switching element Tr2 may be an n-channel MOS type TFT element. The first detection circuit DET1 and the second detection circuit DET2 correspond to the voltage detection circuit DET in the detection principle of the self-capacitance scheme. The first detection circuit DET1 may be included in the detection signal amplifier 42A (see FIG. 15), and the second detection circuit DET2 may be included in the detection signal amplifier 42B (see FIG. 15).

The selective coupling circuitry 14C, and the switch elements SW5 and xSW5 (not illustrated), the wires L1, L2, and L3 (not illustrated), the selection signal generator 16 (not illustrated), the drive signal generator 14A (not illustrated), the counter 17, and a decoder 18 may be included in the first electrode driver 14 and the controller 11 illustrated in FIG. 1. For example, the first electrode driver 14 may function as the selective coupling circuitry 14C, the switch elements SW5 and xSW5 (not illustrated) and the wires L1, L2, and L3 (not illustrated), and the controller 11 may function as the selection signal generator 16 (not illustrated), the drive signal generator 14A (not illustrated), the counter 17, and the decoder 18.

A gate of the first switching element Tr1 is coupled to a decoder 18. A gate of the second switching element Tr2 is coupled to the decoder 18 via an inverter 85. The decoder 18 generates the selection signal used for selecting the first electrode 25 of the detection target based on a predetermined code, and outputs the selection signal to the first switching element Tr1 and the second switching element Tr2. For example, the decoder 18 generates a signal that becomes the on state (the high level)" corresponding to the element "1" of the square matrix $H_h$ or becomes the off state (the low level) corresponding to the element "−1." The decoder 18 outputs the selection signal corresponding to the components of one row of the square matrix $H_h$ based on the timing control signal received from the counter 17. A wire which selectively couples to the detection data line SGLs via the first switching element Tr1 corresponds to a first output signal line. The first output signal line is coupled to the first detection circuit DET1. The first output signal line transmits the first output signal. The first output signal is the integrated detection signals output from the first electrodes 25 selected by a first selection signal. A wire which selectively couples to the detection data line SGLs via the second switching element Tr2 corresponds to a second output signal line. The second output signal line is coupled to the second detection circuit DET2. The second output line transmits the second output signal. The second output signal is the integrated detection signals output from the first electrodes 25 selected by a second selection signal.

When the selection signal of the high level is output from the decoder 18, the first switching element Tr1 is turned on, and the detection data line SGLs and the first detection circuit DET1 are coupled. On the other hand, the selection signal of the low level obtained by inverting the selection signal of the high level through the inverter 85 is supplied to the second switching element Tr2. Accordingly, the second switching element Tr2 is turned off, disconnecting the connection between the detection data line SGLs and the second detection circuit DET2.

When the selection signal of the low level is output from the decoder 18, the first switching element Tr1 is turned off, and the detection data line SGLs is disconnected from the first detection circuit DET1. On the other hand, the selection signal of the high level obtained by inverting the selection signal of the low level through the inverter 85 is supplied to the second switching element Tr2. Accordingly, the second switching element Tr2 is turned on, coupling the detection data line SGLs and the second detection circuit DET2.

In the present embodiment, since the selective coupling circuitry 14C includes the first switching element Tr1, the second switching element Tr2, and the inverter 85, the first selection signal for selecting the first electrode 25 of the first detection target and the second selection signal obtained by inverting the first selection signal are simultaneously supplied to the detection data lines SGLs. Further, since the first detection circuit DET1 and the second detection circuit DET2 are provided, it is possible to simultaneously detect the output signal output from the first electrode 25 corresponding to the element "1" of the square matrix $H_h$ and the output signal output from the first electrode 25 corresponding to the element "−1" of the square matrix $H_h$.

In the present embodiment, the selective coupling circuitry 14C includes the inverter 85, but a complementary MOS (CMOS) circuit configuration using n-channel and p-channel MOS type TFT elements may be employed.

Figure 17:
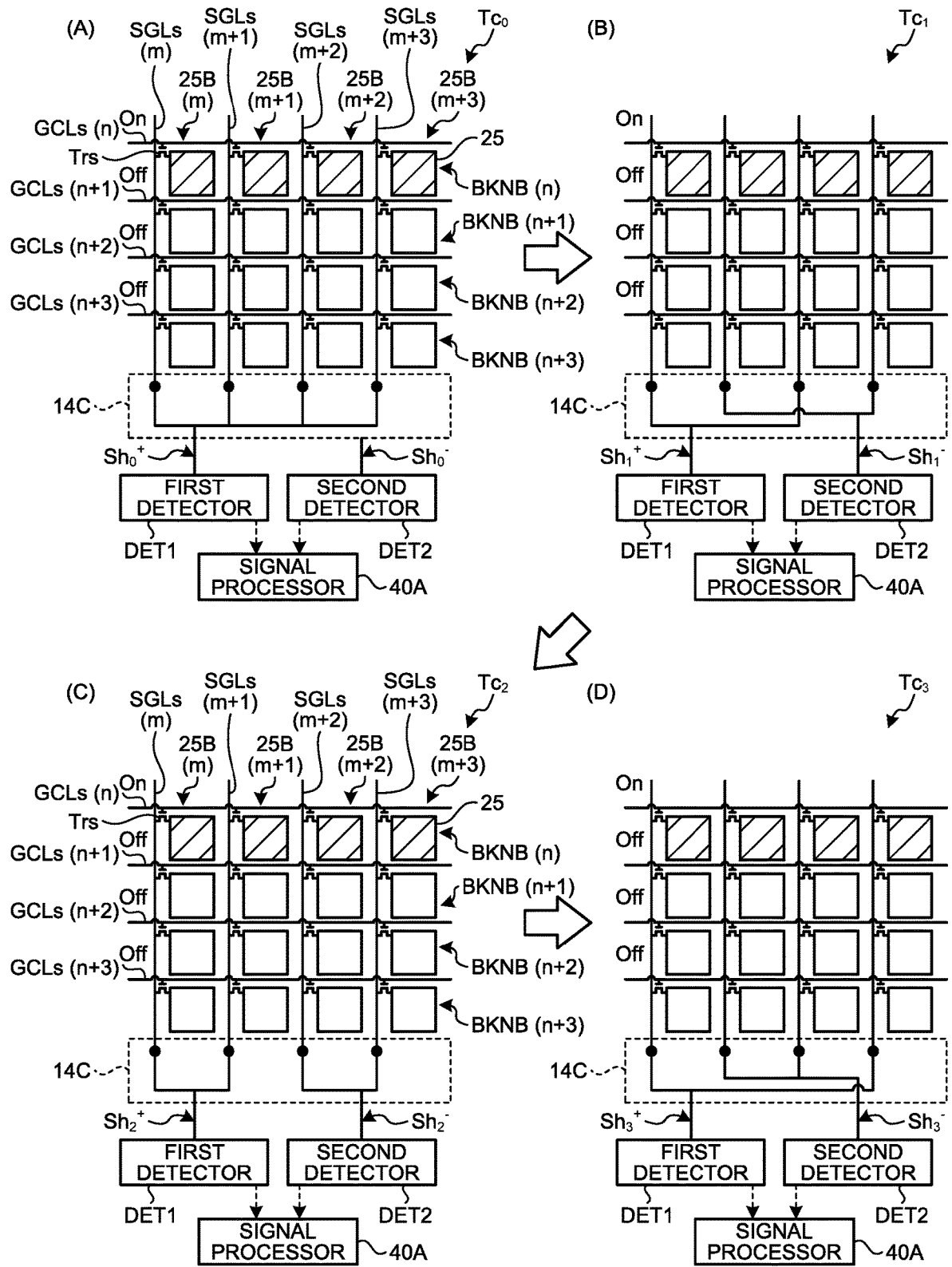
FIG. 17 is an explanatory diagram illustrating an exemplary operation of the selective coupling circuitry and gate driver according to the second embodiment.

FIG. 17 is an explanatory view illustrating an exemplary operation of the selective coupling circuitry and the gate driver according to the second embodiment. FIG. 17(A) illustrates the first detection operation $Tc_0$, FIG. 17(B) illustrates the second detection operation $Tc_1$, FIG. 17(C) illustrates the third detection operation $Tc_2$, and FIG. 17(D) illustrates the fourth detection operation $Tc_3$. In the operations of FIG. 17, the detection gate driver 12B supplies the detection scanning signal Vscans to the detection gate line GCLs(n), and the second electrode block BKNB(n) is selected as the detection target.

In the first detection operation $Tc_0$ illustrated in FIG. 17(A), the decoder 18 (see FIG. 16) outputs the first selection signal corresponding to the elements "1" in the first row of square matrix $H_h$ to the selective coupling circuitry 14C. Thus, the detection data lines SGLs(m), SGLs(m+1), SGLs(m+2), and SGLs(m+3) are coupled to the first detection circuit DET1 via the selective coupling circuitry 14C. The four first electrodes 25 coupled to the detection data lines SGLs(m), SGLs(m+1), SGLs(m+2), and SGLs(m+3) are selected as the first detection target. On the other hand, since there is no element "−1" in the first row of square matrix $H_h$, the detection data lines SGLs(m), SGLs(m+1), SGLs(m+2), and SGLs(m+3) are disconnected from the second detection circuit DET2 according to the second selection signal obtained by converting the first selection signal.

In the first detection operation $Tc_0$, the first output signal $Sh_0^+$ is output to the first detection circuit DET1. The first output signal $Sh_0^+$ is a signal obtained by integrating the detection signals of the four first electrodes 25 of the second electrode block BKNB(n). On the other hand, the second output signal $Sh_0^-$ is not output to the second detection circuit DET2. The first output signal $Sh_0^+$ and the second output signal $Sh_0^-$ are stored in the storage 47 (see FIG. 14).

In the second detection operation $Tc_1$ illustrated in FIG. 17(B), the decoder 18 (see FIG. 16) outputs the first selection signal corresponding to the elements "1" in the second row of the square matrix $H_h$ to the selective coupling circuitry 14C. Thus, the detection data lines SGLs(m) and SGLs(m+2) are coupled to the first detection circuit DET1 via the selective coupling circuitry 14C. The first electrodes 25 coupled to the detection data lines SGLs(m) and SGLs(m+2) are selected as the first detection target. At the same time, the detection data lines SGLs(m+1) and SGLs(m+3) are coupled to the second detection circuit DET2 according to the second selection signal which is obtained by inverting the first selection signal and corresponds to the element "−1" in the second row of the square matrix $H_h$. The first electrodes 25 coupled to the detection data lines SGLs(m+1) and SGLs(m+3) are selected as the second detection target.

In the second detection operation $Tc_1$, the first output signal $Sh_1^+$ is outputted to the first detection circuit DET1. The first output signal $Sh_1^+$ is a signal obtained by integrating the detection signals of the two first electrodes 25 of the first detection target among the four first electrodes 25 of the second electrode block BKNB(n). On the other hand, the second output signal $Sh_1^-$ is output to the second detection circuit DET2. The second output signal $Sh_1^-$ is a signal obtained by integrating the detection signals of the two first electrodes 25 of the second detection target among the four first electrodes 25 of the second electrode block BKNB(n). The first output signal $Sh_1^-$ and second output signal $Sh_1^-$ are stored in the storage 47 (see FIG. 14).

In the third detection operation $Tc_2$ illustrated in FIG. 17(C), the decoder 18 (see FIG. 16) outputs the first selection signal corresponding to the elements "1" in the third row of the square matrix $H_h$ to the selective coupling circuitry 14C. Thus, the first electrode 25 of the first detection target and the first electrode 25 of the second detection target are simultaneously selected. In the fourth detection operation $Tc_3$ illustrated in FIG. 17(D), the decoder 18 (see FIG. 16) outputs the first selection signal corresponding to the elements "1" in the fourth row of the square matrix $H_h$ to the selective coupling circuitry 14C. Thus, the first electrode 25 of the first detection target and the first electrode 25 of the second detection target are simultaneously selected.

Then, the detection gate driver 12B sequentially changes the second electrode block BKNB to be selected as the detection target, and performs the first to fourth detection operations $Tc_0$ to $Tc_3$ for each second electrode block BKNB.

As described above, in the present embodiment, since the two detection circuits, that is, the first detection circuit DET1 and the second detection circuit DET2 are provided, the positive sign selection operation $Tc_p^+$ (p=0, 1, 2, 3) corresponding to the element "1" of the square matrix $H_h$ (see FIG. 12) and the negative sign selection operation $Tc_p^-$ (p=0, 1, 2, 3) corresponding to the element "−1" of the square matrix $H_h$ (see FIG. 12) can be performed at the same time. The output signal from the first electrode 25 corresponding to the element "1" of the square matrix $H_h$ and the output signal from the first electrode 25 corresponding to the element "−1" of the square matrix $H_h$ can be detected at the same time. Thus, the period of time necessary for detection can be reduced. In this case, the detection drive signal Vs having the same polarity is supplied to the first electrode 25 of the first detection target and the first electrode 25 of the second detection target. Thus, capacitive coupling between the first electrode 25 of the first detection target and the first electrode 25 of the second detection target is suppressed, and excellent detection sensitivity is obtained.

Figure 18:
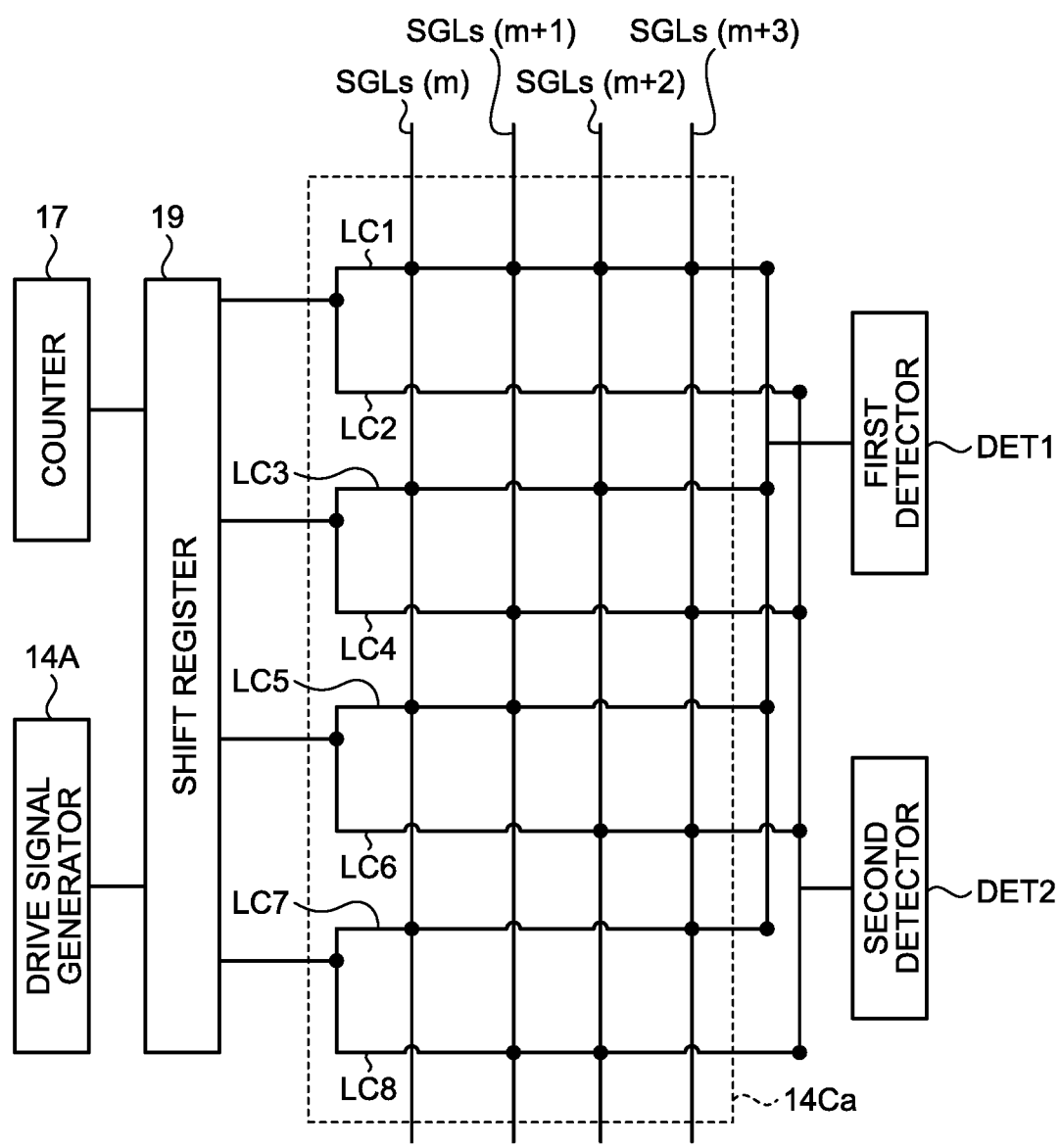
FIG. 18 is a circuit diagram illustrating another example of a selective coupling circuitry.

FIG. 18 is a circuit diagram illustrating another example of the selective coupling circuitry. Instead of the multiplexer 14B serving as the "selective coupling circuitry" illustrated in FIG. 11, in the present embodiment, a selective coupling circuitry 14Ca is provided. The switch elements SW5 and xSW5, the wires L1, L2, and L3, and the selection signal generator 16 of FIG. 11 are not illustrated in FIG. 18. The selective coupling circuitry 14Ca of the present modification includes common wires LC1 to LC8. The one end sides of the common wires LC1 to LC8 are coupled to a shift register 19. In the present modification, one end sides of the common wires LC1 and LC2 are coupled to each other, one end sides of the common wires LC3 and LC4 are coupled to each other, the one end sides of the common wires LC5 and LC6 are coupled to each other, and one end sides of the common wires LC7 and LC8 are coupled to each other. The other end sides of the common wires LC1, LC3, LC5, and LC7 are coupled to a first detection circuit DET1. The other end sides of the common wires LC2, LC4, LC6, and LC8 are coupled to a second detection circuit DET2.

The common wires LC1, LC3, LC5, and LC7 are coupled to the detection data line SGLs, corresponding to the elements "1" in each row of the square matrix $H_h$. Specifically, the common wire LC1 is coupled to the detection data lines SGLs(m), SGLs(m+1), SGLs(m+2), and SGLs(m+3), corresponding to the elements "1" in first row of square matrix $H_h$. The common wire LC3 is coupled to the detection data lines SGLs(m) and SGLs(m+2), corresponding to the elements "1" in the second row of square matrix $H_h$. The common wire LC5 is coupled to the detection data lines SGLs(m) and SGLs(m+1), corresponding to the elements "1" in the third row of square matrix $H_h$. The common wire LC7 is coupled to the detection data lines SGLs(m) and SGLs(m+3), corresponding to the elements "1" in the fourth row of square matrix $H_h$.

On the other hand, the common wires LC2, LC4, LC6, and LC8 are coupled to the detection data line SGLs, corresponding to the element "−1" of each row of the square matrix $H_h$. Specifically, the common wire LC2 is not coupled to the detection data lines SGLs(m), SGLs(m+1), SGLs(m+2), and SGLs(m+3), corresponding to the elements "−1" in first row of square matrix $H_h$. The common wire LC4 is coupled to the detection data lines SGLs(m+1) and SGLs(m+3), corresponding to the elements "−1" in the second row of square matrix $H_h$. The common wire LC6 is coupled to the detection data lines SGLs(m+2) and SGLs(m+3), corresponding to the elements "−1" in the third row of square matrix $H_h$. The common wire LC8 is coupled to the detection data lines SGLs(m+1) and SGLs(m+2), corresponding to the elements "−1" in the fourth row of square matrix $H_h$.

The shift register 19 sequentially supplies the detection drive signal Vs supplied from the drive signal generator 14A to the common wires LC1 to LC8 based on the timing control signal from the counter 17. Since the common wires LC1 to LC8 are coupled to the detection data line SGLs corresponding to the elements "1" or the elements "−1" of the square matrix $H_h$, when the detection drive signal Vs is supplied to the common wires LC1 to LC8, the first to fourth detection operations $Tc_0$ to $Tc_3$ are performed. For example, the common wire LC1 corresponds to the positive sign selection operation $Tc_0^+$ of the first detection operation $Tc_0$. Further, the common wire LC2 corresponds to the negative sign selection operation $Tc_0^-$ of the first detection operation $Tc_0$. Since one end side of the common wire LC1 is coupled with one end side of the common wire LC2, the detection drive signal Vs is simultaneously supplied to the common wire LC1 and the common wire LC2, and the positive sign selection operation $Tc_0^+$ and the negative sign selection operation $Tc_0^-$ are simultaneously performed.

The selective coupling circuitry 14Ca, the switch elements SW5 and xSW5 (not illustrated), the wires L1, L2, and L3 (not illustrated), the selection signal generator 16 (not illustrated), the drive signal generator 14A, the counter 17, and the shift register 19 may be included in the first electrode driver 14 and the controller 11 illustrated in FIG. 1. For example, the first electrode driver 14 may function as the selective coupling circuitry 14Ca, the switch elements SW5 and xSW5 (not illustrated), and the wires L1, L2, and L3 (not illustrated), and the shift register 19, and the controller 11 may function as the selection signal generator 16 (not illustrated), the drive signal generator 14A, and the counter 17.

Third Embodiment

Figure 19:
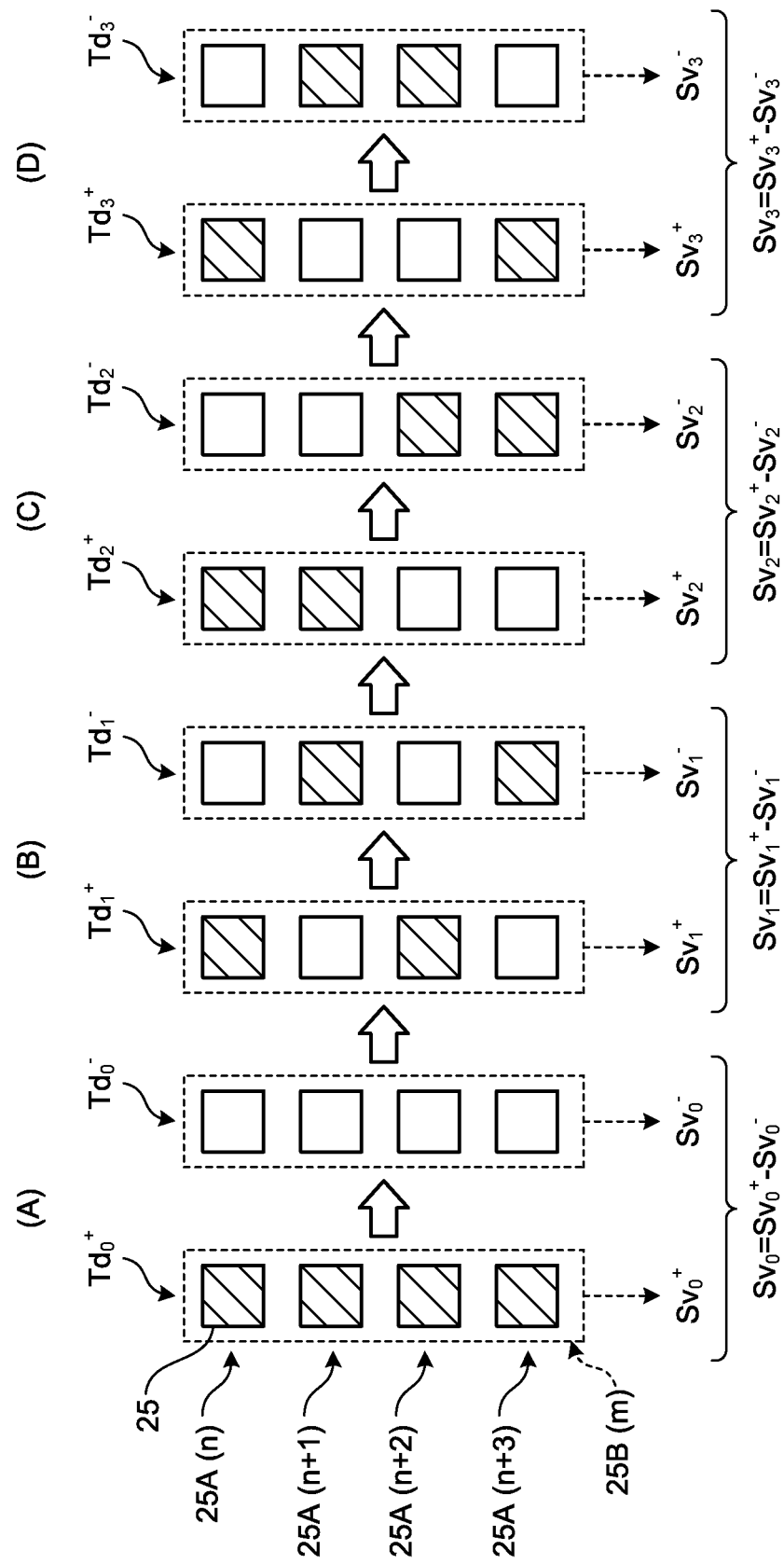
FIG. 19 is an explanatory diagram for describing another example of a selection pattern of first electrodes selected as a detection target according to a third embodiment.

The above embodiments have been described in connection with the example in which the touch input position in the first direction $D_x$ is detected by performing the code division selection driving on the second electrode block BKNB, but the above embodiments may be applied to detection the touch input position in the second direction $D_y$. FIG. 19 is an explanatory diagram for describing another example of the selection pattern of the first electrodes selected as the detection target according to the third embodiment. FIG. 19(A) illustrates the positive sign selection operation $Td_0^+$ and the negative sign selection operation $Td_0^-$ of the first detection operation $Td_0$. FIG. 19(B) illustrates the positive sign selection operation $Td_1^+$ and the negative sign selection operation $Td_1^-$ of the second detection operation $Td_1$. FIG. 19(C) illustrates the positive sign selection operation $Td_2^+$ and the negative sign selection operation $Td_2^-$ of the third detection operation $Td_2$. FIG. 19(D) illustrates the positive sign selection operation $Td_3^+$ and the negative sign selection operation $Td_3^-$ of the fourth detection operation $Td_3$.

In FIG. 19, one detection electrode block 25B(m) will be described. The detection electrode block 25B(m) includes four first electrodes 25 arranged in the column direction (the second direction Dy), and the four first electrodes 25 respectively correspond to selection electrode blocks 25A(n), 25A(n+1), 25A(n+2), and 25A(n+3). The four first electrodes 25 are coupled to the common detection data line SGLs(m) (see FIG. 8). In the detector 30 of the present embodiment, the detection gate driver 12B selects the first electrodes 25 serving as the detection target in the detection electrode block 25B(m) based on a predetermined code. The detection drive signal Vs is supplied to the selected first electrodes 25, and the detection signal is output from each of the first electrodes 25 based on a change in capacitance of the first electrodes 25. Similarly to Formula (1), an output signal $Sv_r$ (r=0, 1, 2, 3) obtained by integrating the detection signals of the first electrodes 25 is output. In the present embodiment, the detection gate driver 12B corresponds to a selective coupling circuitry. The selective coupling circuitry selectively couples the detection electrodes included in the detection electrode block 25B(m) with the common detection data line SGLs(m). The common detection data line SGLs(m) corresponds to a output signal line.

For example, the predetermined code is defined by a square matrix $H_v$ of the following Formula (6) and is similar to the square matrix $H_h$ indicated in Formula (1). The square matrix $H_v$ is not limited thereto and may be any other Hadamard matrix. An order of the square matrix $H_v$ is 4 which is the number of the first electrodes 25 included in the detection electrode block 25B(m), that is, 4 which is the number of four selection electrode blocks 25A. The present embodiment will be described in connection with the detection electrode block 25B(m) including the four first electrodes 25, but the present invention is not limited thereto, and the number of the first electrodes 25 arranged in the column direction may be two, three, or five or more. In this case, the order of the square matrix Hv also changes according to the number of first electrodes 25 included in the detection electrode block 25B(m).

$$H_v = \begin{pmatrix} 1 & 1 & 1 & 1 \\ 1 & -1 & 1 & -1 \\ 1 & 1 & -1 & -1 \\ 1 & -1 & -1 & 1 \end{pmatrix} \quad (6)$$

In FIG. 19, an example of the code division selection driving in which the detection operation is divided into four, the first detection operation $Td_0$, the second detection operation $Td_1$, the third detection operation $Td_2$, and the fourth detection operation $Td_3$ will be described. In the first detection operation $Td_0$ illustrated in FIG. 19(A), the first electrodes 25 are selected according to selection signals corresponding to a first row of the square matrix $H_v$. In the second detection operation $Td_1$ illustrated in FIG. 19(B), the first electrodes 25 are selected according to selection signals corresponding to a second row of the square matrix Hv. In the third detection operation $Td_2$ illustrated in FIG. 19(C), the first electrodes 25 are selected according to selection signals corresponding to a third row of the square matrix $H_v$. In the fourth detection operation $Td_3$ illustrated in FIG. 19(D), the first electrodes 25 are selected according to selection signals corresponding to a fourth row of the square matrix $H_v$.

The first detection operation $Td_0$, the second detection operation $Td_1$, the third detection operation $Td_2$, and the fourth detection operation $Td_3$ respectively include the positive sign selection operations $Td_0^+$, $Td_1^+$, $Td_2^+$, and $Td_3^+$ and the negative sign selection operations $Td_0$, $Td_1$, $Td_2$, and $Td_3$. In the positive sign selection operations $Td_0^+$, $Td_1^+$, $Td_2^+$, and $Td_3^+$, the first electrodes 25 serving as the first detection target in the detection electrode block 25B(m) are selected according to the first selection signal corresponding to the elements "1" of square matrix $H_v$. In FIG. 19, the selected first electrodes 25 are hatched. A first output signal $Sv_r^+$ (r=0, 1, 2, 3) is output from the first electrode 25 of the first detection target via the multiplexer 14B. Here, the first output signal $Sv_r^+$ is a signal obtained by integrating the detection signals of the first electrodes 25 of the first detection target included in the detection electrode block 25B(m).

In the negative sign selection operations $Td_0^-$, $Td_1^-$, $Td_2^-$, and $Td_3^-$, the first electrodes 25 of the second detection target which are not included in the first detection target in the detection electrode block 25B(m) are selected according to the second selection signal corresponding to the elements "−1" of square matrix $H_v$. A second output signal $Sv_r^-$ (r=0, 1, 2, 3) is output from the first electrode 25 of the second detection target via the multiplexer 14B. Here, the second output signal $Sv_r^-$ is a signal obtained by integrating the detection signals of the first electrodes 25 of the second detection target included in the detection electrode block 25B(m). In the present embodiment, the positive sign selection operation $Td_r^+$ (r=0, 1, 2, 3) and the negative sign selection operation $Td_r^-$ (r=0, 1, 2, 3) are performed in the time division manner.

The signal operation circuitry 44 of the signal processor 40 (see FIG. 2) obtains the third output signal $Sv_r = Sv_r^+ - Sv_r^-$ by calculating a difference between the first output signal $Sv_p^+$ and the second output signal $Sv_p^-$. The signal operation circuitry 44 outputs the third output signal $Sv_r$ to the storage 47 so that the output signal $Sv_r$ is temporarily stored in the storage 47. The first output signal $Sh_p^+$ and the second output signal $Sh_p^-$ correspond to the detection signal Vdet in the basic principle of the touch detection of the self-capacitance scheme.

When the order of the square matrix $H_v$ is 4, the four output signals ($Sv_0$, $Sv_1$, $Sv_2$, and $Sv_3$) are obtained from one detection electrode block 25B(m), similarly to Formula (3). In this case, the output signals ($Sv_0$, $Sv_1$, $Sv_2$, and $Sv_3$) are obtained from the four first output signals $Sv_0^+$, $Sv_1^+$, $Sv_2^+$, and $Sv_3^+$ and the four second output signals $Sv_0^-$, $Sv_1^-$, $Sv_2^-$, and $Sv_3^-$.

In the positive sign selection operation $Td_0^+$ of the first detection operation $Td_0$, the four first electrodes 25 are selected as the first detection target corresponding to elements "1" in the first row of square matrix $H_v$ as illustrated in FIG. 19(A). Specifically, the detection gate driver 12B supplies the detection scanning signal Vscans to the detection gate line GCLs corresponding to the first electrode 25 of the first detection target. Thus, the detection switching element Trs is turned on, and the detection by the first electrode 25 of the first detection target is performed based on the basic principle of the self-capacitance scheme. A signal obtained by integrating the detection signals of the four first electrodes 25 is output as the first output signal $Sv_0^+$.

In the negative sign selection operation $Td_0^-$ of the first detection operation $Td_0$, since there is no element "−1" in the first row of the square matrix $H_v$, the first electrode 25 is not selected as the second detection target corresponding to the element "−1." Thus, the second output signal $Sv_0^-$ is $Sv_0^-=0$. The third output signal $Sv_0=Sv_0^+ - Sv_0^-$ is calculated based on a difference between the first output signal $Sv_0^+$ and the second output signal $Sv_0^-$.

Then, in the positive sign selection operation $Td_1^+$ of the second detection operation $Td_1$, two first electrodes 25 belonging to the selection electrode blocks 25A(n) and 25A(n+2) are selected as the first detection target corresponding to elements "1" in the second row of the square matrix $H_v$ as illustrated in FIG. 19(B). The first output signal $Sv_1^+$ is output from first electrode 25 selected as the first detection target.

In the negative sign selection operation $Td_1^-$ of the second detection operation $Td_1$, two first electrodes 25 belonging to the selection electrode blocks 25A(n+1) and 25A(n+3) are selected as the second detection target corresponding to elements "−1" in the second row of the square matrix $H_v$. The second output signal $Sv_1^-$ is output from first electrode 25 selected as the second detection target. The third output signal $Sv_1 = Sv_1^+ - Sv_1^-$ is calculated based on a difference between the first output signal $Sv_1^+$ and the second output signal $Sv_1^-$.

Then, in the positive sign selection operation $Td_2^+$ of the third detection operation $Td_2$, two first electrodes 25 belonging to the selection electrode blocks 25A(n) and 25A(n+1) are selected as the first detection target corresponding to elements "1" in the third row of the square matrix $H_v$ as illustrated in FIG. 19(C). The first output signal $Sv_2^+$ is output from first electrode 25 selected as the first detection target.

In the negative sign selection operation $Td_2^-$ of the third detection operation $Td_2$, two first electrodes 25 belonging to the selection electrode blocks 25A(n+2) and 25A(n+3) are selected as the second detection target corresponding to elements "−1" in the third row of the square matrix $H_v$. The second output signal $Sv_2^-$ is output from first electrode 25 selected as the second detection target. The third output signal $Sv_2 = Sv_2^+ - Sv_2^-$ is calculated based on a difference between the first output signal $Sv_2^+$ and the second output signal $Sv_2^-$.

Then, in the positive sign selection operation $Td_3^+$ of the fourth detection operation $Td_3$, two first electrodes 25 belonging to the selection electrode blocks 25A(n) and 25A(n+3) are selected as the first detection target corresponding to elements "1" in the fourth row of the square matrix $H_v$ as illustrated in FIG. 19(D). The first output signal $Sv_3^+$ is output from first electrode 25 selected as the first detection target.

In the negative sign selection operation $Td_3^-$ of the fourth detection operation $Td_3$, two first electrodes 25 belonging to the selection electrode blocks 25A(n+1) and 25A(n+2) are selected as the second detection target corresponding to elements "−1" in the fourth row of the square matrix $H_v$. The second output signal $Sv_3^-$ is output from first electrode 25 selected as the second detection target. The third output signal $Sv_3 = Sv_3^+ - Sv_3^-$ is calculated based on a difference between the first output signal $Sv_3^+$ and the second output signal $Sv_3^-$.

The signal operation circuitry 44 sequentially outputs the four output signals $Sv_0$, $Sv_1$, $Sv_2$, and $Sv_3$ to the storage 47. The coordinate extractor 45 (see FIG. 2) receives the output signals $Sv_0$, $Sv_1$, $Sv_2$, and $Sv_3$ calculated by the signal operation circuitry 44 from the storage 47 and performs the decoding process, similarly to Formula (4). The coordinate extractor 45 can calculate the detection signal provided from each of the detection electrode included in the detection electrode block 25B(m) by performing the decoding process. The coordinate extractor 45 can calculates the coordinates at which the finger touches or approaches in the detection electrode block 25B(m) by calculating the decoded signals.

As description above, it is possible to detect the touch input position in the second direction Dy through the code division selection driving. In the present embodiment, by performing the decoding process based on the output signal obtained by integrating the detection signals of the first electrodes 25, it is possible to obtain a signal strength which is four times higher than in the time division selection driving without increasing a voltage of a signal value of each node.

In the present embodiment, the four first electrodes 25 of the detection electrode block 25B(m) are coupled to the common detection data line SGLs(m) (see FIG. 8). Thus, positive sign selection operation $Td_r^+$ and the negative sign selection operation $Td_r^-$ are performed in the time division manner. Thus, it is possible to suppress the capacitive coupling between the first electrodes 25 and improve the detection sensitivity. Further, when one data line is coupled to each of the four first electrodes 25 of the detection electrode block 25B(m), the positive sign selection operation $Td_r^+$ and the negative sign selection operation $Td_r^-$ may be simultaneously performed.

Fourth Embodiment

Figure 20:
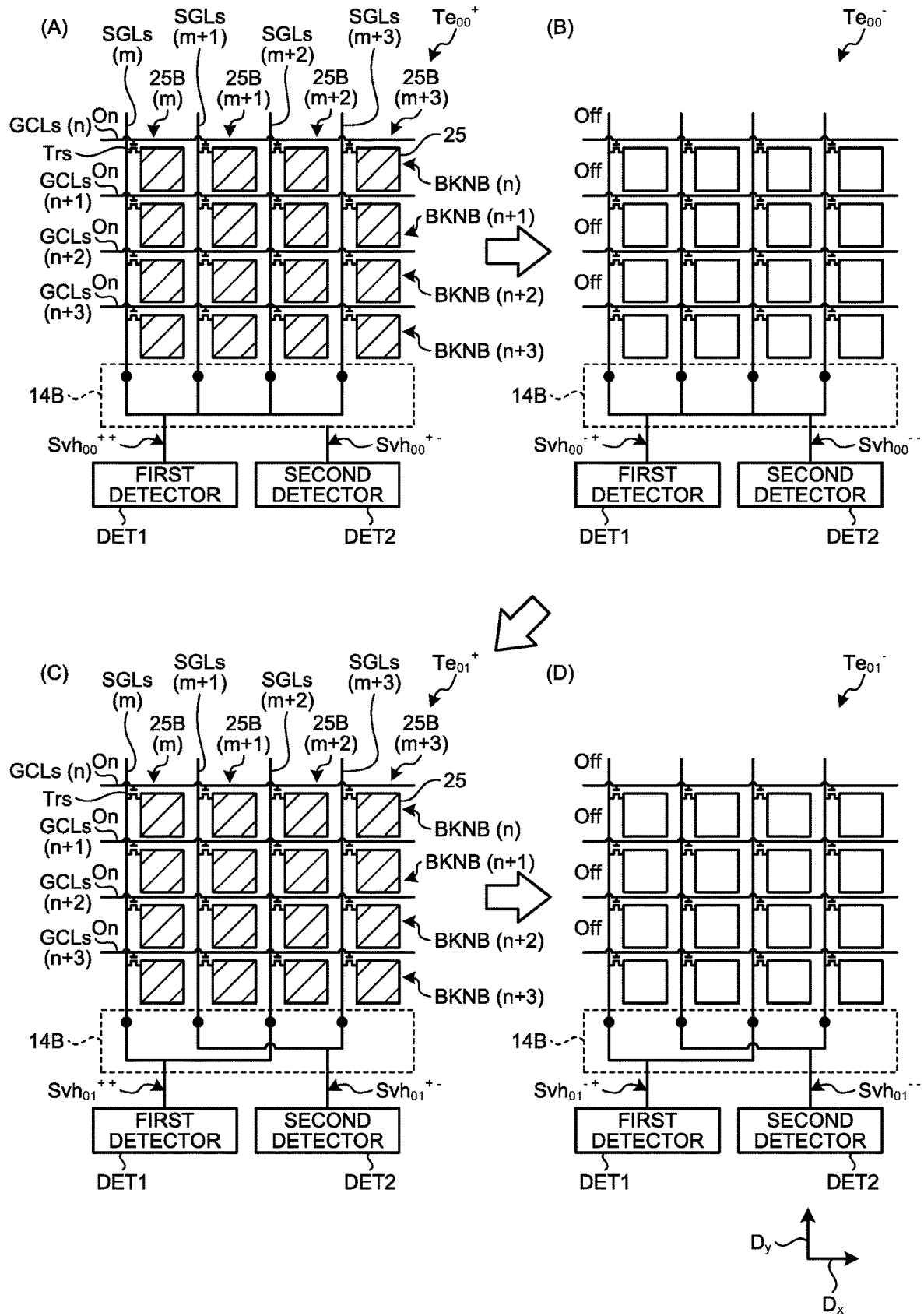
FIG. 20 is an explanatory diagram for describing an example of a selection pattern of first electrodes selected as a detection target in first and second detection operations according to a fourth embodiment.
Figure 21:
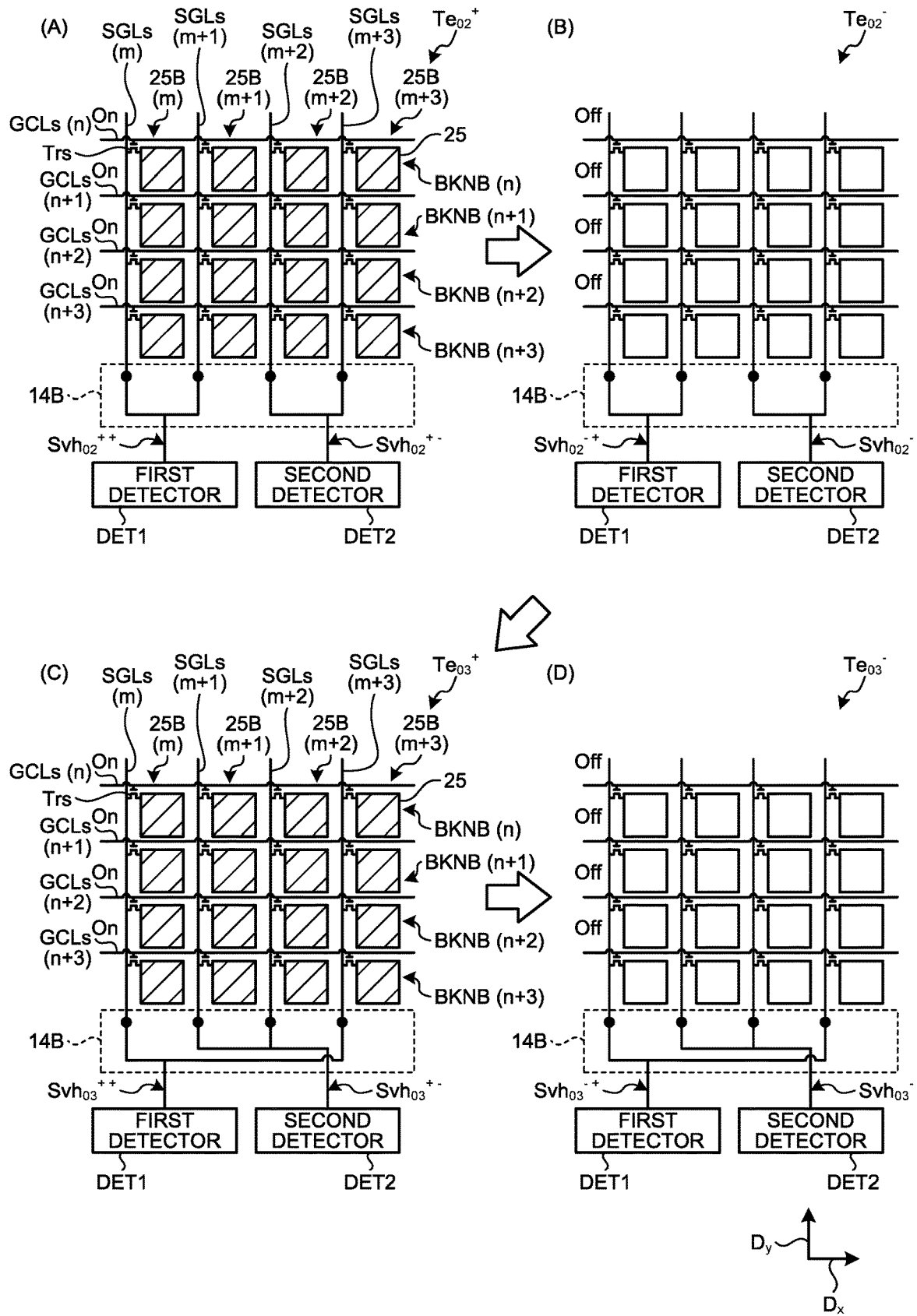
FIG. 21 is an explanatory diagram for describing an example of a selection pattern of first electrodes selected as a detection target in third and fourth detection operations.
Figure 22:
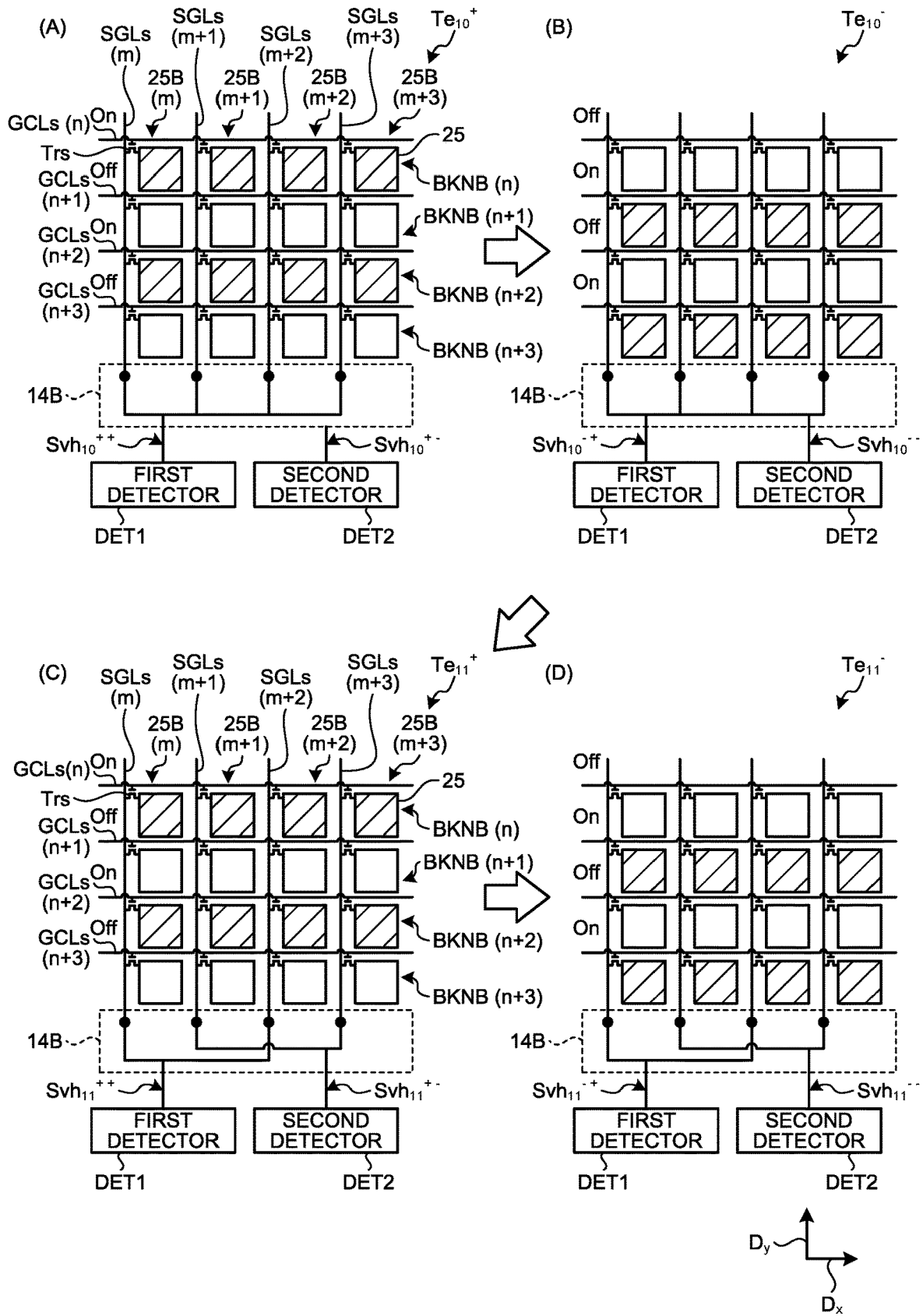
FIG. 22 is an explanatory diagram for describing an example of a selection pattern of first electrodes selected as a detection target in fifth and sixth detection operations.
Figure 23:
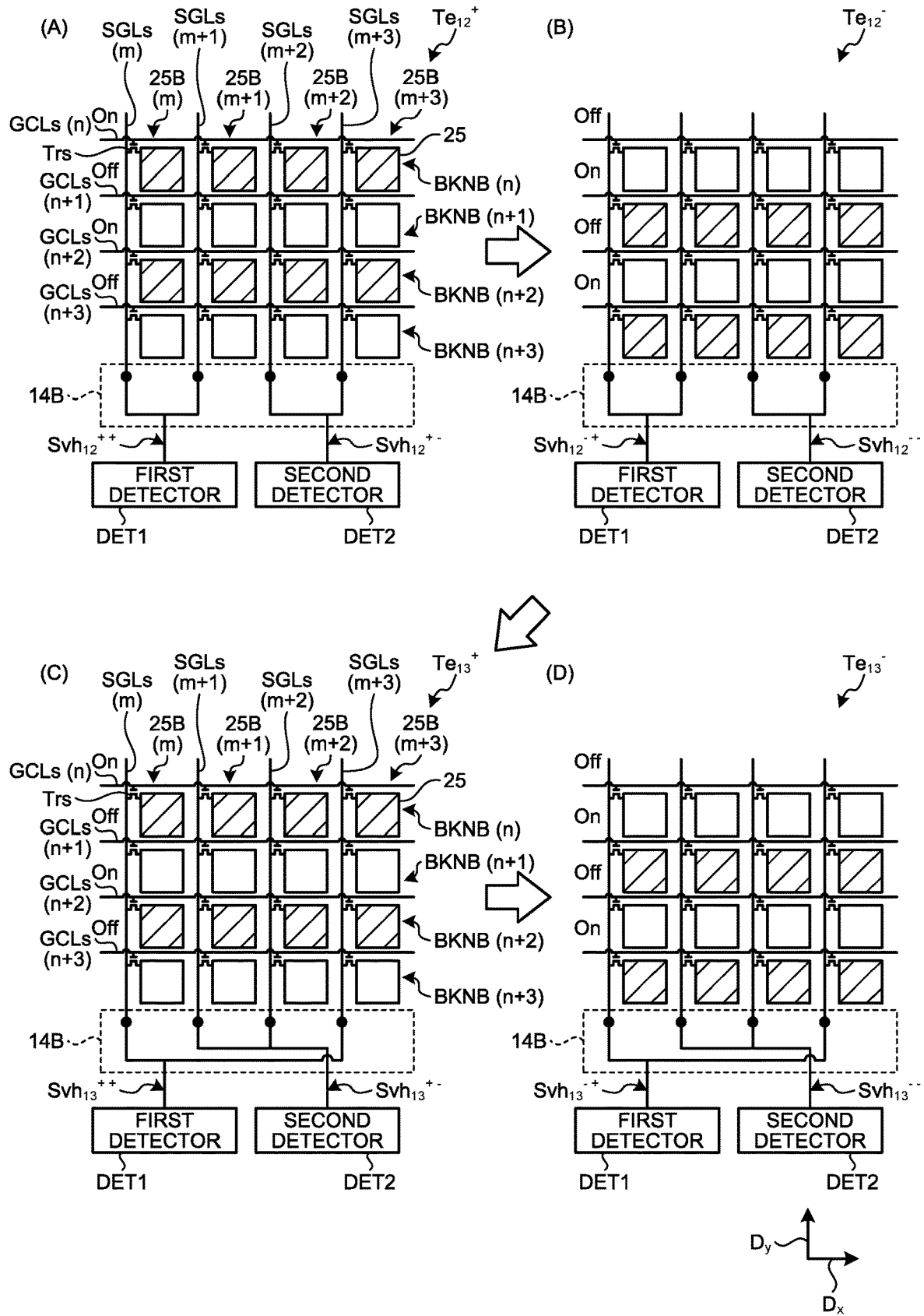
FIG. 23 is an explanatory diagram for describing an example of a selection pattern of first electrodes selected as a detection target in seventh and eighth detection operations.
Figure 24:
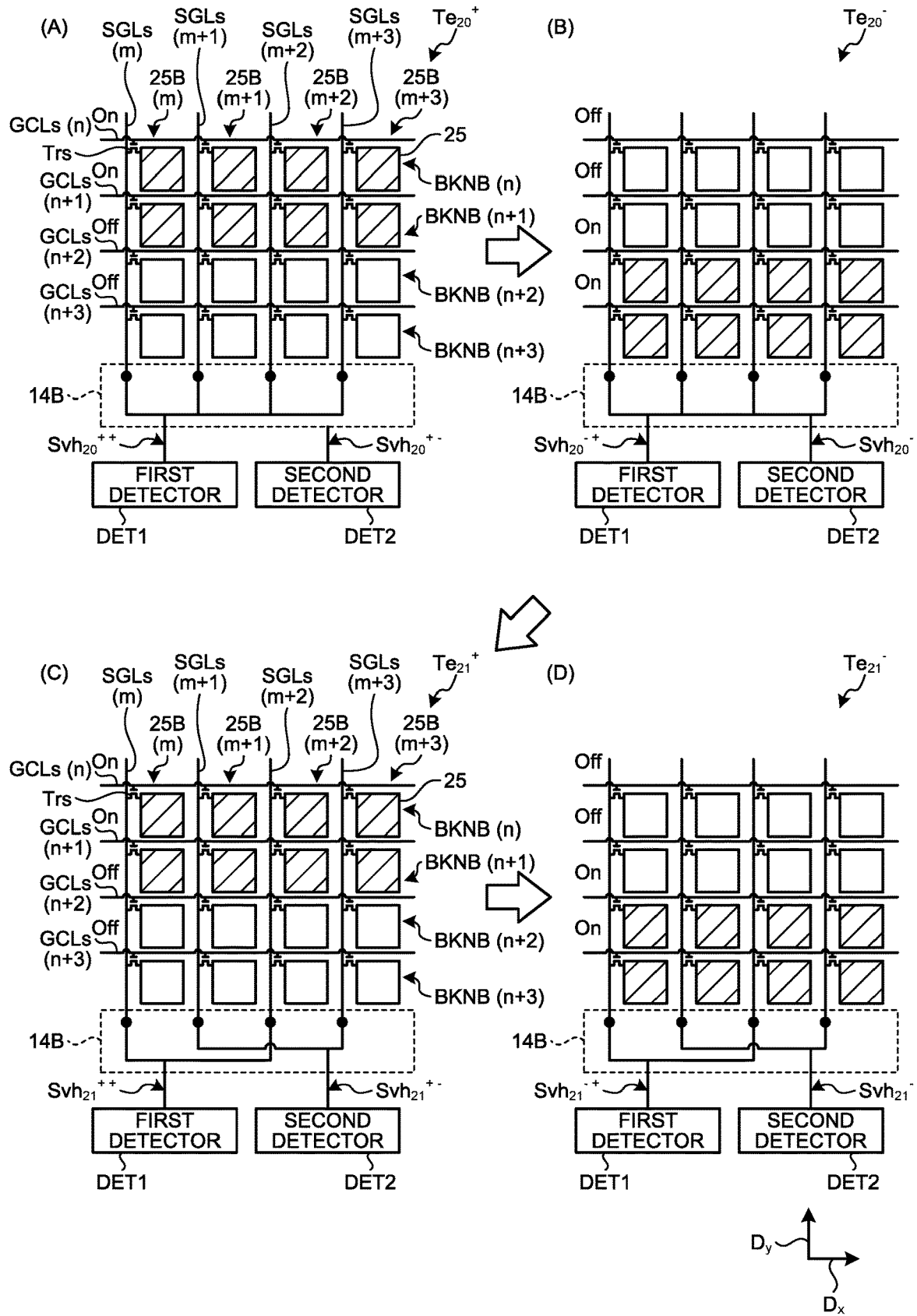
FIG. 24 is an explanatory diagram for describing an example of a selection pattern of first electrodes selected as a detection target in ninth and tenth detection operations.
Figure 26:
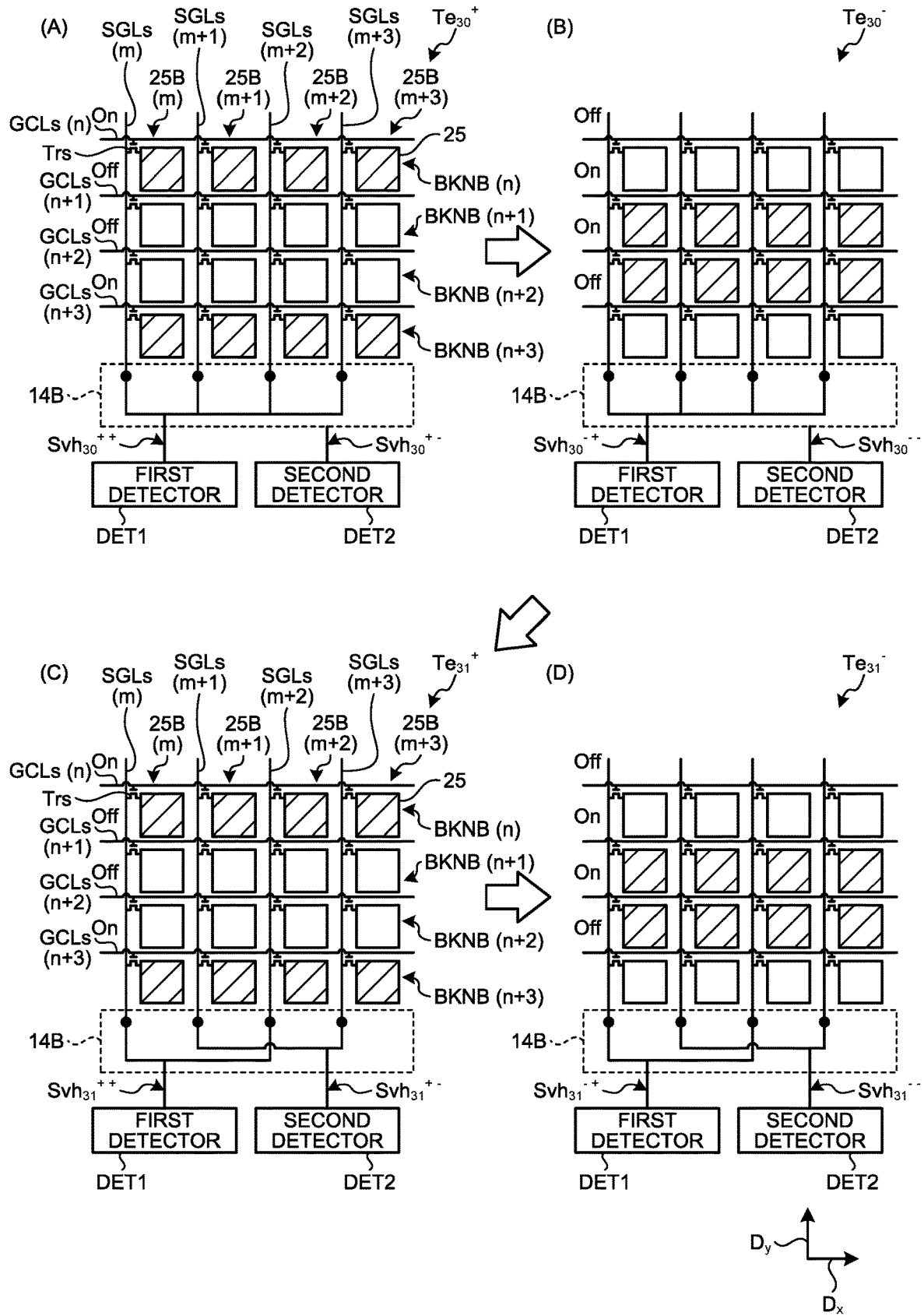
FIG. 26 is an explanatory diagram for describing an example of a selection pattern of first electrodes selected as a detection target in thirteenth and fourteenth detection operations.
Figure 27:
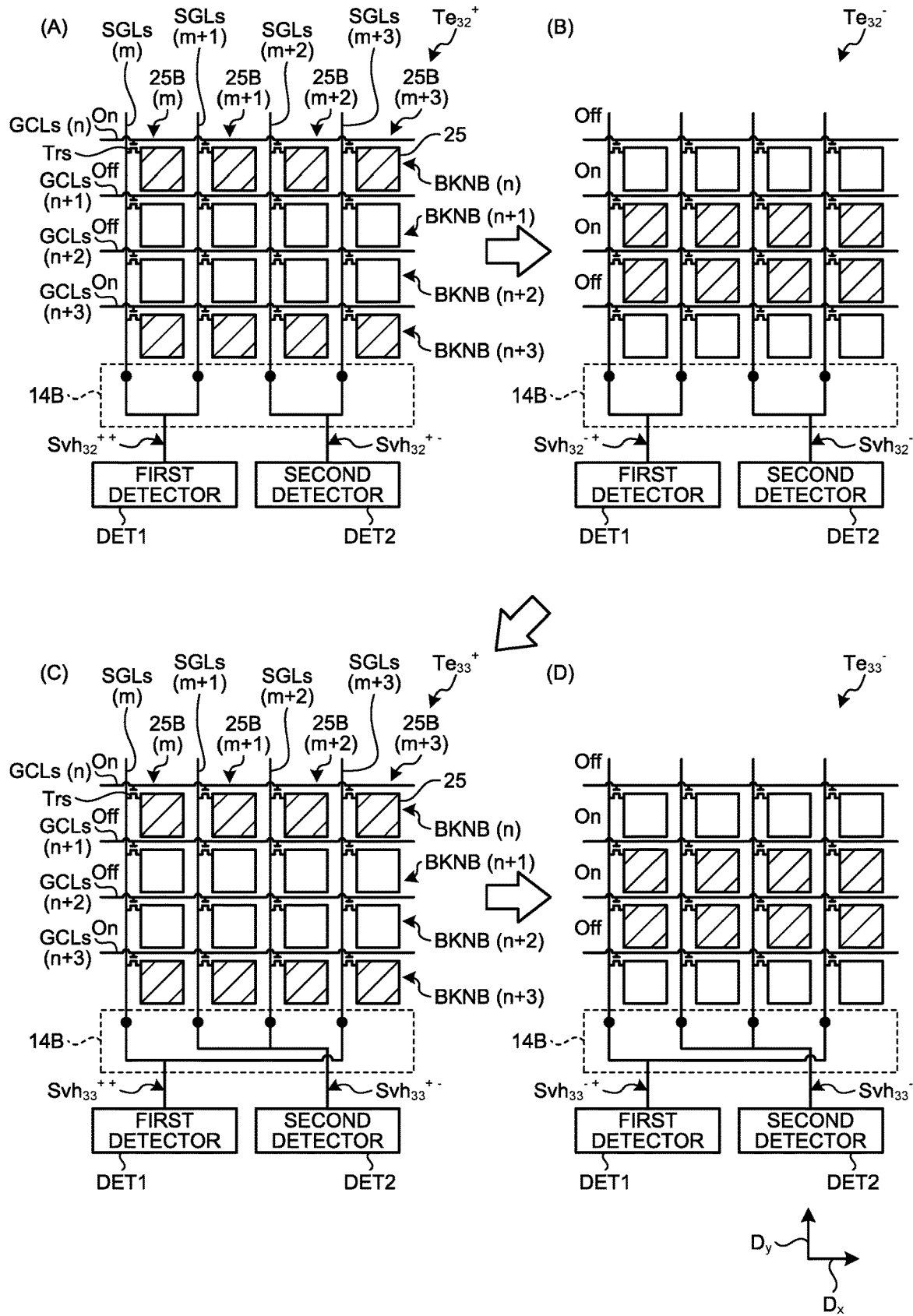
FIG. 27 is an explanatory diagram for describing an example of a selection pattern of first electrodes selected as a detection target in fifteenth and sixteenth detection operations.

Next, an exemplary operation when the code division selection driving is applied to detection of a touch input position in a first direction $D_x$ and a second direction $D_y$ will be described with reference to FIGS. 20 to 27. FIG. 20 is an explanatory diagram for describing an example of a selection pattern of first electrodes selected as the detection target in first and second detection operations according to a fourth embodiment. FIG. 21 is an explanatory diagram for describing an example of a selection pattern of first electrodes selected as the detection target in third and fourth detection operations. FIG. 22 is an explanatory diagram for describing an example of a selection pattern of first electrodes selected as the detection target in fifth and sixth detection operations. FIG. 23 is an explanatory diagram for describing an example of a selection pattern of first electrodes selected as the detection target in seventh and eighth detection operations. FIG. 24 is an explanatory diagram for describing an example of a selection pattern of first electrodes selected as the detection target in ninth and tenth detection operations. FIG. 25 is an explanatory diagram for describing an example of the selection pattern of the first electrodes selected as the detection target in eleventh and twelfth detection operations. FIG. 26 is an explanatory diagram for describing an example of the selection pattern of the first electrodes selected as the detection target in thirteenth and fourteenth detection operations. FIG. 27 is an explanatory diagram for describing an example of the selection pattern of the first electrodes selected as the detection target in fifteenth and sixteenth detection operations. In the present embodiment, the detection gate driver 12B and the multiplexer 14B correspond to a selective coupling circuitry which selects the first electrode 25 from the detection electrode block arranged to a first direction Dx and a second direction Dy. A wire coupling the multiplexer 14B with the detection circuit including the first detection circuit or the second detection circuit corresponds to the output signal line. The output signal line transmits the output signal which is the integrated detection signal output from the first electrodes 25 selected by the detection gate driver 12B and the multiplexer 14B.

In FIGS. 20 to 27, the code division selection driving is performed using a combination of the selection pattern of the first electrodes illustrated in FIG. 12 and the selection pattern of the first electrodes illustrated in FIG. 19.

FIG. 20(A) illustrates a positive sign selection operation $Te_{00}^+$ of the first detection operation, FIG. 20(B) illustrates a negative sign selection operation $Te_{00}^-$ of the first detection operation, FIG. 20(C) illustrates a positive sign selection operation $Te_{01}^+$ of the second detection operation, and FIG. 20(D) illustrates a negative sign selection operation $Te_{01}^-$ of the second detection operation. In FIG. 20(A), in the code division selection driving in the second direction $D_y$, the first electrodes 25 belonging to the second electrode blocks BKNB(n), BKNB(n+1), BKNB(n+2), and BKNB(n+3) are selected as the first electrodes 25 of the first detection target of the square matrix $H_v$, corresponding to the elements "1" in the first row of the square matrix $H_v$. In other words, the first electrodes 25 coupled to the detection gate lines GCLs(n), GCLs(n+1), GCLs(n+2), and GCLs(n+3) are selected.

Further, in FIG. 20(A), in the code division selection driving in the first direction $D_x$, the positive sign selection operation and the negative sign selection operation are simultaneously performed. The first electrodes 25 belonging to the detection electrode blocks 25B(m), 25B(m+1), 25B(m+2), and 25B(m+3) are selected as the first electrodes 25 of the first detection target of the square matrix $H_h$, corresponding to the elements "1" in the first row of the square matrix $H_h$ and coupled to a first detection circuit DET1 through the multiplexer 14B. Since there is no element "−1" in the first row of the square matrix $H_h$, the first electrode 25 is not selected as the second detection target of the square matrix $H_h$ corresponding to the element "−1."

A signal obtained by integrating the detection signals of the first electrodes 25 is output as a first output signals $Svh_{00}^{++}$. A second output signal $Svh_{00}^{+-}$ is $Svh_{00}^{+-}=0$. An output signal $Svh_{00}^+=Svh_{00}^{++}-Svh_{00}^{+-}$ is calculated based on a difference thereof.

In FIG. 20(B), in the code division selection driving in the second direction $D_y$, since there is no element "−1" in the first row of the square matrix $H_v$, the first electrodes 25 belonging to the second electrode blocks BKNB(n), BKNB(n+1), BKNB(n+2), and BKNB(n+3) are not selected as the second detection target of the square matrix $H_v$ corresponding to the element "−1."

A first output signals $Svh_{00}^{-+}$ and a second output signal $Svh_{00}^-$ are $Svh_{00}^{-+}=Svh_{00}^{--}=0$. An output signal $Svh_{00}^-=Svh_{00}^{-+}-Svh_{00}^{--}$ is calculated based on a difference thereof. An third output signal $Svh_{00}$ in the first detection operation is calculated based on a difference between the output signal $Svh_{00}^+$ and the output signal $Svh_{00}^-$.

In FIGS. 20(C) and 20(D), in the code division selection driving in the second direction $D_y$, selection similar to those of FIGS. 20(A) and 20(B) is performed. In the code division selection driving in the first direction $D_x$, the first electrodes 25 of the detection electrode blocks 25B(m) and 25B(m+2) are selected as the first detection target of the square matrix $H_h$, corresponding to the elements "1" in the second row of the square matrix $H_h$. Further, the first electrodes 25 of the detection electrode blocks 25B(m+1) and 25B(m+3) are selected as the second detection target of the square matrix $H_h$, corresponding to the elements "−1" in the second row of the square matrix $H_h$. In the positive sign selection operation $Te_{01}^+$ of the second detection operation illustrated in FIG. 20(C), an output signal $Svh_{01}^+=Svh_{01}^{++}-Svh_{01}^{+-}$ is calculated. In the negative sign selection operation $Te_{01}^-$ of the second detection operation illustrated in FIG. 20(D), an output signal $Svh_{01}^-=Svh_{01}^{-+}-Svh_{01}^{--}$ is calculated. An third output signal $Svh_{01}$ in the second detection operation is calculated based on a difference between the output signal $Svh_{01}^+$ and the output signal $Svh_{01}^-$.

FIG. 21(A) illustrates a positive sign selection operation $Te_{02}^+$ of the third detection operation, FIG. 21(B) illustrates a negative sign selection operation $Te_{02}^-$ of the third detection operation, FIG. 21(C) illustrates a positive sign selection operation $Te_{03}^+$ of the fourth detection operation, and FIG. 21(D) illustrates a negative sign selection operation $Te_{03}^-$ of the fourth detection operation. In FIG. 21, the code division selection driving in the second direction $D_y$ is similar to that in FIG. 20. In other words, the first electrodes 25 of the first detection target of the square matrix $H_v$ and the first electrodes 25 of the second detection target of the square matrix $H_v$ are selected, corresponding to the elements "1" in the first row of the square matrix $H_v$.

In FIGS. 21(A) and 21(B), in the code division selection driving in the first direction $D_x$, the first electrodes 25 of the detection electrode blocks 25B(m) and 25B(m+1) are selected as the first detection target of the square matrix $H_h$, corresponding to the elements "1" in the third row of the square matrix $H_h$. Further, the first electrodes 25 of the detection electrode blocks 25B(m+2) and 25B(m+3) are selected as the second detection target of the square matrix $H_h$, corresponding to the elements "-1" in the third row of the square matrix $H_h$. In the positive sign selection operation $Te_{02}^+$ of the third detection operation illustrated in FIG. 21(A), an output signal $Svh_{02}^+ = Svh_{02}^{++} - Svh_{02}^{+-}$ is calculated. In the negative sign selection operation $Te_{02}^-$ of the third detection operation illustrated in FIG. 21(B), an output signal $Svh_{02}^- = Svh_{02}^{-+} - Svh_{02}^{--}$ is calculated. An third output signal $Svh_{02}$ in the third detection operation is calculated based on a difference between the output signal $Svh_{02}^+$ and the output signal $Svh_{02}^-$.

In FIGS. 21(C) and 21(D), in the code division selection driving in the first direction $D_x$, the first electrodes 25 of the detection electrode blocks 25B(m) and 25B(m+3) are selected as the first detection target the square matrix $H_h$, corresponding to the elements "1" in the fourth row of the square matrix $H_h$. Further, the first electrodes 25 of the detection electrode blocks 25B(m+1) and 25B(m+2) are selected as the second detection target of the square matrix $H_h$, corresponding to the elements "-1" in the third row of the square matrix $H_h$. In the positive sign selection operation $Te_{03}^+$ of the fourth detection operation illustrated in FIG. 21(C), an output signal $Svh_{03}^+ = Svh_{03}^{++} - Svh_{03}^{+-}$ is calculated. In the negative sign selection operation $Te_{03}^-$ of the fourth detection operation illustrated in FIG. 21(D), an output signal $Svh_{03}^- = Svh_{03}^{-+} - Svh_{03}^{--}$ is calculated. An third output signal $Svh_{03}$ in the fourth detection operation is calculated based on a difference between the output signal $Svh_{03}^+$ and the output signal $Svh_{03}^-$.

FIG. 22(A) illustrates a positive sign selection operation $Te_{10}^+$ of the fifth detection operation, FIG. 22(B) illustrates a negative sign selection operation $Te_{10}^-$ of the fifth detection operation, FIG. 22(C) illustrates a positive sign selection operation $Te_{11}^+$ of the sixth detection operation, and FIG. 22(D) illustrates a negative sign selection operation $Te_{11}^-$ of the sixth detection operation. FIG. 23(A) illustrates a positive sign selection operation $Te_{12}^+$ of the seventh detection operation, FIG. 23(B) illustrates a negative sign selection operation $Te_{12}^-$ of the seventh detection operation, FIG. 23(C) illustrates a positive sign selection operation $Te_{13}^+$ of the eighth detection operation, and FIG. 23(D) illustrates a negative sign selection operation $Te_{13}^-$ of the eighth detection operation.

As illustrated in FIGS. 22 and 23, in the code division selection driving in the first direction $D_x$ of the fifth to eighth detection operations, similarly to FIGS. 20 and 21, the first electrodes 25 of the first detection target of the square matrix $H_h$ and the first electrodes 25 of the second detection target of the square matrix $H_h$ are selected.

In the positive sign selection operation $Te_{10}^+$ of the fifth detection operation illustrated in FIG. 22(A), the first electrodes 25 of the second electrode blocks BKNB(n) and BKNB(n+2) are selected as the first electrodes 25 of the first detection target of the square matrix $H_v$, corresponding to the elements "1" in the second row of the square matrix $H_v$. Further, the first electrodes 25 belonging to the detection electrode blocks 25B(m), 25B(m+1), 25B(m+2), and 25B(m+3) are selected as the first electrodes 25 of the first detection target of the square matrix $H_h$, corresponding to the elements "1" in the first row of the square matrix $H_h$. In the positive sign selection operation $Te_{10}^+$ of the fifth detection operation illustrated in FIG. 22(A), an output signal $Svh_{10}^+ = Svh_{10}^{++} - Svh_{10}^{+-}$ is calculated.

In the negative sign selection operation $Te_{10}^-$ of the fifth detection operation illustrated in FIG. 22(B), the first electrodes 25 of the second electrode blocks BKNB(n+1) and BKNB(n+3) are selected as the first electrodes 25 of the second detection target of the square matrix $H_v$, corresponding to the elements "-1" in the second row of the square matrix $H_v$. In the negative sign selection operation $Te_{10}^-$ of the fifth detection operation illustrated in FIG. 22(B), an output signal $Svh_{10}^- = Svh_{10}^{-+} - Svh_{10}^{--}$ is calculated. An third output signal $Svh_{10}$ in the fifth detection operation is calculated based on a difference between the output signal $Svh_{10}^+$ and the output signal $Svh_{10}$.

In the sixth detection operations of FIGS. 22(C) and 22(D), in the code division selection driving in the second direction $D_y$ selection similar to that in FIGS. 22(A) and 22(B) is performed. In the code division selection driving in the first direction $D_x$, the first electrodes 25 of the detection electrode blocks 25B(m) and 25B(m+2) are selected as the first detection target the square matrix $H_h$, corresponding to the elements "1" in the second row of the square matrix $H_h$. Further, the first electrodes 25 of the detection electrode blocks 25B(m+1) and 25B(m+3) are selected as the second detection target of the square matrix $H_h$, corresponding to the elements "-1" in the second row of the square matrix $H_h$. In the positive sign selection operation $Te_{11}^+$ of the sixth detection operation illustrated in FIG. 22(C), an output signal $Svh_{11}^+ = Svh_{11}^{++} - Svh_{11}^{+-}$ is calculated. In the negative sign selection operation $Te_{11}^-$ of the sixth detection operation illustrated in FIG. 22(D), an third output signal $Svh_{11}^- = Svh_{11}^{-+} - Svh_{11}^{--}$ is calculated. An output signal $Svh_{11}$ in the sixth detection operation is calculated based on a difference between the output signal $Svh_{11}^+$ and the output signal $Svh_{11}^-$.

In the seventh detection operations illustrated in FIGS. 23(A) and 23(B), in the code division selection driving in the second direction $D_y$, selection similar to that in FIGS. 22(A) and 22(B) is performed. In the seventh detection operation, in the code division selection driving in the first direction $D_x$, the first electrodes 25 of the detection electrode blocks 25B(m) and 25B(m+1) are selected as the first detection target the square matrix $H_h$, corresponding to the elements "1" in the third row of the square matrix $H_h$. Further, the first electrodes 25 of the detection electrode blocks 25B(m+2) and 25B(m+3) are selected as the second detection target of the square matrix $H_h$, corresponding to the elements "-1" in the third row of the square matrix $H_h$.

In the positive sign selection operation $Te_{12}^+$ of the seventh detection operation illustrated in FIG. 23(A), the output signal $Svh_{12}^+ = Svh_{12}^{++} - Svh_{12}^+$ is calculated. In the negative sign selection operation $Te_{12}^-$ of the seventh detection operation illustrated in FIG. 23(B), an output signal $Svh_{12}^- = Svh_{12}^{-+} - Svh_{12}^{--}$ is calculated. An output signal $Svh_{12}$ in the seventh detection operation is calculated based on a difference between the output signal $Svh_{12}{}^{+}$ and the output signal $Svh_{12}{}^{-}$.

In the eighth detection operations illustrated in FIGS. 23(C) and 23(D), in the code division selection driving in the second direction $D_y$, selection similar to that in FIGS. 22(A) and 22(B) is performed. In the eighth detection operation, in the code division selection driving in the first direction $D_x$, the first electrodes 25 of the detection electrode blocks 25B(m) and 25B(m+3) are selected as the first detection target of the square matrix $H_h$, corresponding to the elements "1" in the fourth row of the square matrix $H_h$. Further, the first electrodes 25 of the detection electrode blocks 25B(m+1) and 25B(m+2) are selected as the second detection target of the square matrix $H_h$, corresponding to the elements "−1" in the fourth row of the square matrix $H_h$.

In the positive sign selection operation $Te_{13}{}^{+}$ of the eighth detection operation illustrated in FIG. 23(C), the output signal $Svh_{13}{}^{+}=Svh_{13}{}^{++}-Svh_{13}{}^{+-}$ is calculated. In the negative sign selection operation $Te_{13}{}^{-}$ of the eighth detection operation illustrated in FIG. 23(D), an output signal $Svh_{13}{}^{-}=Svh_{13}{}^{-+}-Svh_{13}{}^{--}$ is calculated. An third output signal $Svh_{13}$ in the eighth detection operation is calculated based on a difference between the output signal $Svh_{13}{}^{+}$ and the output signal $Svh_{13}{}^{-}$.

FIG. 24(A) illustrates a positive sign selection operation $Te_{20}{}^{+}$ of the ninth detection operation, FIG. 24(B) illustrates a negative sign selection operation $Te_{20}{}^{-}$ of the ninth detection operation, FIG. 24(C) illustrates a positive sign selection operation $Te_{21}{}^{+}$ of the tenth detection operation, and FIG. 24(D) illustrates a negative sign selection operation $Te_{21}{}^{-}$ of the tenth detection operation. FIG. 25(A) illustrates a positive sign selection operation $Te_{22}{}^{+}$ of the eleventh detection operation, FIG. 25(B) illustrates a negative sign selection operation $Te_{22}{}^{-}$ of the eleventh detection operation, FIG. 25(C) illustrates a positive sign selection operation $Te_{23}{}^{+}$ of the twelfth detection operation, and FIG. 25(D) illustrates a negative sign selection operation $Te_{23}{}^{-}$ of the twelfth detection operation.

As illustrated in FIGS. 24 and 25, in the code division selection driving in the first direction $D_x$ in the ninth to twelfth detection operations, similarly to FIGS. 20 and 21, the first electrodes 25 of the first detection target of the square matrix $H_h$ and the first electrodes 25 of the second detection target of the square matrix $H_h$ are selected.

In the positive sign selection operation $Te_{20}{}^{+}$ of the ninth detection operation illustrated in FIG. 24(A), the first electrodes 25 of the second electrode blocks BKNB(n) and BKNB(n+1) are selected as the first electrodes 25 of the first detection target of the square matrix $H_v$, corresponding to the elements "1" in the third row of the square matrix $H_v$. Further, the first electrodes 25 belonging to the detection electrode blocks 25B(m), 25B(m+1), 25B(m+2), and 25B(m+3) are selected as the first electrodes 25 of the first detection target of the square matrix $H_h$, corresponding to the elements "1" in the first row of the square matrix $H_h$. In the positive sign selection operation $Te_{20}{}^{+}$ of the ninth detection operation illustrated in FIG. 24 (A), an output signal $Svh_{20}{}^{+}=Svh_{20}{}^{++}-Svh_{20}{}^{+-}$ is calculated.

In the negative sign selection operation $Te_{20}{}^{-}$ of the ninth detection operation illustrated in FIG. 24(B), the first electrodes 25 of the second electrode blocks BKNB(n+2) and BKNB(n+3) are selected as the first electrodes 25 of the second detection target of the square matrix $H_v$, corresponding to the elements "−1" in the third row of the square matrix $H_v$. In the negative sign selection operation $Te_{20}{}^{-}$ of the ninth detection operation illustrated in FIG. 24(B), an output signal $Svh_{20}{}^{-}=Svh_{20}{}^{-+}-Svh_{20}{}^{--}$ is calculated. An third output signal $Svh_{20}$ in the ninth detection operation is calculated based on a difference between the output signal $Svh_{20}{}^{+}$ and the output signal $Svh_{20}{}^{-}$.

In the tenth detection operations of FIGS. 24(C) and 24(D), in the code division selection driving in the second direction $D_y$, selection similar to that in FIGS. 24(A) and 24(B) is performed. In the code division selection driving in the first direction $D_x$, the first electrodes 25 of the detection electrode blocks 25B(m) and 25B(m+2) are selected as the first detection target of the square matrix $H_h$, corresponding to the elements "1" in the second row of the square matrix $H_h$. Further, the first electrodes 25 of the detection electrode blocks 25B(m+1) and 25B(m+3) are selected as the second detection target of the square matrix $H_h$, corresponding to the elements "−1" in the second row of the square matrix $H_h$.

In the positive sign selection operation $Te_{21}{}^{+}$ of the tenth detection operation illustrated in FIG. 24 (C), an output signal $Svh_{21}{}^{+}=Svh_{21}{}^{++}-Svh_{21}{}^{+-}$ is calculated. In the negative sign selection operation $Te_{21}{}^{-}$ of the tenth detection operation illustrated in FIG. 24 (D), an output signal $Svh_{21}{}^{-}=Svh_{21}{}^{-+}-Svh_{21}{}^{--}$ is calculated. An third output signal $Svh_{21}$ in the tenth detection operation is calculated based on a difference between the output signal $Svh_{21}{}^{+}$ and the output signal $Svh_{21}{}^{-}$.

In the eleventh detection operations illustrated in FIGS. 25(A) and 25(B), in the code division selection driving in the second direction $D_y$, selection similar to that in FIGS. 24(A) and 24(B) is performed. In the eleventh detection operation, in the code division selection driving in the first direction $D_x$, the first electrodes 25 of the detection electrode blocks 25B(m) and 25B(m+1) are selected as the first detection target of the square matrix $H_h$, corresponding to the elements "1" in the third row of the square matrix $H_h$. Further, the first electrodes 25 of the detection electrode blocks 25B(m+2) and 25B(m+3) are selected as the second detection target of the square matrix $H_h$, corresponding to the elements "−1" in the third row of the square matrix $H_h$.

In the positive sign selection operation $Te_{22}{}^{+}$ of the eleventh detection operation illustrated in FIG. 25(A), an output signal $Svh_{22}{}^{+}=Svh_{22}{}^{++}-Svh_{22}{}^{+-}$ is calculated. In the negative sign selection operation $Te_{22}{}^{-}$ of the eleventh detection operation illustrated in FIG. 25(B), an output signal $Svh_{22}{}^{-}=Svh_{22}{}^{-+}-Svh_{22}{}^{--}$ is calculated. An third output signal $Svh_{22}$ in the eleventh detection operation is calculated based on a difference between the output signal $Svh_{22}{}^{+}$ and the output signal $Svh_{22}{}^{-}$.

In the twelfth detection operations illustrated in FIGS. 25(C) and 25(D), in the code division selection driving in the second direction $D_y$, selection similar to that in FIGS. 24(A) and 24(B) is performed. In the twelfth detection operation, in the code division selection driving in the first direction $D_x$, the first electrodes 25 of the detection electrode blocks 25B(m) and 25B(m+3) are selected as the first detection target of the square matrix $H_h$, corresponding to the elements "1" in the fourth row of the square matrix $H_h$. Further, the first electrodes 25 of the detection electrode blocks 25B(m+1) and 25B(m+2) are selected as the second detection target of the square matrix $H_h$, corresponding to the elements "−1" in the fourth row of the square matrix $H_h$.

In the positive sign selection operation $Te_{23}{}^{+}$ of the twelfth detection operation illustrated in FIG. 25(C), an output signal $Svh_{23}{}^{+}=Svh_{23}{}^{++}-Svh_{23}{}^{+-}$ is calculated. In the negative sign selection operation $Te_{23}{}^{-}$ of the twelfth detection operation illustrated in FIG. 25(D), an output signal $Svh_{23}{}^{-}=Svh_{23}{}^{-+}-Svh_{23}{}^{--}$ is calculated. An third output signal $Svh_{23}$ in the twelfth detection operation is calculated based on a difference between the output signal $Svh_{23}{}^+$ and the output signal $Svh_{23}{}^-$.

FIG. 26(A) illustrates the positive sign selection operation $Te_{30}{}^+$ of the thirteenth detection operation, FIG. 26(B) illustrates the negative sign selection operation $Te_{30}{}^-$ of the thirteenth detection operation, FIG. 26(C) illustrates the positive sign selection operation $Te_{31}{}^+$ of the fourteenth detection operation, and FIG. 26(D) illustrates the negative sign selection operation $Te_{31}{}^-$ of the fourteenth detection operation. FIG. 27(A) illustrates the positive sign selection operation $Te_{32}{}^+$ of the fifteenth detection operation, FIG. 27(B) illustrates the negative sign selection operation $Te_{32}{}^-$ of the fifteenth detection operation, FIG. 27(C) illustrates the positive sign selection operation $Te_{33}{}^+$ of the sixteenth detection operation, and FIG. 27(D) illustrates the negative sign selection operation $Te_{33}{}^-$ of the sixteenth detection operation.

As illustrated in FIGS. 26 and 27, in the code division selection driving in the first direction $D_x$ in the thirteenth to sixteenth detection operations, similarly to FIGS. 20 and 21, the first electrodes 25 of the first detection target of the square matrix $H_h$ and the first electrodes 25 of the second detection target of the square matrix $H_h$ are selected.

In the positive sign selection operation $Te_{30}{}^+$ of the thirteenth detection operation illustrated in FIG. 26(A), the first electrodes 25 of the second electrode blocks BKNB(n) and BKNB(n+3) are selected as the first electrodes 25 of the first detection target of the square matrix $H_v$, corresponding to the elements "1" in the fourth row of the square matrix $H_v$. Further, the first electrodes 25 belonging to the detection electrode blocks 25B(m), 25B(m+1), 25B(m+2), and 25B(m+3) are selected as the first electrodes 25 of the first detection target of the square matrix $H_h$, corresponding to the elements "1" in the first row of the square matrix $H_h$. In the positive sign selection operation $Te_{30}{}^+$ of the thirteenth detection operation illustrated in FIG. 26(A), an output signal $Svh_{30}{}^+=Svh_{30}{}^{++}-Svh_{30}{}^{+-}$ is calculated.

In the negative sign selection operation $Te_{30}{}^-$ of the thirteenth detection operation illustrated in FIG. 26(B), the first electrodes 25 of the second electrode blocks BKNB(n+1) and BKNB(n+2) are selected as the first electrodes 25 of the second detection target of the square matrix $H_v$, corresponding to the elements "−1" in the fourth row of the square matrix $H_v$. In the negative sign selection operation $Te_{30}{}^-$ of the thirteenth detection operation illustrated in FIG. 26(B), an third output signal $Svh_{30}{}^-=Svh_{30}{}^{-+}-Svh_{30}{}^{--}$ is calculated. An output signal $Svh_{30}$ in the thirteenth detection operation is calculated based on a difference between the output signal $Svh_{30}{}^+$ and the output signal $Svh_{30}{}^-$.

In the fourteenth detection operations of FIGS. 26(C) and 26(D), in the code division selection driving in the second direction $D_y$, selection similar to that in FIGS. 26(A) and 26(B) is performed. In the code division selection driving in the first direction $D_x$, the first electrodes 25 of the detection electrode blocks 25B(m) and 25B(m+2) are selected as the first detection target the square matrix $H_h$, corresponding to the elements "1" in the second row of the square matrix $H_h$. Further, the first electrodes 25 of the detection electrode blocks 25B(m+1) and 25B(m+3) are selected as the second detection target of the square matrix $H_h$, corresponding to the elements "−1" in the second row of the square matrix $H_h$. In the positive sign selection operation $Te_{31}{}^+$ of the fourteenth detection operation illustrated in FIG. 26(C), an output signal $Svh_{31}{}^+=Svh_{31}{}^{++}-Svh_{31}{}^{+-}$ is calculated. In the negative sign selection operation $Te_{31}{}^-$ of the fourteenth detection operation illustrated in FIG. 26(D), an output signal $Svh_{31}{}^-=Svh_{31}{}^{-+}-Svh_{31}{}^{--}$ is calculated. An third output signal $Svh_{31}$ in the fourteenth detection operation is calculated based on a difference between the output signal $Svh_{31}{}^+$ and the output signal $Svh_{31}{}^-$.

In the fifteenth detection operations in illustrated in FIGS. 27(A) and 27(B), in the code division selection driving in the second direction $D_y$, selection similar to that in FIGS. 26(A) and 26(B) is performed. In the fifteenth detection operation, in the code division selection driving in the first direction $D_x$, the first electrodes 25 of the detection electrode blocks 25B(m) and 25B(m+1) are selected as the first detection target of the square matrix $H_h$, corresponding to the elements "1" in the third row of the square matrix $H_h$. Further, the first electrodes 25 of the detection electrode blocks 25B(m+2) and 25B(m+3) are selected as the second detection target of the square matrix $H_h$, corresponding to the elements "−1" in the third row of the square matrix $H_h$.

In the positive sign selection operation $Te_{32}{}^+$ of the fifteenth detection operation illustrated in FIG. 27(A), an output signal $Svh_{32}{}^+=Svh_{32}{}^{++}-Svh_{32}{}^{+-}$ is calculated. In the negative sign selection operation $Te_{32}{}^-$ of the fifteenth detection operation illustrated in FIG. 27(B), an output signal $Svh_{32}{}^-=Svh_{32}{}^{-+}-Svh_{32}{}^{--}$ is calculated. An output signal $Svh_{32}$ in the fifteenth detection operation is calculated based on a difference between the third output signal $Svh_{32}{}^+$ and the output signal $Svh_{32}{}^-$.

In the sixteenth detection operations illustrated in FIGS. 27(C) and 27(D), in the code division selection driving in the second direction $D_y$, selection similar to that in FIGS. 26(A) and 26(B) is performed. In the sixteenth detection operation, in the code division selection driving in the first direction $D_x$, the first electrodes 25 of the detection electrode blocks 25B(m) and 25B(m+3) are selected as the first detection target of the square matrix $H_h$, corresponding to the elements "1" in the fourth row of the square matrix $H_h$. Further, the first electrodes 25 of the detection electrode blocks 25B(m+1) and 25B(m+2) are selected as the second detection target of the square matrix $H_h$, corresponding to the elements "−1" in the fourth row of the square matrix $H_h$.

In the positive sign selection operation $Te_{33}{}^+$ of the sixteenth detection operation illustrated in FIG. 27(C), an output signal $Svh_{33}{}^+=Svh_{33}{}^{++}-Svh_{33}{}^{+-}$ is calculated. In the negative sign selection operation $Te_{33}{}^-$ of the sixteenth detection operation illustrated in FIG. 27(D), an output signal $Svh_{33}{}^-=Svh_{33}{}^{-+}-Svh_{33}{}^{--}$ is calculated. An third output signal $Svh_{33}$ in the sixteenth detection operation is calculated based on a difference between the output signal $Svh_{33}{}^+$ and the output signal $Svh_{33}{}^-$.

As described above, the signal operation circuitry 44 (see FIG. 2) calculates data of the 16 output signals Svuh through the first to sixteenth detection operations. The data of the output signal Svh is stored in the storage 47. The coordinate extractor 45 (see FIG. 2) receives the data of the output signal Svh from the storage 47, and performs the decoding process based on Formula (7).

$$Si'=H_v \times Svh \times H_h \qquad (7)$$

Here, Si' indicates a decoded signal and is a matrix corresponding to the first electrodes 25 illustrated in FIGS. 20 to 27. $H_v$ indicates the square matrix indicated by Formula (2) and is a transformation matrix of the second direction $D_y$. $H_h$ indicates the square matrix indicated by Formula (6) and is a transformation matrix of the second direction $D_y$. The coordinate extractor 45 can calculate the detection signal provided from each of the detection electrode included in the detection electrode block 25B(m) or the second detection electrode block BKNB(n) by performing the decoding process. The coordinate extractor 45 (see FIG. 2) can calculate two-dimensional coordinates of the finger or the like that touches or approaches based on the decoded signals Si'. In the present embodiment, the decoding process is performed based on the output signal obtained by integrating the detection signals of each first electrode 25, and thus a signal strength which is sixteen times higher than in the time division selection driving is obtained without increasing a voltage of a signal value of each node.

The positive sign selection operation and the negative sign selection operation are consecutively performed, and thus it is possible to improve the noise resistance. For example, in the first detection operation illustrated in FIG. 20, the four first output signals $Svh_{oo}^{++}$, the second output signal $Svh_{oo}^{+-}$, the first output signals $Svh_{oo}^{-+}$, the second output signal $Svh_{oo}^{--}$ are preferably measured in this order when measurement is performed in the time division manner. Since the interval between the detection period of time of the first detection target and the detection period of time of the second detection target of the square matrix $H_h$ is reduced, the noise component of each output signal is canceled. Alternatively, for example, the first output signals $Svh_{oo}^{++}$, the first output signals $Svh_{oo}^{-+}$, the second output signal $Svh_{oo}^{+-}$, and the second output signal $Svh_{oo}^{--}$ may be measured in this order. In this case, since the interval between the detection period of time of the first detection target and the detection period of time of the second detection target of the square matrix $H_v$ is reduced, the noise component of each output signal is canceled. Alternatively, the negative sign selection operation may be performed after the positive sign selection operation is consecutive performed twice or more. The order of the respective detection operations illustrated in FIGS. 20 to 27 may be appropriately changed.

Fifth Embodiment

Figure 28:
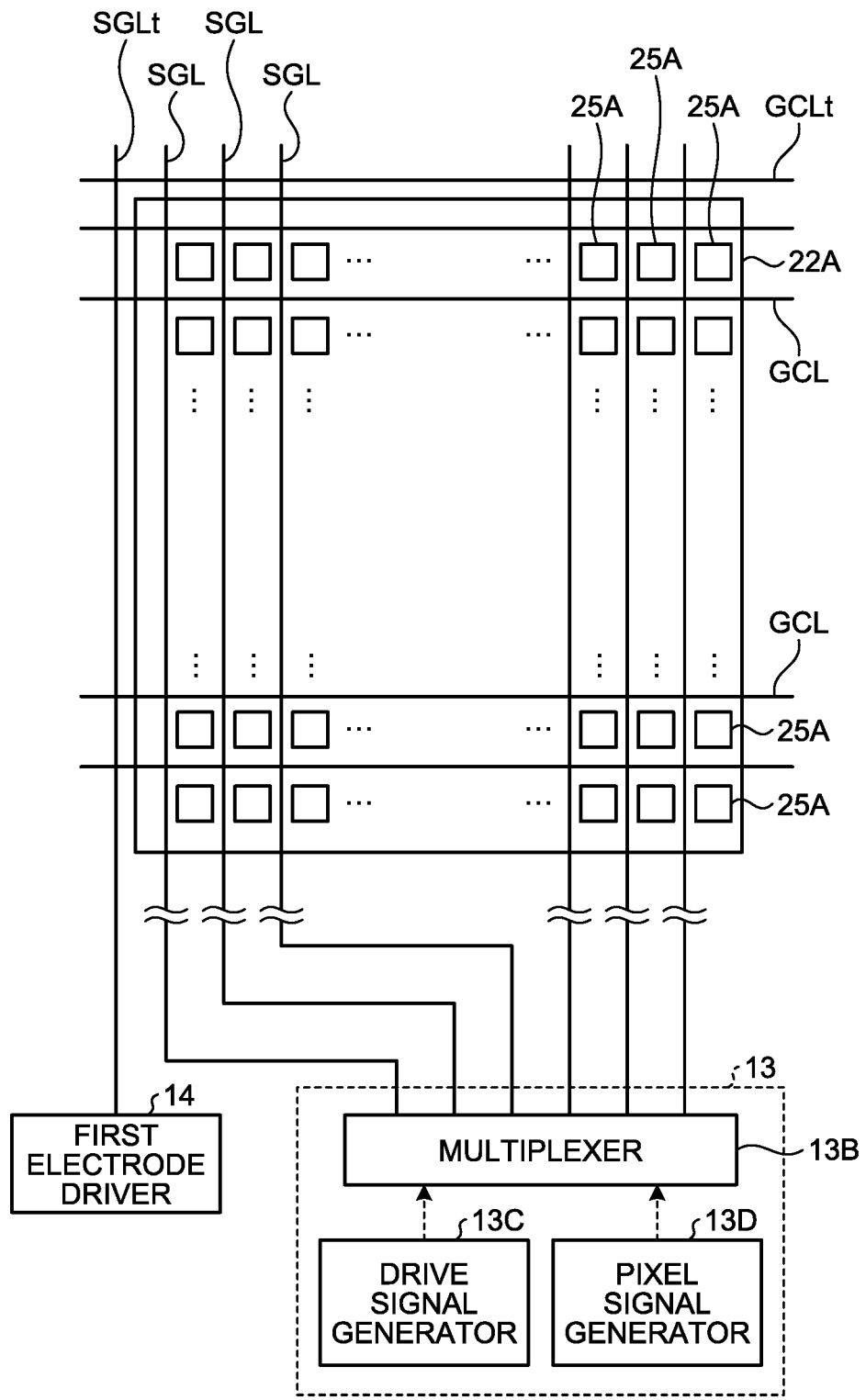
FIG. 28 is a block diagram of a first electrode, a pixel electrode, and each drive circuit according to a fifth embodiment.

FIG. 28 is a block diagram illustrating a first electrode, and drive circuits according to a fifth embodiment. In the first to fourth embodiments, the first electrode 25 doubles as the detection electrode of the detector 30 and the common electrode of display panel 20, but the present invention is not limited thereto. A first electrode 25A may double a pixel electrode for display and the detection electrode as illustrated in FIG. 28. In the present embodiment, unlike the first to fourth embodiments, a slit may not be formed in a second electrode 22A, and the first electrodes 25A may be arranged in a matrix form to overlap the second electrodes 22A.

A gate line GCL and A data line SGL are arranged to cross each other as illustrated in FIG. 28. The first electrode 25A is arranged in an area surrounded by the gate line GCL and the data line SGL. A source driver 13 includes a multiplexer 13B, a drive signal generator 13C, and a pixel signal generator 13D. A plurality of first electrodes 25A are coupled to the multiplexer 13B via the data line SGL. A scanning signal for scanning the first electrodes 25A arranged to extend in a direction parallel to the gate line GCL is supplied to a gate line GCLt. The scanning signal includes the display scanning signal Vscan and the detection scanning signal Vscans. The data line SGLt is arranged to extend in a direction parallel to the data line SGL. A display drive signal Vcom at the time of display operation is supplied to the data line SGLt.

The switch elements SW5 and xSW5, the wires L1, L2, and L3, the selection signal generator 16 of FIG. 11 are not illustrated in FIG. 28.

A pixel signal Vpix output from the pixel signal generator 13D is supplied to the multiplexer 13B in the display periods Pd1 and Pd2 (see FIG. 10). The pixel signal Vpix is supplied to the first electrode 25A selected by the multiplexer 13B, and the display operation is performed. The display drive signal Vcom for display is supplied from the first electrode driver 14 to the first electrode 25.

A detection drive signal Vs for detection output from the drive signal generator 13C is supplied to the multiplexer 13B in the detection periods Pt1 and Pt2 (see FIG. 10). The detection drive signal Vs is supplied to the first electrode 25A selected by the multiplexer 13B, and the detection operation is performed. The multiplexer 13B selects the first electrode 25A of the first detection target and the first electrode 25A of the second detection target which is not included in the first detection target based on the above-described predetermined code and supplies the detection drive signal Vs. The output signal obtained by integrating the detection signals output from a plurality of first electrodes 25A is outputted from the multiplexer 13B to the signal processor 40 (see FIGS. 1 and 2). Thus, the code division selection driving is performed.

Further, when the first electrode 25A is used as the detection electrode, the detection drive signal Vs may be supplied to a plurality of adjacent first electrodes 25A, and a plurality of first electrodes 25A may be driven collectively. In this case, compared to when the first electrodes 25A are individually driven, it is possible to perform the detection with an appropriate resolution and reduce the period of time necessary for detecting the whole of one detection surface.

In the present embodiment, the multiplexer 13B has the function of selecting the first electrode 25A serving as the display operation target and the function of selecting the first electrodes 25A serving as the first detection target and second detection target of the detection operation. Further, the gate line GCL has the function of the detection gate line GCLs (see FIG. 8) which is used for scanning the first electrode 25A during the detection operation, and the data line SGL has the function of the detection data line SGLs which is used for supplying the detection drive signal Vs for detection.

In the detection periods Pt1 and Pt2, the first electrode driver 14 may supply the signal having the same waveform synchronized with the detection drive signal Vs to the second electrode 22A. Thus, since the second electrode 22A is driven at the same potential as the first electrode 25A, the parasitic capacitance between the first electrode 25A and the second electrode 22A is reduced. In this case, the second electrode 22A is used as a guard electrode.

Sixth Embodiment

Figure 29:
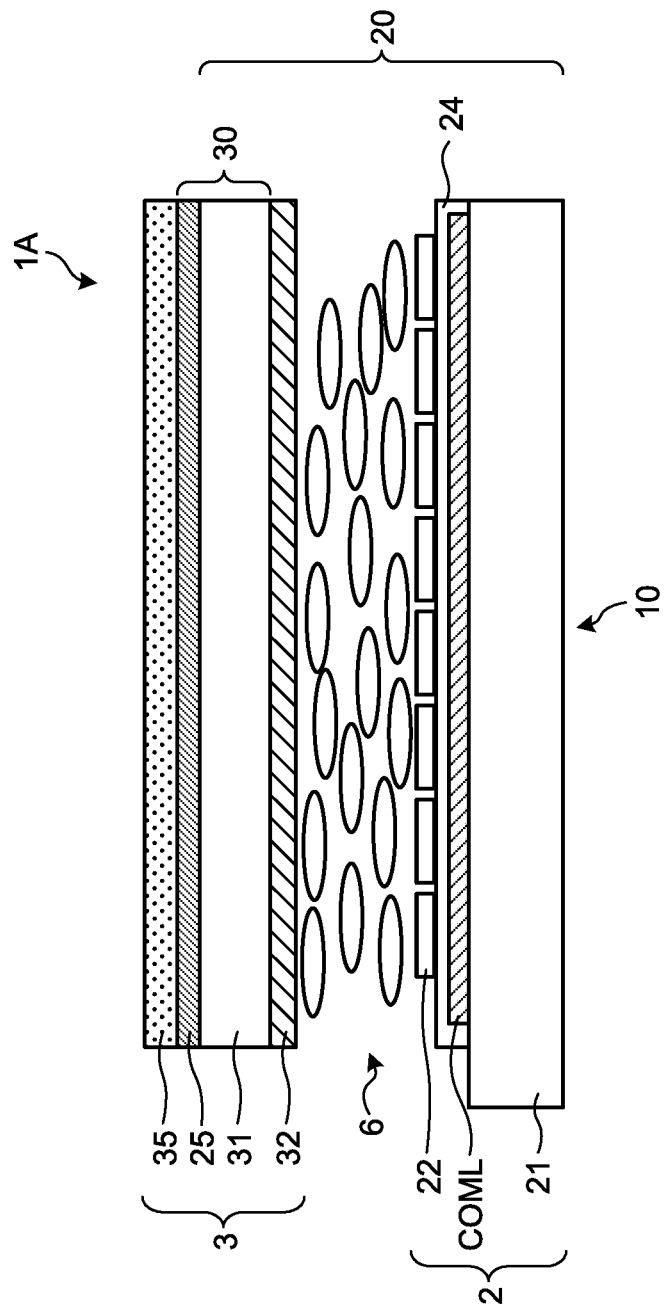
FIG. 29 is a cross-sectional view illustrating a schematic cross-sectional structure of a display device according to a sixth embodiment.

FIG. 29 is a cross-sectional view illustrating a schematic cross-sectional structure of the display device according to the sixth embodiment. In the first to fourth embodiments, the example in which the first electrode 25 doubles the detection electrode of the detector 30 and the common electrode of the display panel 20 has been described, but the present invention is not limited thereto. A display device 1A illustrated in FIG. 29 includes a pixel substrate 2, a counter substrate 3 which is opposite to the pixel substrate 2, and a liquid crystal layer 6. In the pixel substrate 2, a common electrode COML is formed on a first substrate 21, and a second electrode (pixel electrode) 22 is formed above the common electrode COML with an insulating layer 24 interposed therebetween. The common electrode COML is supplied with the display drive signal Vcom having the common potential to the sub pixels SPix at the time of the display operation.

In the present embodiment, the common electrode COML, the insulating layer 24, and the second electrode 22 are stacked on the first substrate 21 in the described order, but the present invention is not limited thereto. In the pixel electrode and the common electrode of the display panel 20, different electrodes may be used as the detection electrode. The second electrode 22, the insulating layer 24, and the common electrode COML may be stacked on the first substrate 21 in the described order, and the common electrode COML and the second electrode 22 may be formed on the same layer with the insulating layer 24 interposed therebetween. Further, at least one of the common electrode COML and the second electrode 22 may be arranged above the second substrate 31. The common electrodes COML may be consecutively formed on the entire surface of a region overlapping the display region Ad (see FIG. 5) and may be distributedly formed on a plurality of regions. Further, the first electrode 25 may be formed on a different substrate from the second substrate 31, and the detector 30 may be mounted on the display panel 20.

Further, in the counter substrate 3, the color filter 32 is formed below the second substrate 31, and the first electrode 25 serving as the detection electrode is formed on the second substrate 31. In this case, the detection switching element Trs, the detection data line SGLs, the detection gate line GCLs, and the like are formed on the second substrate 31 side. In the present embodiment, the second substrate 31 and the first electrode 25 constitute the detector 30. Even in this aspect, the detector 30 can obtain excellent detection sensitivity by suppressing capacitive coupling between the first electrodes 25 through the code division selection driving.

The exemplary embodiments of the present invention have been described above, but the present invention is not limited to the above embodiments. The details disclosed in the embodiments are merely an example, and various modifications can be made within the scope not departing from the gist of the present invention. It will be appreciated that an appropriate modification made within the scope not departing from the gist of the present invention is also included in the technical scope of the present invention.

For example, the detection device may include the detector 30 with no display panel 20. In this case, it is desirable that the detection device include at least the first substrate 21, the first electrode 25, the first electrode driver 14, the detection gate driver 12B, the signal processor 40, and the controller 11. The first electrode 25 and the second electrode 22 have a rectangular shape, but the present invention is not limited thereto, and the first electrode 25 and the second electrode 22 may have any other shape. For example, the first electrode 25 and the second electrode 22 may have a polygonal shape or a comb teeth shape. Further, the detection operations need not be necessarily performed in the order illustrated in FIGS. 20 to 28, and the order may be appropriately changed.

What is claimed is:

1. A detection device, comprising:
a plurality of detection electrodes each of which is configured to detect a detection signal based on a self-capacitance that changes according to touch or approach of an external object;
an output signal line; and
a selective coupling circuitry,
wherein:
when the detection electrodes consist of
electrodes included in a first group and electrodes included in a second group, the electrodes of the second group being all of the detection electrodes other than the electrodes of the first group,
the selective coupling circuitry is configured to:
simultaneously couple the electrodes of the first group with the output signal line according to a first selection signal;
output a first output signal to the output signal line, the first output signal being obtained by integrating first detection signals each output from each of the electrodes of the first group;
simultaneously couple the electrodes of the second group with the output signal line according to a second selection signal different from the first selection signal; and
output a second output signal to the output signal line, the second output signal being obtained by integrating second detection signals each output from each of the electrodes of the second group, and
coordinates of the touch or the approach is detected on a basis of a difference between the first output signal and the second output signal;
wherein:
when the detection electrodes include:
electrodes of a third group including at least one of the electrodes of the first group and at least one of the electrodes of the second group; and
electrodes of a fourth group that are different from the electrodes of the third group,
the selective coupling circuitry is configured to:
simultaneously couple the electrodes of the third group with the output signal line;
output a third output signal to the output signal line, the third output signal being obtained by integrating third detection signals each output from each of the electrodes of the third group;
simultaneously couple the electrodes of the fourth group, which are all the detection electrodes other than the electrodes of the third group, with the output signal line;
output a fourth output signal to the output signal line, the fourth output signal being obtained by integrating fourth detection signals each output from each of the electrodes of the fourth group; and
output the second output signal to the output signal line, simultaneously couple the electrodes of the third group with the output signal line, and output the third output signal to the output signal line, consecutively in this order, and
the coordinates of the touch or the approach is detected on a basis of the difference between the first output signal and the second output signal and a difference between the third output signal and the fourth output signal.

2. The detection device according to claim 1, wherein the output signal line includes a first output signal line configured to detect the first output signal and a second output signal line configured to detect the second output signal, and
the first output signal line is different from the second output signal line.

3. The detection device according to claim 2, wherein the selective coupling circuitry simultaneously selects the electrodes of the first group and the electrodes of the second group, and
the selective coupling circuitry simultaneously selects the electrodes of the third group and the electrodes of the fourth group.

4. The detection device according to claim 1, wherein
the selective coupling circuitry selects the electrodes of the first group and the electrodes of the second group in a time division manner, and
the selective coupling circuitry selects the electrodes of the third group and the electrodes of the fourth group in a time division manner.

5. The detection device according to claim 4, wherein
the selective coupling circuitry is configured to perform consecutively a detection operation in which the selective coupling circuitry detects the first output signal and a detection operation in which the selective coupling circuitry detects the second output signal, and
the selective coupling circuitry is configured to perform consecutively a detection operation in which the selective coupling circuitry detects the third output signal and a detection operation in which the selective coupling circuitry detects the fourth output signal.

6. The detection device according to claim 1,
wherein at least one of the first selection signal and the second selection signal is generated based on a Hadamard matrix, and
an order of the Hadamard matrix is equal to the number of the first electrodes.

7. The detection device according to claim 1, further comprising,
a first electrode driver configured to supply drive signals to the first electrodes,
wherein each of the first electrodes outputs the detection signal based on a change in capacitance, each of the first electrodes being configured to form the capacitance.

8. The detection device according to claim 7,
wherein the first electrode driver is configured to supply first drive signals to the electrodes of the first group and second drive signals to the electrodes of the second group, and
a polarity of the first drive signals is identical to a polarity of the second drive signals.

9. The detection device according to claim 1, further comprising:
switching elements respectively connected to corresponding first electrodes; and
a selection driver connected to the switching elements, wherein
the selection driver is configured to select some of the first electrodes so as to supply a detection scanning signal to some of the switching elements, the some of the switching elements corresponding to the some of the first electrodes.

10. The detection device according to claim 9,
wherein the selection driver selects the some of the first electrodes serving as a detection target and does not select the first electrodes other than the some of the first electrodes that are selected.

11. The detection device according to claim 1,
wherein the selective coupling circuitry includes a plurality of data lines each configured to be coupled to the first electrodes selectively and a multiplexer, and
the multiplexer is configured to select some of the data lines and to couple the some of the data lines to the output signal line.

12. The detection device according to claim 1, wherein
the first detection signals are simultaneously output from the respective electrodes of the first group,
the second detection signals are simultaneously output from the respective electrodes of the second group,
the third detection signals are simultaneously output from the respective electrodes of the third group, and
the fourth detection signals are simultaneously output from the respective electrodes of the fourth group.

* * * * *